(12) United States Patent
Shimauchi et al.

(10) Patent No.: US 8,254,708 B2
(45) Date of Patent: Aug. 28, 2012

(54) ENCODING DEVICE, ENCODING METHOD, RECORDING MEDIUM, AND IMAGE PROCESSING APPARATUS

(75) Inventors: Kazuhiro Shimauchi, Tokyo (JP); Yuji Wada, Tokyo (JP); Hiroshi Ikeda, Kanagawa (JP)

(73) Assignee: Sony Corporation, Tokyo (JP)

( * ) Notice: Subject to any disclaimer, the term of this patent is extended or adjusted under 35 U.S.C. 154(b) by 422 days.

(21) Appl. No.: 12/628,559

(22) Filed: Dec. 1, 2009

(65) Prior Publication Data

US 2010/0172583 A1 Jul. 8, 2010

(30) Foreign Application Priority Data

Jan. 7, 2009 (JP) ................... 2009-001892

(51) Int. Cl.
*G06K 9/36* (2006.01)
*G06K 9/46* (2006.01)
(52) U.S. Cl. ...................................................... 382/239
(58) Field of Classification Search .................. None
See application file for complete search history.

(56) References Cited

U.S. PATENT DOCUMENTS

| 6,011,900 | A  | * | 1/2000 | Kato et al. | 386/306 |
| 6,360,014 | B1 | * | 3/2002 | Boon | 382/233 |
| 6,526,098 | B1 | * | 2/2003 | Kato et al. | 375/240.24 |
| 7,965,896 | B2 | * | 6/2011 | Tanizawa et al. | 382/232 |
| 2007/0189626 | A1 | * | 8/2007 | Tanizawa et al. | 382/251 |
| 2010/0074518 | A1 | * | 3/2010 | Tanizawa et al. | 382/166 |

FOREIGN PATENT DOCUMENTS

| JP | 6-261340 | 9/1994 |
| JP | 8-130479 | 5/1996 |
| JP | 2003-125206 | 4/2003 |
| JP | 2006-60657 | 3/2006 |
| JP | 3918263 | 2/2007 |
| JP | 2007-251968 | 9/2007 |

OTHER PUBLICATIONS

Office Action issued Nov. 25, 2010, in Japan Patent Application No. 2009-001892.

* cited by examiner

*Primary Examiner* — Yuzhen Ge
(74) *Attorney, Agent, or Firm* — Oblon, Spivak, McClelland, Maier & Neustadt, L.L.P.

(57) ABSTRACT

An encoding device includes: a color-difference signal encoding unit for encoding a color-difference signal for each processing block in multiple color-difference signal encoding modes to generate multiple color-difference signal bit streams; a color-difference mode selecting unit for selecting a color-difference signal encoding mode from the multiple color-difference signal encoding modes; a luminance signal encoding unit for calculating luminance target code amount by subtracting the code amount of the encoded color-difference signal bit stream from fixed code amount, and encoding a luminance signal to generate a luminance signal bit stream; a color-difference reselecting unit for selecting the color-difference signal encoding mode corresponding to the color-difference signal bit stream having the code amount not greater than the fixed code amount, and small deterioration as to the color-difference signal; and a multiplexing unit for multiplexing the luminance signal bit stream, and the encoded color-difference signal bit stream to generate a bit stream.

20 Claims, 33 Drawing Sheets

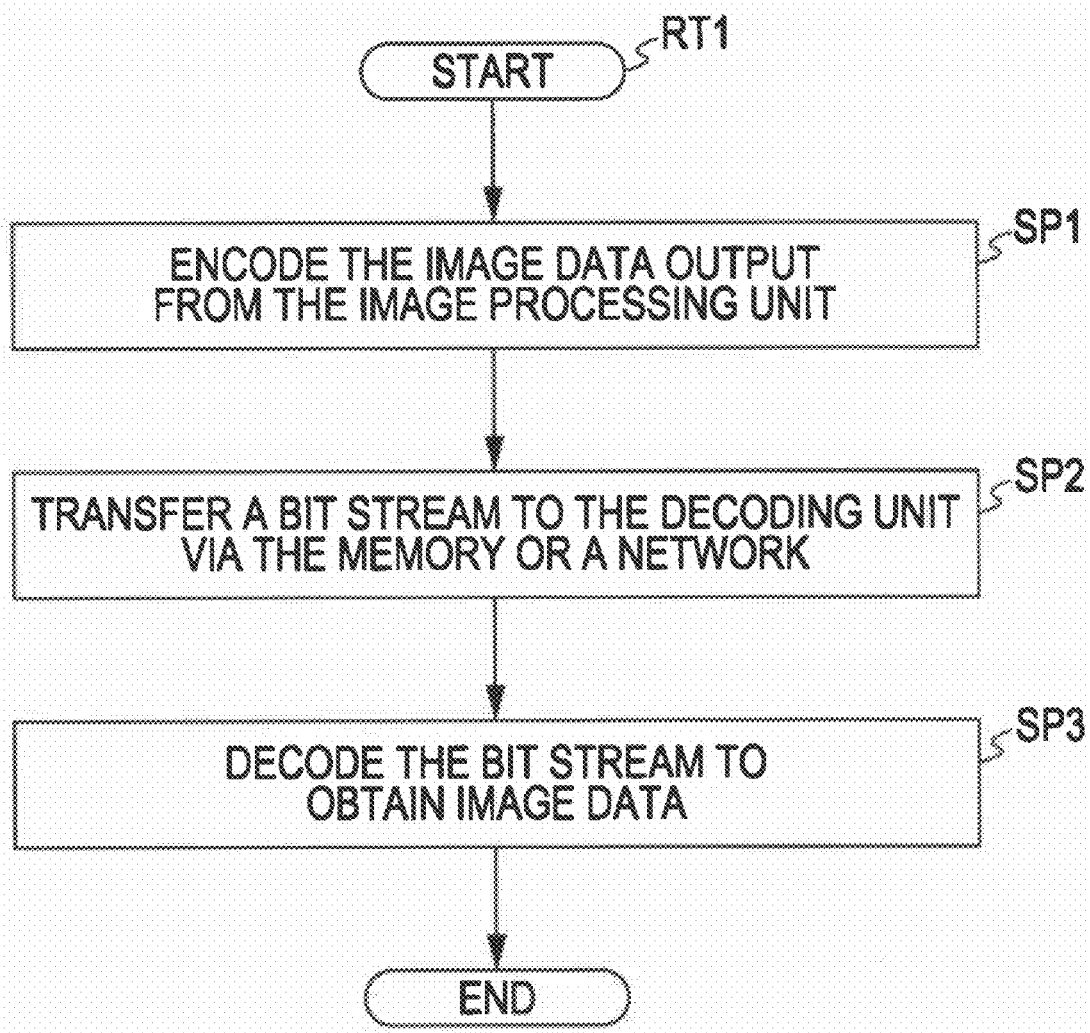

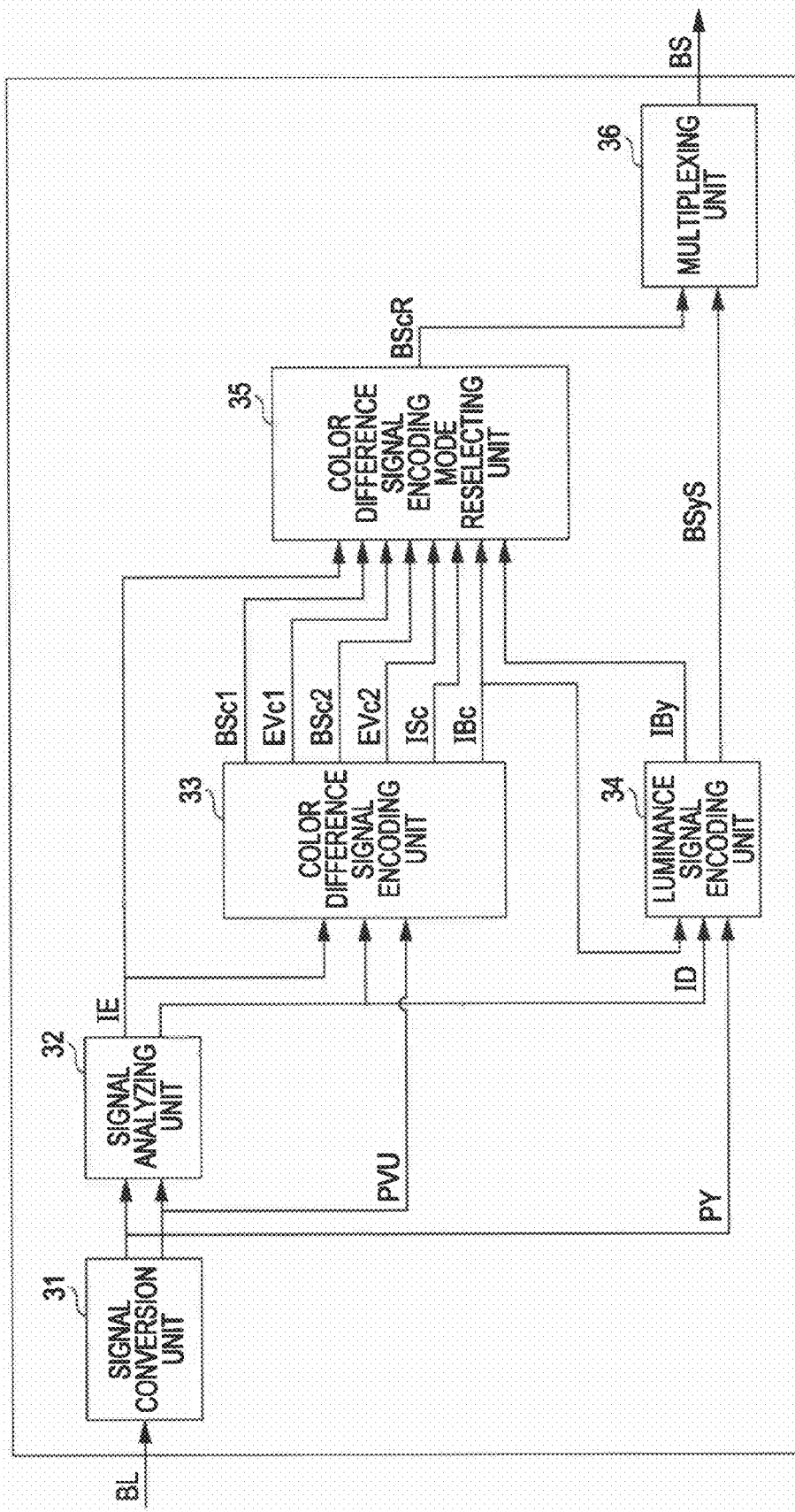

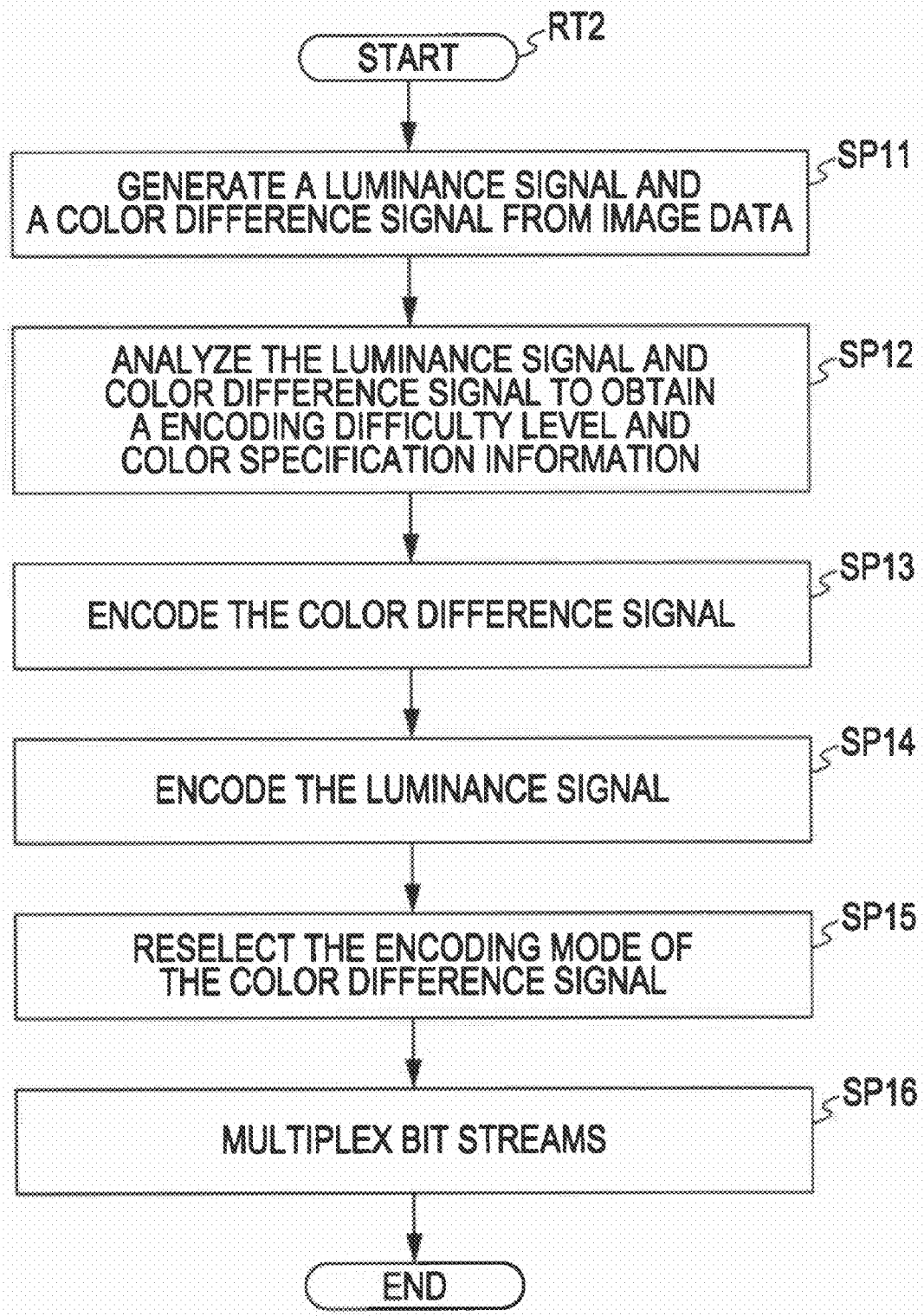

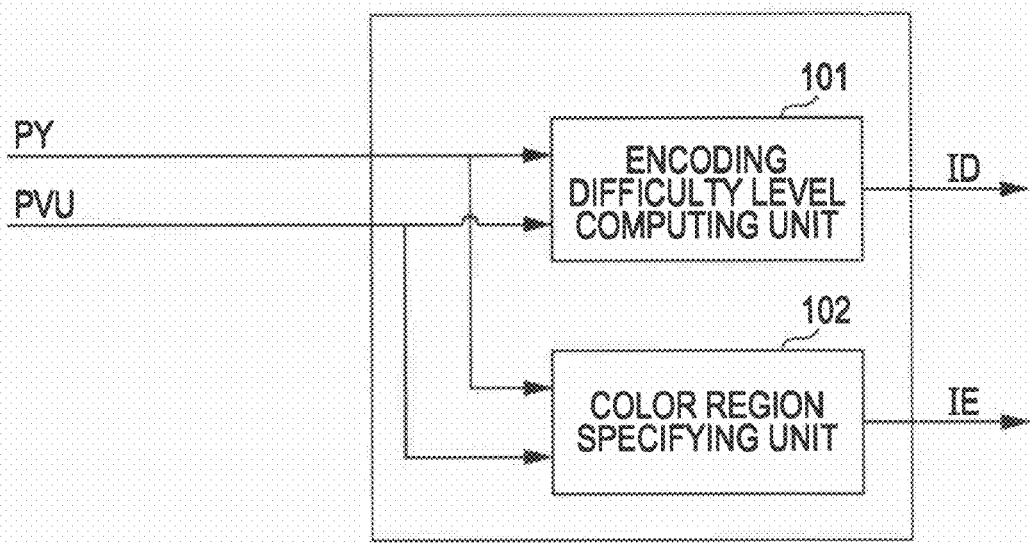
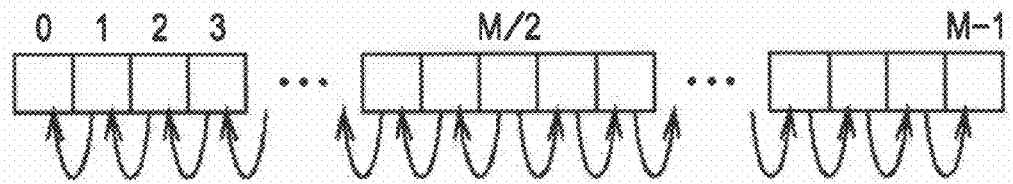

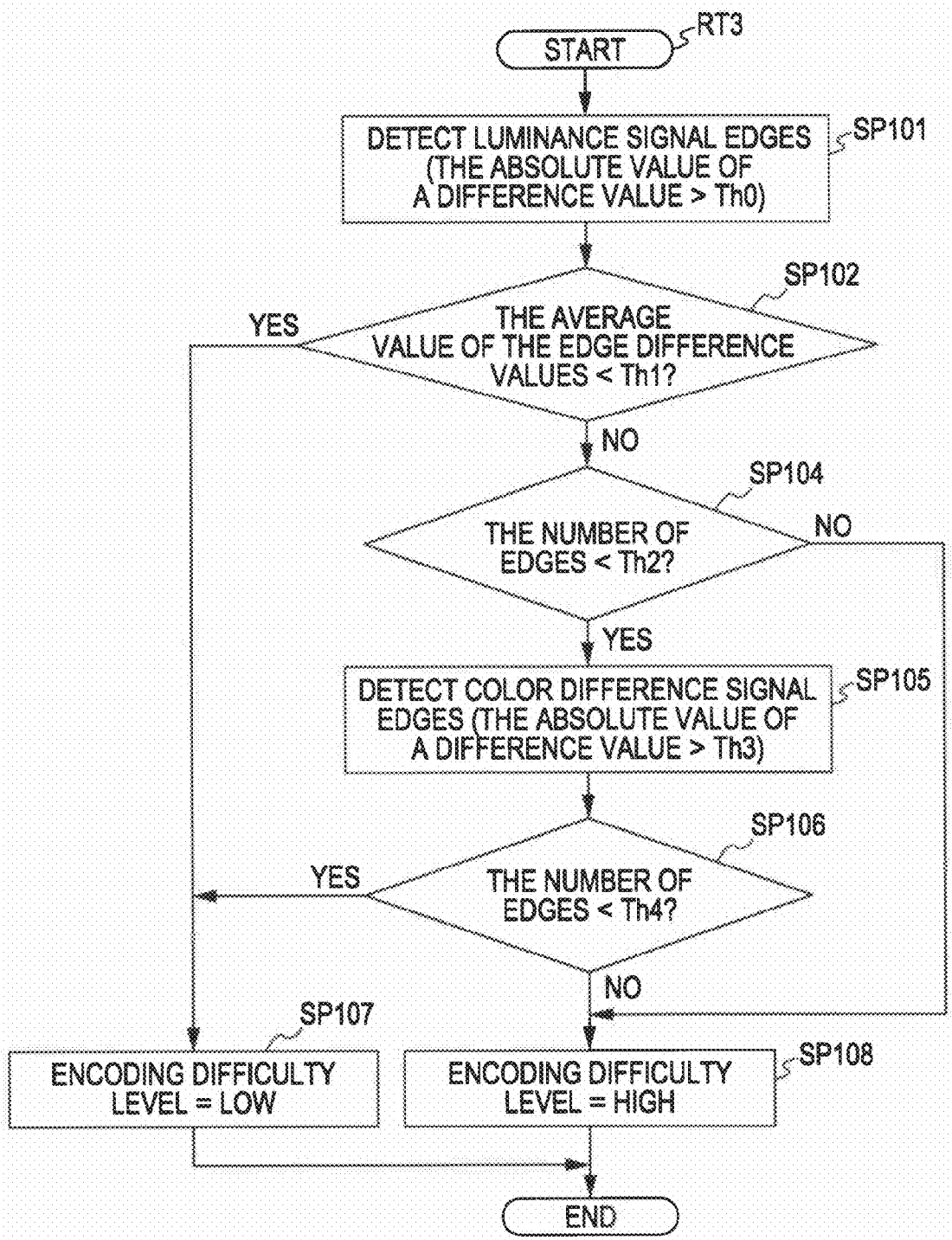

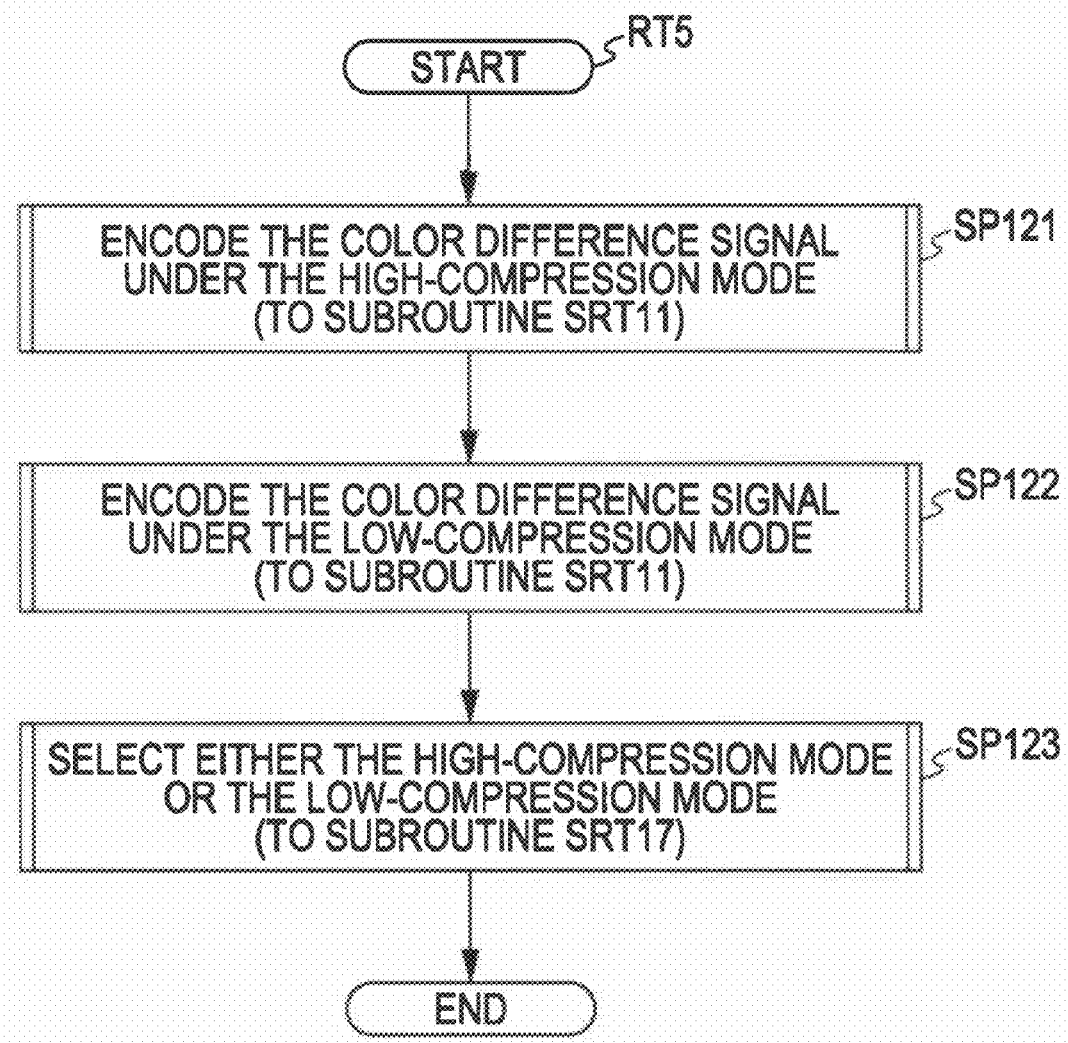

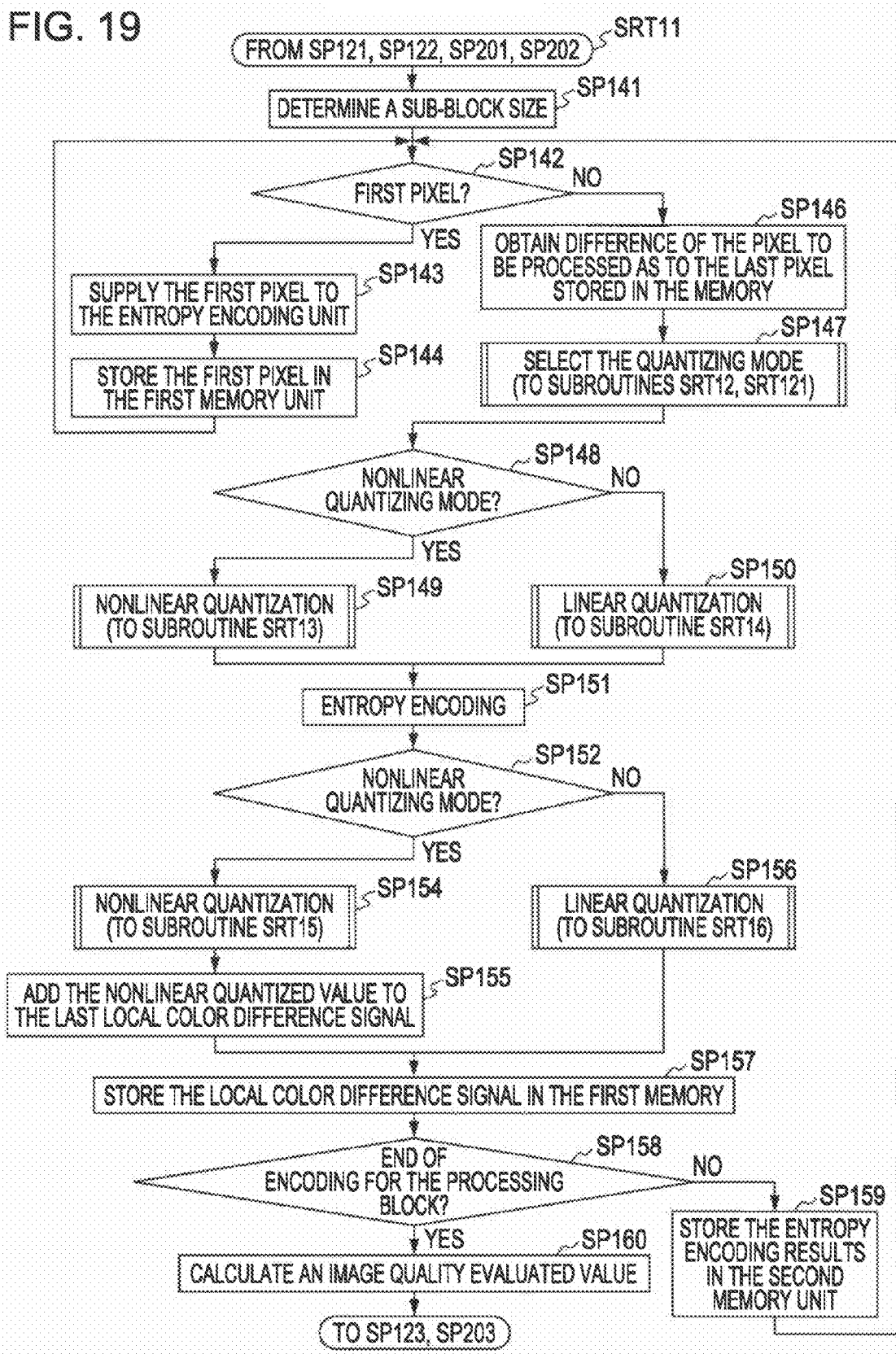

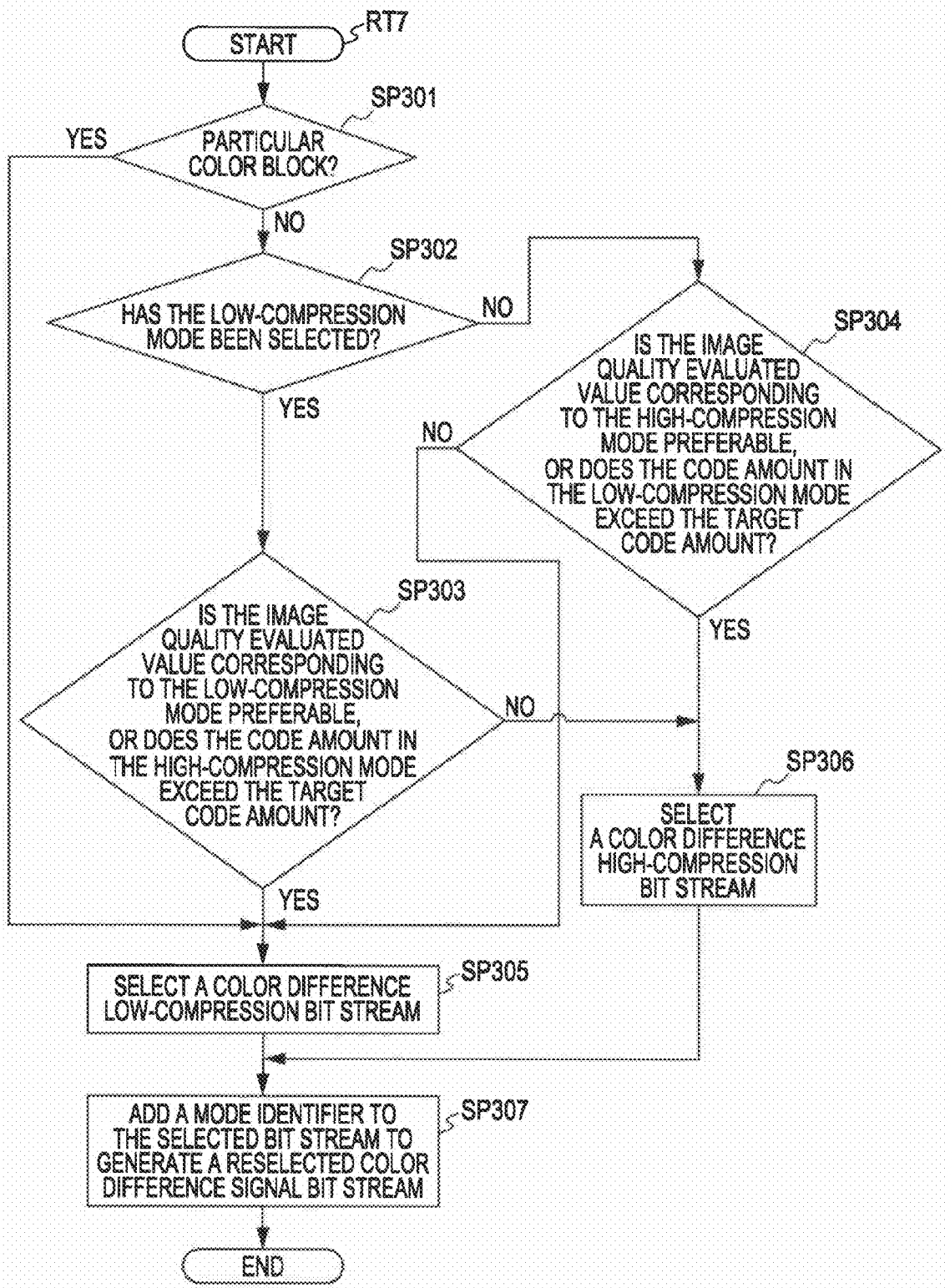

ENCODING DEVICE, ENCODING METHOD, RECORDING MEDIUM, AND IMAGE PROCESSING APPARATUS

BACKGROUND OF THE INVENTION

1. Field of the Invention

The present invention relates to an encoding device, an encoding method, a recording medium, and an image processing apparatus, and is preferably applied to an image processing apparatus such as an encoder or the like which encodes image data in accordance with an encoding method, for example, such as MPEG (Moving Picture Experts Group) or the like.

2. Description of the Related Art

Heretofore, a technique has been widely used wherein image data is encoded by an encoder to be recorded or distributed, and is decoded by a decoder at the time of displaying an image thereof. In recent years, increased resolution and increased frame rates of image data has led to an increase in the information volume of this image data. Therefore, with image processing apparatuses, a great amount of image data has to be handled within a certain period of time despite restricted resources such as memory, computing power, and so forth, included in the image processing apparatuses.

In the case of subjecting image data to some sort of image processing, such as shown in FIG. 1, an image processing apparatus R1 temporarily stores image data BL supplied thereto in memory 4. Subsequently, an image processing unit 2 reads out desired image data BL from the memory 4 in sync with image processing timing, thereby subjecting this image data to image processing.

Note however, the image processing apparatus R1 stores the image data BL in the memory 4 in certain increments, e.g., for each picture, and accordingly, has to read out the whole picture from the memory 4 even in the case of using only part of data within a picture. In general, the data amount of image data is great, and accordingly, the image processing apparatus R1 has to have great storage capacity as the memory 4, and also has to secure a wide bus bandwidth. As a result thereof, with the image processing apparatus R1, the system increases in size, and reduction in costs is difficult.

Therefore, a method has been proposed wherein the image data BL of which the data amount is reduced by encoding processing is stored in the memory 4 (e.g., Japanese Patent No. 3918263).

With the image processing apparatus 1S described in Japanese Patent No. 3918263, such as shown in FIG. 2, the image data BL is temporarily encoded, and is stored in the memory 4 in a state wherein the data amount thereof is reduced. At this time, the image processing apparatus 1S encodes the image data by dividing into small block increments, and stores these in the memory 4.

Subsequently, such as shown in FIG. 3, the image processing apparatus 1S reads out the encoded image data BL from the memory 4 in increments of blocks, and also decodes the encoded image data BL, and subjects this to image processing by the image processing unit 2.

Specifically, such as shown in FIGS. 4A and 4B, the image processing apparatus 1S executes encoding by a DPCM (Differential Pulse Code Modulation) circuit 10. The DPCM circuit 10 quantizes, for example, a pixel value made up of 8 bits into 6 bits by obtaining the difference between adjacent pixels values. At this time, the first pixel still has 8 bits since no difference value occurs.

Accordingly, the image processing apparatus 1S can reduce data in increments of blocks of five pixels made up of 8 bits (i.e., 40 bits), to 32 bits in total, which is ⅘ the data amount, for example. That is to say, with the image processing apparatus 1S, the image data BL is encoded in increments of small blocks and is stored in the memory 4, whereby random access as to the memory 4 can be executed, and the bus band can be reduced. Also, with the image processing apparatus 1S, according to reduction in data amount by encoding, the memory capacity of the memory 4 can be reduced. Also, the DPCM processing is simple encoding processing, and accordingly, does not deteriorate memory access efficiency.

SUMMARY OF THE INVENTION

Incidentally, with the image processing apparatus 1S thus configured, encoding according to the DPCM processing is executed. This DPCM processing is simple encoding processing, and accordingly, there has been a possibility of the image data BL read out from the memory 4 and decoded markedly deteriorating. That is to say, the method described in Japanese Patent No. 3918263 can encode image data for each processing block that is small block increments using simple processing, but includes a problem in that deterioration in the image data results.

It has been found to be desirable to provide an encoding device, an encoding method, a recording medium, and an image processing apparatus, whereby image data is encoded for each small processing block using simple processing, and also deterioration in this image data is prevented.

According to an embodiment of the present invention, an encoding device includes: a color difference signal encoding unit configured to encode a color difference signal for each processing block in a plurality of color difference signal encoding modes to generate a plurality of color difference signal bit streams; a color difference mode selecting unit configured to select a color difference signal encoding mode from the plurality of color difference signal encoding modes as the selected color difference mode; a luminance signal encoding unit configured to calculate a luminance target code amount based on a subtraction value obtained by subtracting the code amount of a color difference signal bit stream encoded with the selected color difference mode selected by the color difference mode selecting unit from a fixed code amount, and encode a luminance signal for the each processing block so as to be equal to or smaller than this luminance target code amount to generate a luminance signal bit stream; a color difference reselecting unit configured to select as a reselected color difference mode the color difference signal encoding mode corresponding to the color difference signal bit stream of which the total code amount including the code amount of the luminance signal bit stream is equal to or smaller than the fixed code amount, and also the deterioration as to the color difference signal is small, as the reselected color difference mode; and a multiplexing unit configured to multiplex the luminance signal bit stream, and the color difference signal bit stream encoded with the reselected color difference mode to generate a bit stream made up of the code block of the fixed code amount.

Thus, with the encoding device, a bit stream can be generated using a color difference signal bit stream in which the image quality does not deteriorate most with a range wherein the code amount of a luminance signal bit stream and the code amount of a color difference signal bit stream, which are actually used, are equal to or smaller than a fixed code amount.

Also, according to an embodiment of the present invention, an encoding method includes the steps of: encoding of a color difference signal for each processing block in a plurality color difference signal encoding mode to generate a plurality of color difference signal bit streams; first selecting of a color difference signal encoding mode from the plurality of color difference signal encoding modes as the selected color difference mode; calculating of a luminance target code amount by subtracting the code amount of a color difference signal bit stream encoded by the selected color difference mode selected in the first selecting from a fixed code amount, and encode the luminance signal for the each processing block so as to be equal to or smaller than this luminance target code amount to generate a luminance signal bit stream; second selecting of the color difference signal encoding mode corresponding to the color difference signal bit stream of which the total code amount including the code amount of the luminance signal bit stream is equal to or smaller than the fixed code amount, and also the deterioration as to the color difference signal is small, as the reselected color difference mode; and multiplexing of the luminance signal bit stream, and the color difference signal bit stream encoded with the reselected color difference mode to generate a bit stream made up of the code block of the fixed code amount.

Thus, with the encoding method, a bit stream can be generated using a color difference signal bit stream in which the image quality does not deteriorate most with a range wherein the code amount of a luminance signal bit stream and the code amount of a color difference signal bit stream, which are actually used, are equal to or smaller than a fixed code amount.

Also, according to an embodiment of the present invention, a recording medium stores a program causing a computer to execute the steps of: encoding of a color difference signal for each processing block in a plurality color difference signal encoding mode to generate a plurality of color difference signal bit streams; first selecting of a color difference signal encoding mode from the plurality of color difference signal encoding modes as the selected color difference mode; calculating of a luminance target code amount by subtracting the code amount of a color difference signal bit stream encoded by the selected color difference mode selected in the first selecting from a fixed code amount, and encode the luminance signal for the each processing block so as to be equal to or smaller than this luminance target code amount to generate a luminance signal bit stream; second selecting of the color difference signal encoding mode corresponding to the color difference signal bit stream of which the total code amount including the code amount of the luminance signal bit stream is equal to or smaller than the fixed code amount, and also the deterioration as to the color difference signal is small, as the reselected color difference mode; and multiplexing of the luminance signal bit stream, and the color difference signal bit stream encoded with the reselected color difference mode to generate a bit stream made up of the code block of the fixed code amount.

Thus, with the program recorded in the recording medium, a computer can be caused to executed processing such that a bit stream is generated using a color difference signal bit stream in which the image quality does not deteriorate most with a range wherein the code amount of a luminance signal bit stream and the code amount of a color difference signal bit stream, which are actually used, are equal to or smaller than a fixed code amount.

Also, according to an embodiment of the present invention, an image processing apparatus includes: a signal separating unit configured to separate image data into a color difference signal and a luminance signal; an encoding device including a color difference signal encoding unit configured to encode a color difference signal for each processing block in a plurality color difference signal encoding mode to generate a plurality of color difference signal bit streams, a color difference mode selecting unit configured to select a color difference signal encoding mode from the plurality of color difference signal encoding modes as the selected color difference mode, a luminance signal encoding unit configured to calculate a luminance target code amount by subtracting the code amount of a color difference signal bit stream encoded by the selected color difference mode selected by the color difference mode selecting unit from a fixed code amount, and encode the luminance signal for the each processing block so as to be equal to or smaller than this luminance target code amount to generate a luminance signal bit stream, a color difference mode reselecting unit configured to select the color difference signal encoding mode corresponding to the color difference signal bit stream of which the total code amount including the code amount of the luminance signal bit stream is equal to or smaller than the fixed code amount, and also the deterioration as to the color difference signal is small, as the reselected color difference mode, and a multiplexing unit configured to multiplex the luminance signal bit stream, and the color difference signal bit stream encoded with the reselected color difference mode to generate a bit stream made up of the code block of the fixed code amount; memory configured to store the bit stream for the each code block; a decoding unit configured to read out and decode the bit stream from the memory for the each code block to generate the image data; and an image processing unit configured to process the image data decoded by the decoding unit.

Thus, with the image processing apparatus, a bit stream generated using a color difference signal bit stream in which the image quality does not deteriorate most with a range wherein the code amount of a luminance signal bit stream and the code amount of a color difference signal bit stream, which are actually used, are equal to or smaller than a fixed code amount, can be stored in the memory.

According to the above configurations, a bit stream can be generated using a color difference signal bit stream in which the image quality does not deteriorate most with a range wherein the code amount of a luminance signal bit stream and the code amount of a color difference signal bit stream, which are actually used, are equal to or smaller than a fixed code amount. Thus, the present invention can realize an encoding device, an encoding method, a recording medium, and an image processing apparatus, whereby image data is encoded for each small processing block using simple processing, and also deterioration in this image data is prevented.

BRIEF DESCRIPTION OF THE DRAWINGS

FIG. 7 is a schematic diagram illustrating the configuration of an existing code block;

FIG. 8 is a schematic diagram illustrating the configuration of an encoding unit;

FIG. 9 is a flowchart illustrating an encoding processing procedure;

FIG. 10 is a schematic diagram illustrating the configuration of a signal analyzing unit;

FIG. 11 is a schematic diagram for describing calculation of a difference value;

FIG. 12 is a flowchart for describing an encoding difficulty level determining processing procedure;

FIG. 18 is a flowchart for describing a color difference signal encoding processing procedure;

FIG. 19 is a flowchart for describing a color difference signal compression processing procedure;

FIG. 43 is a flowchart for describing a color difference encoding mode reselecting processing procedure.

DESCRIPTION OF THE PREFERRED EMBODIMENTS

Figure 1:
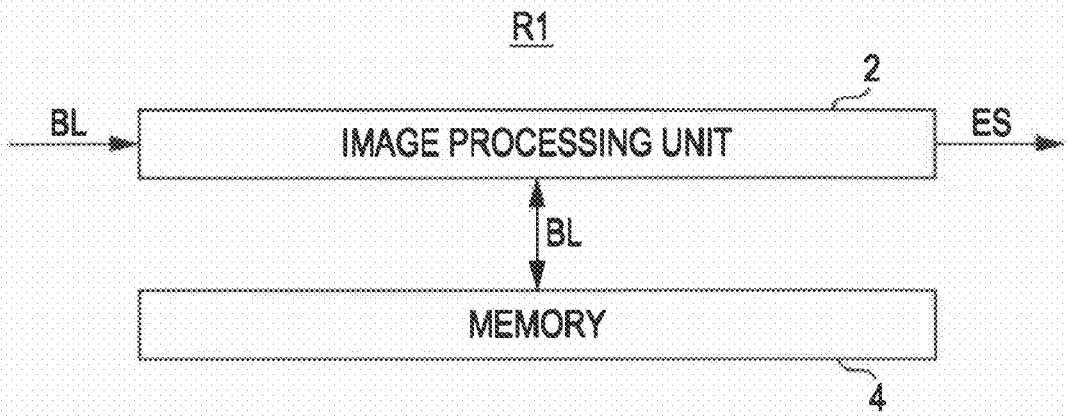
FIG. 1 is a schematic diagram illustrating a configuration example of an existing image processing apparatus.
Figure 2:
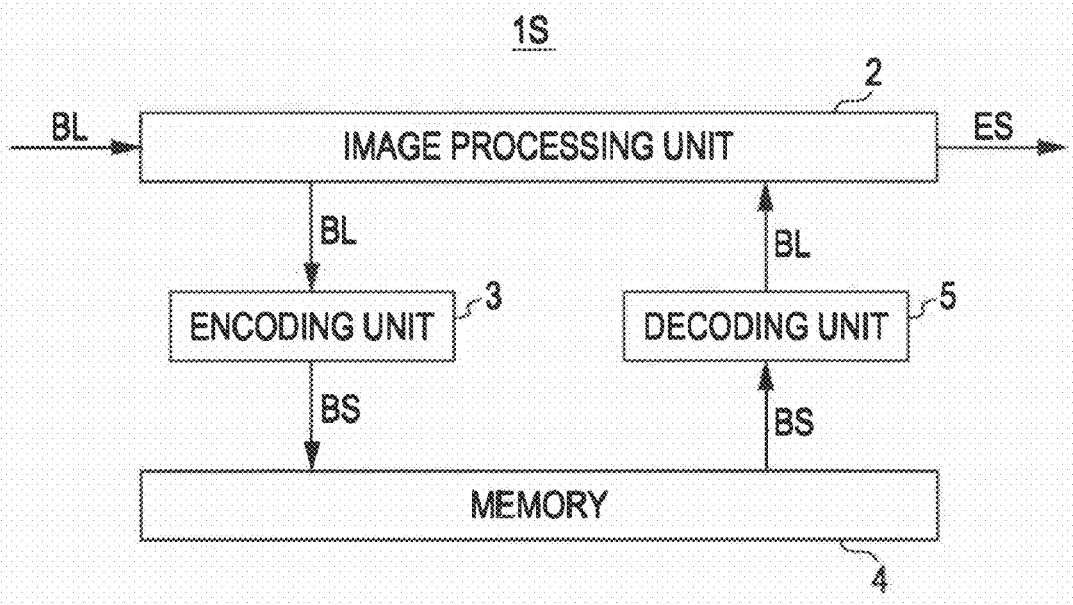
FIG. 2 is a schematic diagram illustrating another configuration example of an existing image processing apparatus.
Figure 3:
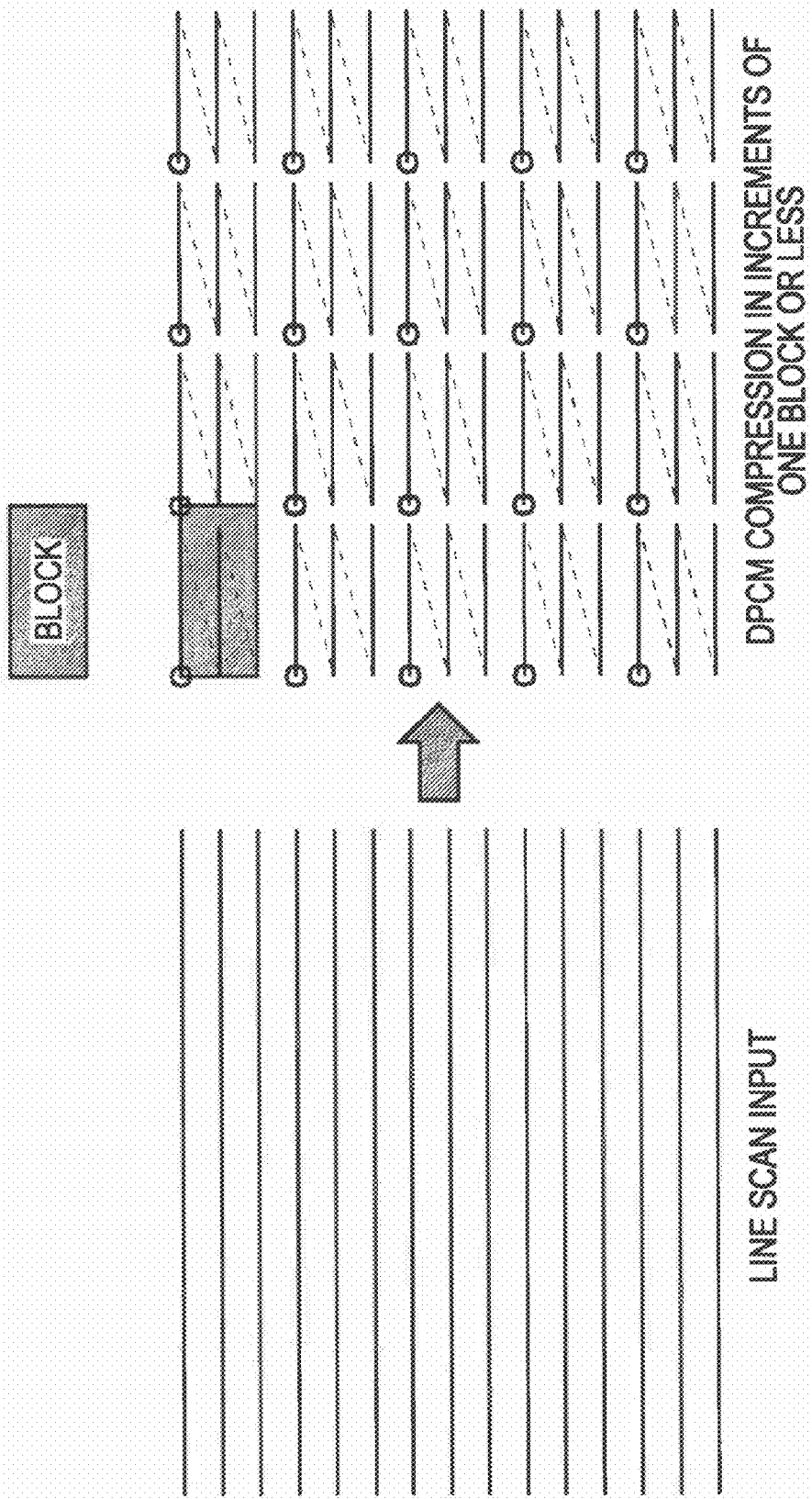
FIG. 3 is a schematic diagram for describing DPCM processing in increments of blocks.
Figure 4A:
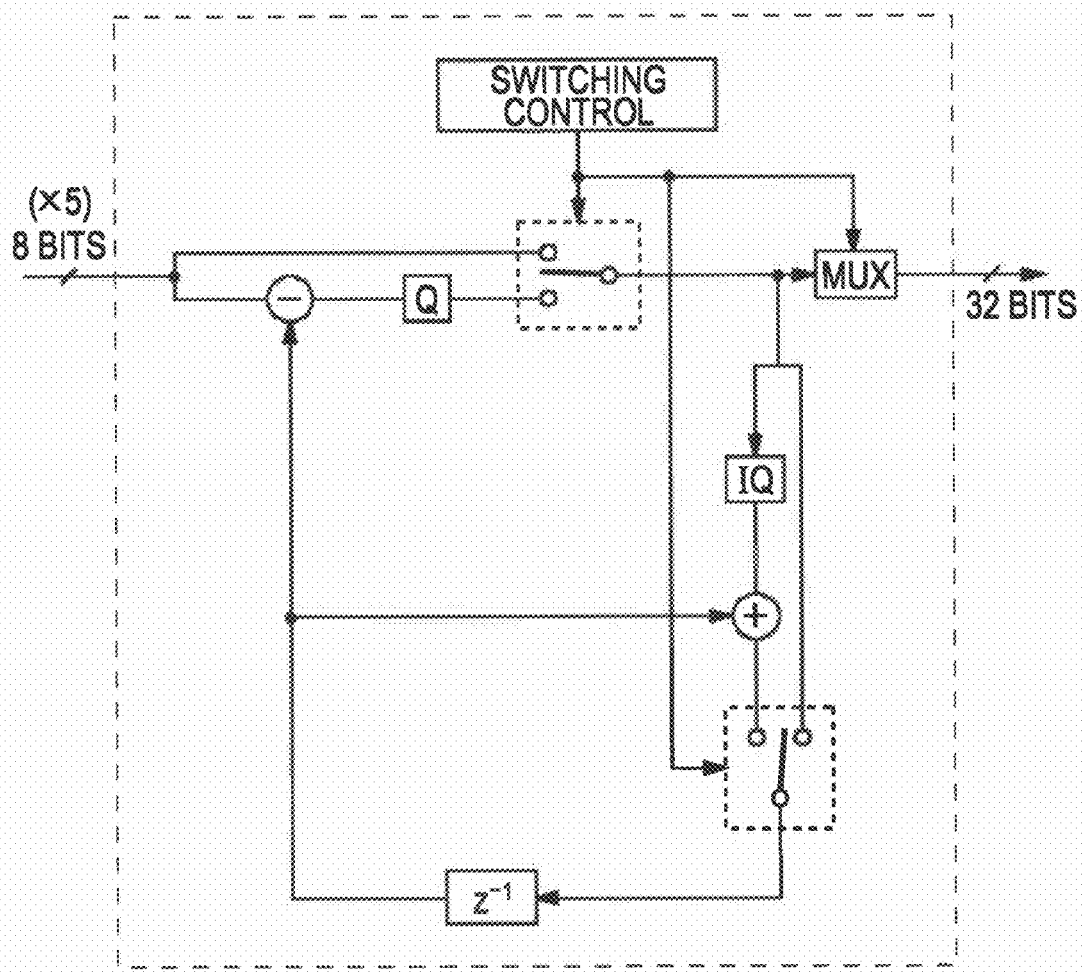
FIGS. 4A and 4B are schematic diagrams for describing the DPCM processing.
Figure 4B:
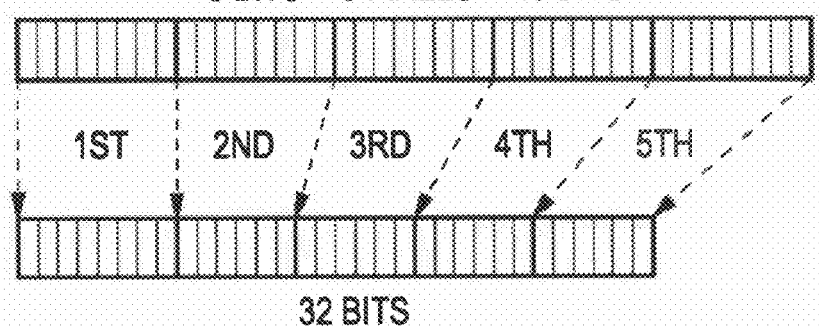
Figure 5:
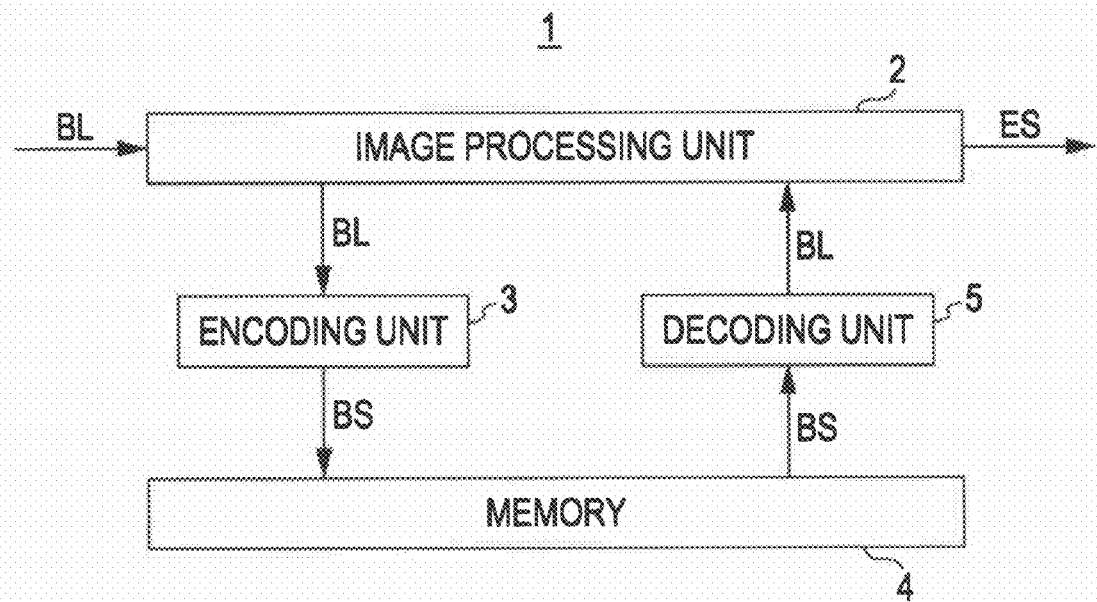
FIG. 5 is a schematic diagram illustrating the whole configuration of an image processing apparatus according to the present embodiment.

Hereinafter, an embodiment of the present invention will be described with reference to the drawings. Note that description will be made in the following sequence.
1. Embodiment (Details of Encoding Method)
2. Other Embodiments

1. Embodiment 1-1. Configuration of Image Processing Apparatus

Item 1 indicates an image processing apparatus as a whole. Note that the portions corresponding to the related art shown in FIGS. 1 through 4B are denoted with the same reference numerals.

An image processing unit 2 subjects image data BL supplied externally to various types of image processing such as encoding processing, editing processing, or the like to generate a processing stream ES, and supplies this to an external device which is not shown.

The image processing unit 2 supplies image data BL to be referenced later in an encoding unit 3 at the time of image processing. The encoding unit 3 subjects the image data BL to encoding processing (the details will be described later) to generate a bit stream BS, and supplies this to memory 4. Here, the memory 4 is configured so as to read out and write the image data BL in increments of bus transfer (e.g., 128 bytes).

Figure 6:
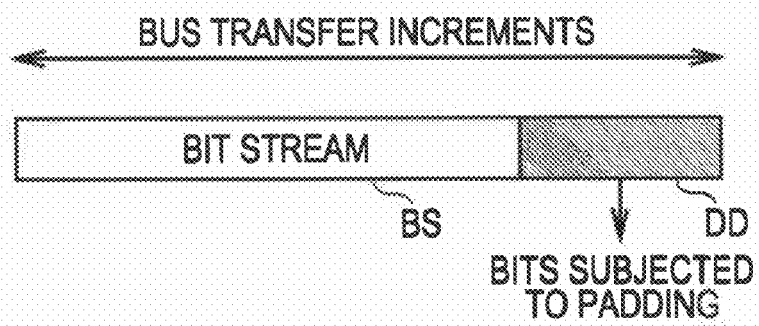
FIG. 6 is a flowchart illustrating an image data temporary storage processing procedure.

As shown in FIG. 6, if we say that the encoding unit 3 supplies the bit stream BS less than bus transfer increments to the memory 4, dummy data DD is padded to the bit stream BS. In other words, the encoding unit 3 consumes the band of the bus and the storage capacity of the memory 4 just for an amount equivalent to that of the dummy data DD.

The encoding unit 3 encodes the image data BL for each processing block made up of M×N pixels to generate a bit stream BS, and supplies this to the memory 4. Thus, with the encoding unit 3, the data amount of the bit stream BS can be reduced by encoding, whereby the storage capacity of the memory 4 can be set so as to be small.

At this time, the encoding unit 3 continues a code block made up of the same code amount as the bus transfer increments, thereby generating a bit stream BS. Thus, the encoding unit 3 can transfer the bit stream BS for each code block made up of the same code amount as the bus transfer increments, whereby the bus band can be used effectively at a maximum.

As a result thereof, a code block is stored in the memory 4 for each region where reading out and writing is executed. Thus, with the encoding unit 3, the storage capacity of the memory 4 is not wastefully consumed, so the storage capacity of the memory 4 can be set so as to be small.

Subsequently, the image processing unit 2 receives the image data BL from the memory 4 via a decoding unit 5. At this time, the decoding unit 5 decodes the bit stream BS supplied for each code block, and supplies this to the image processing unit 2.

That is to say, such as shown in FIG. 7, when temporarily storing the image data BL to be referenced, the image processing apparatus 1 executes image data temporary storage processing in accordance with an image data temporary storage processing procedure RT1.

Upon starting the image data temporary storage processing procedure RT1, the image processing apparatus 1 proceeds to step SP1, and upon encoding the image data BL supplied from the image processing unit 2 for each processing block to generate a bit stream BS where code blocks are continued, proceeds to the next step SP2.

In step SP2, upon transmitting the bit stream BS to the decoding unit 5 via the memory 4 and a network such as the bus or the like for each code block, the image processing apparatus 1 proceeds to the next step SP3.

In step SP3, upon generating image data BL for each processing block by decoding the bit stream BS for each code block, and supplying this to the image processing unit 2, the image processing apparatus 1 proceeds to the end step to end the image data temporary storage processing procedure RT1.

Thus, the image processing apparatus 1 can reduce the data amount of the bit stream BS while using the bus band and the storage capacity of the memory 4 effectively.

1-2. Brief Outline of Encoding Unit

FIG. 8 illustrates the configuration of the encoding unit 3. The encoding unit 3 encodes the supplied image data BL for each processing block, thereby generating a bit stream BS where code blocks made up of a fixed code amount (bus transfer increments) are continued.

Specifically, upon the image data BL being supplied, the encoding unit 3 supplies this image data BL to the signal conversion unit 31. The signal conversion unit 31 separates the image data BL for each processing block made up of M×N pixels. Further, the signal conversion unit 31 generates a luminance signal PY (e.g., Y signal) and color difference signals PVU (e.g., V signal and U signal) from the image data BL made up of this processing block.

At this time, in the case that the image data BL where the luminance signal PY and the color difference signals PVU are multiplexed is supplied, the signal conversion unit 31 simply breaks the image data BL down into the luminance signal PY and the color difference signals PVU. Also, in the case that the image data BL is a signal representing color space such as a RGB signal, the signal conversion unit 31 generates the luminance signal PY and the color difference signals PVU from this image data BL by color space processing. Also, the signal conversion unit 31 executes sub sampling processing such as converting the image data BL made up of the 4:4:4 method into 4:2:2 method, for example.

Subsequently, the signal conversion unit 31 supplies the color difference signals PVU to the signal analyzing unit 32 and color difference signal encoding unit 33 while supplying the luminance signal PY to the signal analyzing unit 32 and the luminance signal encoding unit 34.

The signal analyzing unit 32 analyzes the luminance signal PY and the color difference signals PVU supplied from the signal conversion unit 31 to generate an encoding difficulty level ID representing a compression difficulty level according to encoding of color specification information IE representing whether or not the image data BL is an image including a great number of conspicuous particular colors, and the image data BL. The signal analyzing unit 32 supplies the encoding difficulty level ID to the color difference signal encoding unit 33 and the luminance signal encoding unit 34 while supplying the color specification information IE to the color difference signal encoding unit 33 and the color difference signal encoding mode reselecting unit 35. Note that the detailed configuration of the signal analyzing unit 32 will be described later.

The color difference signal encoding unit 33 encodes the color difference signals PVU supplied from the signal conversion unit 31 partially using DPCM (Differential Pulse Code Modulation) method. Here, the color difference signal encoding unit 33 has two color difference encoding modes (high-compression mode having a relatively high compression ratio, and low-compression mode having a relatively low compression ratio). The color difference signal encoding unit 33 generates two color difference signal bit streams BSc (color difference high-compression bit stream BSc1 and color difference low-compression bit stream BSc2) according to the two color difference signal encoding modes, and supplies these to the color difference signal encoding mode reselecting unit 35.

Further, the color difference signal encoding unit 33 selects one color difference signal encoding mode from the encoding difficulty level ID of the image data BL, and the image quality of the color difference high-compression bit stream BSc1 and the color difference low-compression bit stream BSc2, as the selected color difference mode. At this time, in the event that the image data BL includes a great number of particular colors, the color difference signal encoding unit 33 selects the low-compression mode, thereby preventing image quality from deteriorating.

The color difference signal encoding unit 33 calculates the code amount of the color difference signal bit stream BSc (hereafter, referred to as "selected color difference signal bit stream BScS") generated with the selected color difference mode as a color difference signal use bit count IBc, and supplies this to the luminance signal encoding unit 34. Note that the detailed configuration of the color difference signal encoding unit 33 will be described later.

The luminance signal encoding unit 34 uses the color difference signal use bit count IBs supplied from the color difference signal encoding unit 33, and the encoding difficulty level ID supplied from the signal analyzing unit 32, thereby generating a luminance signal bit stream BSy while adjusting the code amount. That is to say, the luminance signal encoding unit 34 adjusts the code amount of the luminance signal bit stream BSy such that the code amount obtained by adding the code amount of the luminance signal bit stream BSy, and the code amount of the color difference signal bit stream Bsc, fits in the target code amount (i.e., 128 bytes that are the bus transfer increments).

Here, the luminance signal encoding unit 34 has a post quantizing mode as a luminance signal encoding mode in addition to the high-compression mode and low-compression mode similar to the color difference signal encoding mode. This post quantizing mode is a mode wherein the bit planes according to the code amount are discarded, thereby encoding the luminance signal PY of which the code amount is approximate to the target code amount.

The luminance signal encoding unit 34 selects one luminance signal encoding mode wherein the image quality is the best from the three luminance code signal encoding modes, as the selected luminance mode. The luminance signal encoding unit 34 calculates the code amount of the luminance signal bit stream BSy (hereafter, referred to as "selected luminance signal bit stream BSyS") generated with the selected luminance mode, as a luminance signal use bit count IBy.

Subsequently, the luminance signal encoding unit 34 supplies the selected luminance signal bit stream BSyS to the multiplexing unit 36 while supplying the luminance signal use bit count IBy to the color difference signal encoding mode reselecting unit 35. Note that the detailed configuration of the luminance signal encoding unit 34 will be described later.

The color difference signal encoding mode reselecting unit 35 reselects the color difference signal bit stream BSc based on the luminance signal use bit count IBy supplied from the luminance signal encoding unit 34.

That is to say, the color difference signal encoding mode reselecting unit 35 reselects one of the color difference signal encoding modes wherein the image quality is the best, within a range where the code amount to which the code amount of the luminance signal bit stream BSy is added, fits in the bus transfer increments. Hereafter, the color difference signal bit stream BSc generated with the reselected color difference mode will be referred to as "reselected color difference signal bit stream BScR". Note that the detailed configuration of the color difference signal encoding mode reselecting unit 35 will be described later.

The multiplexing unit 36 multiplexes the selected luminance signal bit stream BSyS and the reselected color difference signal bit stream BScR to generate a bit stream BS made up of the code block of the fixed code amount. At this time, in the case that the code amount obtained by adding the selected luminance signal bit stream BSyS and the reselected color difference signal bit stream BScR is not the fixed code amount (transfer bus increments), the multiplexing unit 36 pads dummy data to the bit stream BS.

Here, as described above, the luminance signal bit stream BSy is generated such that the code amount obtained by adding the code amount of the luminance signal bit stream BSy and the code amount of the color difference signal bit stream BSc is generally identical to the bus transfer increments. Therefore, the multiplexing unit 36 readily generates the code block of the fixed code amount wherein the code amount is the bus transfer increments by simply adding dummy data made up of small data amount to the selected luminance signal bit stream BSyS and the reselected color difference signal bit stream BScR. That is to say, such as shown in FIG. 9, the encoding unit 3 executes an encoding processing procedure RT2 at the time of encoding the image data BL.

Upon the image data BL being supplied from the image processing unit 2, the encoding unit 3 starts the encoding processing procedure RT2, and proceeds to step SP11.

In step SP11, upon generating a luminance signal PY and color difference signals PVU from the image data BL for each processing block made up of M×N pixels, the encoding unit 3 proceeds to the next step SP12.

In step SP12, upon analyzing the luminance signal PY and the color difference signals PVU to generate an encoding difficulty level ID and color specification information IE, the encoding unit 3 proceeds to the next step SP13.

In step SP13, the encoding unit 3 encodes the image data BL with the two color difference signal encoding modes while adjusting the code amount using the encoding difficulty level ID. Subsequently, upon selecting the color difference encoding mode based on the encoding difficulty level ID and the color specification information IE, the encoding unit 3 proceeds to the next step SP14.

In step SP14, the encoding unit 3 encodes the luminance signal PY with the three luminance signal encoding modes including the post quantizing mode such that the addition value as to the selected color difference signal bit stream BScS fits in the bus transfer increments. Subsequently, upon selecting one of the luminance signal encoding modes based on the image quality, the encoding unit 3 proceeds to the next step SP15.

In step SP15, upon reselecting one of the color difference signal encoding modes wherein the image quality is the best within a range where the code amount to which the code amount of the luminance signal bit stream BSy is added fits in the range of the bus transfer increments, the encoding unit 3 proceeds to the next step SP16.

In step SP16, upon generating the code block made up of the bus transfer increments by multiplexing the reselected color difference signal bit stream BScR and the selected luminance signal bit stream BSyS, the encoding unit 3 proceeds to the end step to end the encoding processing procedure RT2.

Thus, the encoding unit 3 generates a luminance signal bit stream BSy such that the addition value added to the code amount of the selected color difference signal bit stream BScS fits in the range of the bus transfer increments. Further, the encoding unit 3 reselects the color difference signal bit stream BSc wherein the image quality is the best within a range where the addition value as to the code amount of the selected luminance signal bit stream BSyS wherein the image quality is the best fits in the bus transfer increments.

Thus, in the event that the code amount of the selected luminance signal bit stream BSyS is smaller than an assumed code amount, the encoding unit 3 can generate a bit stream BS using the color difference signal bit stream BSc wherein the image quality is better. As a result thereof, the encoding unit 3 can keep deterioration minimal in the image quality of the bit stream BS while fixing the code amount of the code block of the bit stream BS.

1-3. Configuration of Signal Analyzing Unit

Next, description will be made regarding the configuration of the signal analyzing unit 32 with reference to FIG. 10. The signal analyzing unit 32 supplies the luminance signal PY and the color difference signals PVU supplied from the signal conversion unit 31 to the encoding difficulty level computing unit 101 and the color region specifying unit 102, respectively.

The encoding difficulty level computing unit 101 generates an encoding difficulty level ID to be used for selection of the color difference signal encoding mode, and adjustment of the code amount of the color difference signal bit stream BSc and the luminance signal bit stream BSy by analyzing the luminance signal PY and the color difference signals PVU. Also, the color region specifying unit 102 generates a color specification information IE representing whether or not the image includes a great number of particular colors of which the deterioration is conspicuous by analyzing the luminance signal PY and the color difference signals PVU.

1-3-1. Generation of Encoding Difficulty Level

The color difference signal encoding unit 33 and the luminance signal encoding unit 34 have a nonlinear quantizing mode and a linear quantizing mode, according to the DPCM method, the details of which will be described later. In the nonlinear quantizing mode, nonlinear quantization is executed by representing each pixel value as the difference value between adjacent pixels. On the other hand, in the linear quantizing mode, each pixel is subjected to linear quantization.

In the nonlinear quantizing mode, the closer the image between adjacent pixels is, the smaller the difference value is, whereby deterioration in the image quality due to quantization can be reduced. Therefore, in the case that the difference value is small, the color difference signal encoding unit 33 and the luminance signal encoding unit 34 encodes each pixel using the nonlinear quantizing mode.

The encoding difficulty level computing unit 101 executes encoding difficulty level determining processing wherein an encoding difficulty level ID representing a compression difficulty level when encoding the processing block is generated based on a so-called edge wherein the difference value between adjacent pixels is great, such as the outline portion of an object, or the like. In the case that there are few edge, the image data BL can be encoded using the nonlinear quantizing mode, and accordingly, the encoding difficulty level computing unit 101 determines that the encoding difficulty level is low. On the other hand, in the case that there are many edges, upon encoding the image data BL using the nonlinear quantizing mode, deterioration in the image quality is caused, and accordingly, the encoding difficulty level computing unit 101 determines that the encoding difficulty level is high.

That is to say, the code amount of the color difference signal bit stream BSc and the luminance signal bit stream BSy can be predicted based on the difference value between pixels. Note that, in order to readily understand explanation, description will be made regarding a processing block made up of M×1 with M×N pixels as N=1, but the present invention is not restricted to this.

Specifically, such as shown in FIG. 11, the encoding difficulty level computing unit 101 calculates the difference value between adjacent pixels from the center pixel (M/2'th) of the luminance signal PY of the processing block toward both ends. Thus, the difference values are calculated from the center pixel, whereby the difference values can be calculated toward the two directions, and accordingly, parallelization of hardware such as a difference calculator or the like can be performed.

Also, the number of pixels up to the pixel of which the difference value is calculated last from a pixel serving as a reference can be reduced to around a half as compared to the case of calculating the difference values from one end, whereby propagation of the errors of the difference values can be reduced small.

The encoding difficulty level computing unit 101 detects a pixel having a difference value of which the absolute value is greater than an edge detection threshold Th0, as an edge, and also determines the encoding difficulty level based on the sizes and number of edges included in the processing block.

That is to say, the encoding difficulty level computing unit 101 determines, based on the size of the average value of the absolute values of the difference values (hereafter, referred to as edge difference values) corresponding to the detected edges, the sizes of the edges. Also, the encoding difficulty level computing unit 101 calculates the number of the edges of the processing block.

In the case that the average value of the edge difference values is less than an edge size threshold Th1, the edge difference values are small values averagely, and are low in the encoding difficulty level, and accordingly, the encoding difficulty level computing unit 101 generates an encoding difficulty level ID representing "low".

Also, in the case that the average value of the edge difference values is greater than the edge size threshold Th1, and also the number of the edges is greater than a number-of-edges threshold Th2, the difficulty due to encoding is high, and accordingly, the encoding difficulty level computing unit 101 generates an encoding difficulty level ID representing "high".

Further, in the case that the average value of the edge difference values is greater than the edge size threshold Th1, and also the number of the edges is smaller than the number-of-edges threshold Th2, further the encoding difficulty level computing unit 101 determines the encoding difficulty level using the number of the edges of the color difference signals PVU.

That is to say, the encoding difficulty level computing unit 101 calculates the difference value between adjacent pixels from the centers of the U signal and V signal toward both ends, of the color difference signals PVU. Subsequently, the encoding difficulty level computing unit 101 detects a pixel having a difference value of which the absolute value is greater than an edge detection threshold Th3, as an edge.

Subsequently, in the case that the number of the edges of the color difference signals PVU is greater than a number-of-edges threshold Th4, the encoding difficulty level computing unit 101 determines that the encoding difficulty level is high, and generates an encoding difficulty level ID representing "high". On the other hand, in the case that the number of the edges is less than the number-of-edges threshold Th4, the encoding difficulty level computing unit 101 determines that the encoding difficulty level is low, and generates an encoding difficulty level ID representing "low".

Thus, the encoding difficulty level computing unit 101 first determines, based on the edges of the luminance signal PY, the encoding difficulty as to the luminance signal, and in the case of having difficulty in determining, the encoding difficulty level computing unit 101 determines the encoding difficulty level based on the edges of the color difference signals PVU. That is to say, the encoding difficulty level ID principally represents the encoding difficulty level as to the luminance signal PY, and can represent the difficulty level of the color difference signals PVU only in the case that the encoding difficulty level of the luminance signal PY is an intermediate gray zone.

Next, description will be made regarding an encoding difficulty level determining processing procedure RT3 to be executed at the time of generating an encoding difficulty level ID, with reference to the flowchart in FIG. 12.

Upon the luminance signal PY and the color difference signals PVU being supplied, the encoding difficulty level computing unit 101 proceeds to step SP101.

In step SP101, upon calculating the difference values from the luminance signal PY, and also detecting a pixel wherein the absolute value of this difference value is greater than the edge detection threshold Th0 as an edge, the encoding difficulty level computing unit 101 proceeds to the next step SP102.

In step SP102, the encoding difficulty level computing unit 101 determines regarding whether or not the average value of the edge difference values is less than the edge size threshold Th1. Here, upon obtaining a positive result, this represents that the edge difference values are not markedly greater values, and accordingly, the difficulty due to encoding is low. At this time, the encoding difficulty level computing unit 101 proceeds to the next step SP107.

On the other hand, in the case of having obtained a negative result in step SP102, this represents that there is a possibility that the difficulty due to encoding may be high, at this time, the encoding difficulty level computing unit 101 proceeds to the next step SP104.

In step SP104, the encoding difficulty level computing unit 101 determines whether or not the number of the edges of the luminance signal PY is less than the number-of-edges threshold Th2. Here, in the case of having obtained a negative result, this represents that the average value of the edge difference values is great, and also the number of the edges itself is great, and accordingly, the encoding difficulty is high. At this time, the encoding difficulty level computing unit 101 proceeds to the next step SP108.

On the other hand, in step SP104, in the case of having obtained a positive result, this represents that though the luminance signal PY includes a pixel made up of a great edge difference value, the number of such pixels is not so great, and accordingly, the encoding difficulty level is an intermediate level (neither high nor low). At this time, the encoding difficulty level computing unit 101 proceeds to the next step SP105.

In step SP105, upon calculating a difference value from the color difference signals PVU, and also detecting a pixel wherein the absolute value of this difference value is greater than the edge detection threshold Th3, as an edge, the encoding difficulty level computing unit 101 proceeds to the next step SP106.

In step SP106, the encoding difficulty level computing unit 101 determines whether or not the number of the edges of the color difference signals PVU is less than the number-of-edges threshold Th4. Here, in the case of having obtained a positive result, this represents that though the encoding difficulty as to the luminance signal PY is an intermediate level, the encoding difficulty as to the color difference signals PVU is high. At this time, the encoding difficulty level computing unit 101 proceeds to the next step SP107.

On the other hand, in step SP108, in the case of having obtained a negative result, this represents that though the encoding difficulty as to the luminance signal PY is an intermediate level, the encoding difficulty as to the color difference signals PVU is low. At this time, the encoding difficulty level computing unit 101 proceeds to the next step SP108.

In step SP107, upon generating an encoding difficulty level ID representing that the encoding difficulty is low, the encoding difficulty level computing unit 101 proceeds to the end step to end the encoding difficulty level determining processing procedure RT3.

Also, in step SP108, upon generating an encoding difficulty level ID representing that the encoding difficulty is high, the encoding difficulty level computing unit 101 proceeds to the end step to end the encoding difficulty level determining processing procedure RT3.

Thus, the encoding difficulty level computing unit 101 principally generates an encoding difficulty level ID representing the encoding difficulty as to the luminance signal PY, and representing the difficulty level of the color difference signals PVU only in the case that the encoding difficulty level of the luminance signal PY is an intermediate gray zone.

1-3-2. Generation of Color Specification Information

The color region specifying unit 102 analyzes the luminance signal PY and the color difference signals PVU by particular color block determining processing to determine whether or not the processing block is an image including a great number of particular colors regarding which deterioration is visibly conspicuous.

Figure 13:
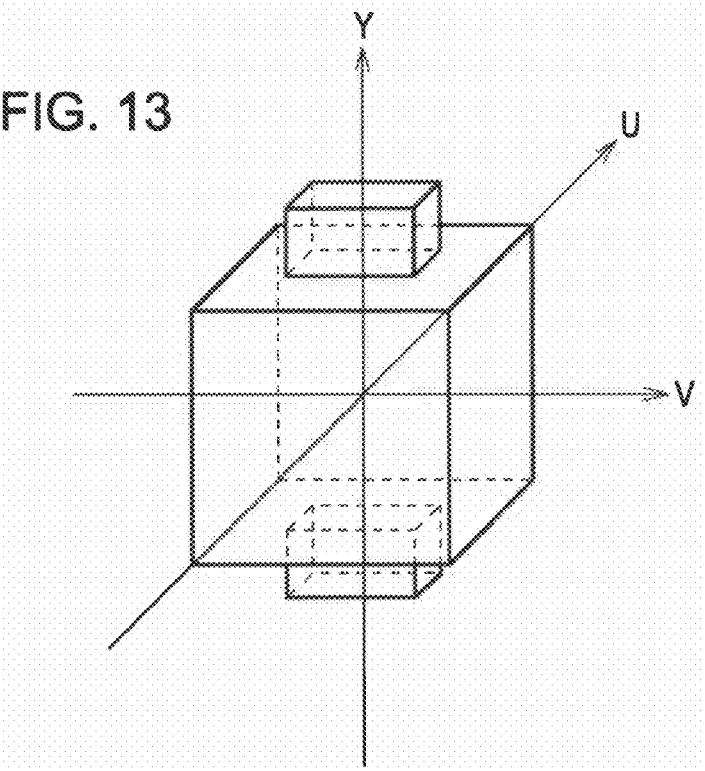
FIG. 13 is a schematic diagram illustrating a color specification region.

That is to say, the color region specifying unit 102 defines a color regarding which the deterioration is visibly conspicuous (hereafter, referred to as "particular color"). For example, such as shown in FIG. 13, the coordinates are made up of values on three axes of the Y signal, V signal, and U signal. The color region specifying unit 102 defines the region of a signal value including a particular color (hereafter, referred to as "color specification region") using a combination of multiple cubes and rectangular parallelepipeds. A pixel included in this color specification region is determined to be a particular color.

The color region specifying unit 102 determines whether or not each pixel is a particular color by determining whether or not each pixel of the processing block is included in the color specification region according to a combination of the luminance signal PY and the color difference signals PVU. In the case that the number of pixels determined to be a particular color within the processing block is greater than a particular color block threshold Th5, the color region specifying unit 102 determines that this processing block is a particular color block that is an image of which the deterioration is visibly conspicuous.

Figure 14:
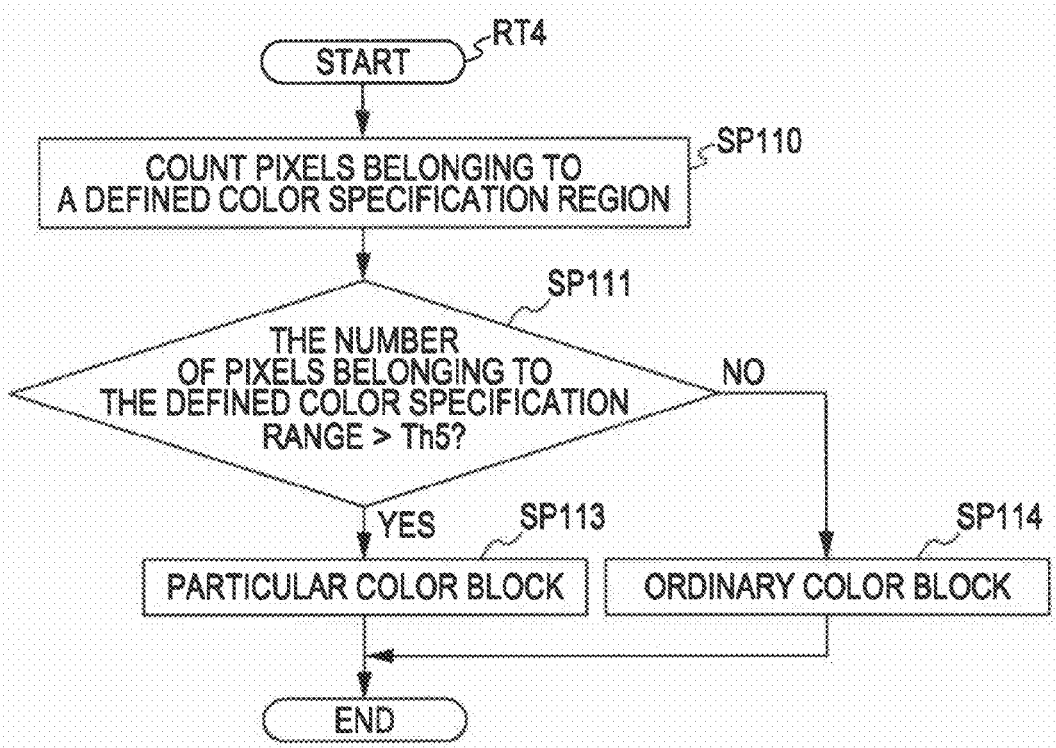
FIG. 14 is a flowchart for describing a particular color block determining processing procedure.

Next, the particular color block determining processing procedure RT4 will be described with reference to the flowchart shown in FIG. 14. Upon the luminance signal PY and the color difference signals PVU being supplied, the color region specifying unit 102 starts the particular color block determining processing procedure RT4, and proceeds to the next step SP110.

In step SP110, upon counting the number of pixels belonging to a predetermined color specification region according to a combination of the luminance signal PY and the color difference signals PVU, the color region specifying unit 102 proceeds to the next step SP111.

In step SP111, the color region specifying unit 102 determines whether or not the number of pixels belonging to the color specification region is greater than the particular color block threshold Th5. Here, in the case of having obtained a positive result, this represents that the processing block includes a great number of particular colors, and is a particular color block. At this time, the color region specifying unit 102 proceeds to the next step SP113.

In step SP113, upon generating a color specification information IE representing that the processing block is a particular color block, the color region specifying unit 102 proceeds to the end step to end the processing.

On the other hand, in step SP111, in the case of having obtained a negative result, this represents that the processing block does not include a great number of particular colors, and is not a particular color block. At this time, the color region specifying unit 102 proceeds to the next step SP114.

In step SP114, upon generating a color specification information IE representing that the processing block is not a particular color block, the color region specifying unit 102 proceeds to the end step to end the processing.

Thus, the color region specifying unit 102 determines whether or not the processing block is a particular color block that is an image including a great number of particular colors regarding which the deterioration is visibly conspicuous, and generates a color specification information IE. Thus, the color specification information IE can represent whether or not the processing block is a particular color block.

1-4. Configuration of Color Difference Signal Encoding Unit

Figure 15:
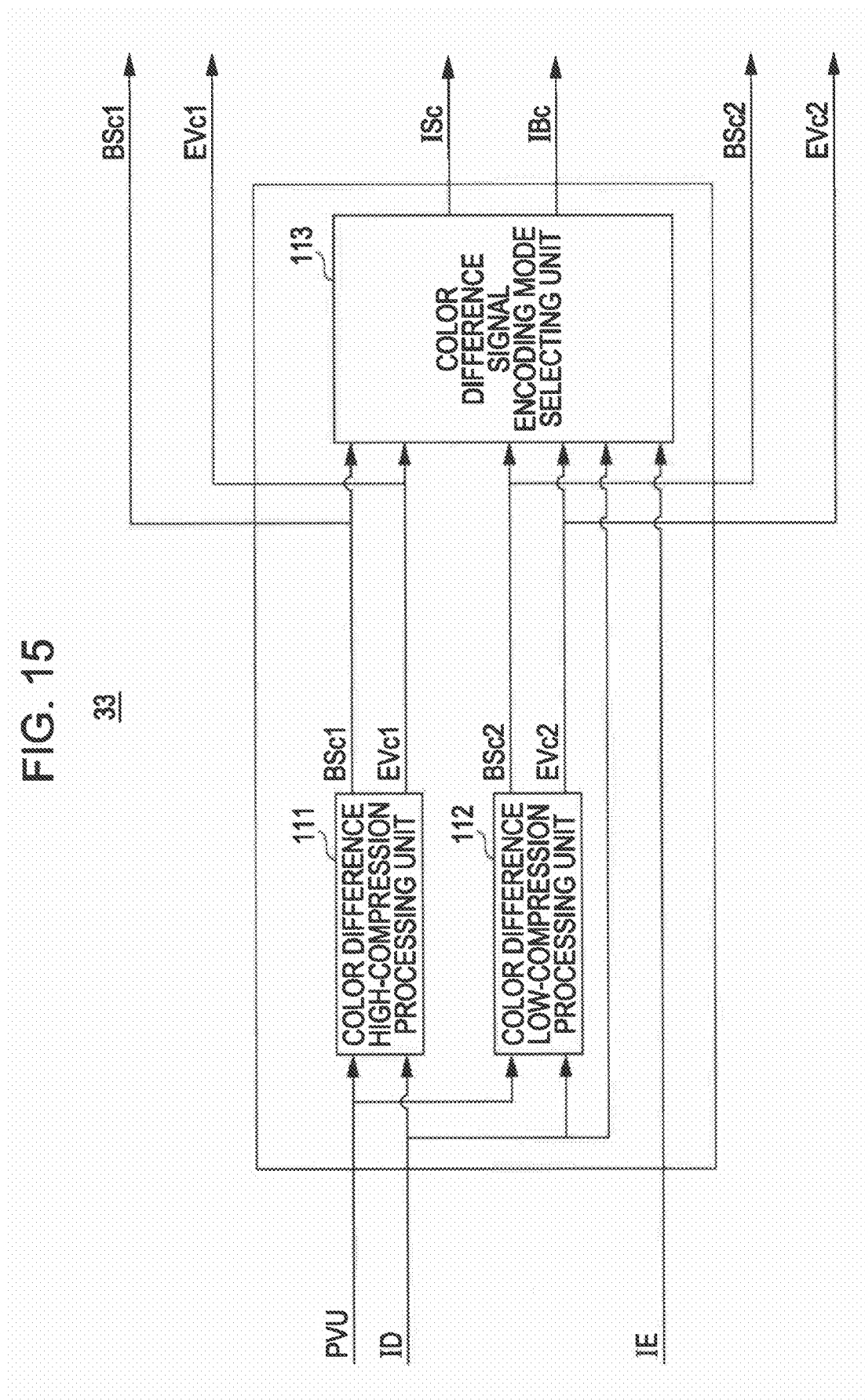
FIG. 15 is a schematic diagram illustrating the configuration of a color difference signal encoding unit.

Next, the configuration of the color difference signal encoding unit 33 will be described. Such as shown in FIG. 15, the color difference signal encoding unit 33 encodes the color difference signals PVU using two color difference signal encoding modes by the color difference high-compression processing unit 111 and the color difference low-compression processing unit 112 to generate two color difference signal bit streams BSc. The color difference signal encoding unit 33 selects one of the color difference signal encoding modes from these two color difference signal bit streams BSc (color difference high-compression bit stream BSc1 and color difference low-compression bit stream BSc2) by the color difference signal encoding mode selecting unit 113.

1-4-1. Color Difference Signal Encoding Processing

Figure 16:
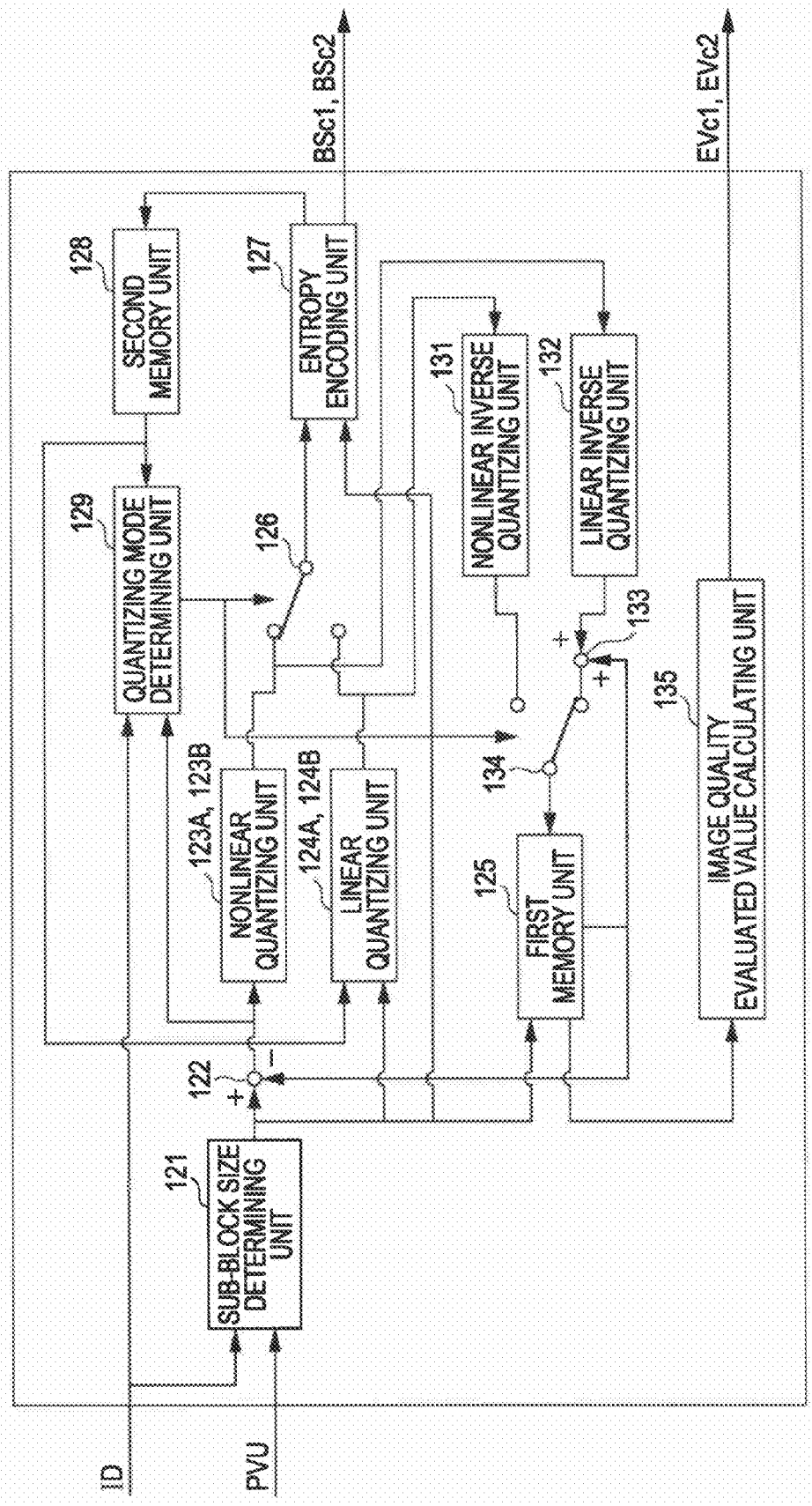
FIG. 16 is a schematic diagram illustrating the configuration of a color difference high-compression processing unit and a color difference low-compression processing unit.

FIG. 16 illustrates the configuration of the color difference high-compression processing unit 111 and the color difference low-compression processing unit 112. The color difference high-compression processing unit 111 and the color difference low-compression processing unit 112 have generally the same configuration.

First, the color difference signal encoding processing that the color difference high-compression processing unit 111 executes will be described, and description regarding the color difference low-compression processing unit 112 which execute the same processing will be omitted. The different points between the color difference high-compression processing unit 111 and the color difference low-compression processing unit 112 will be described later.

1-4-1-1. Color Difference Encoding Processing

The color difference high-compression processing unit 111 encodes the color difference signals PVU to be supplied for each processing block made up of M×N pixels, thereby generating a color difference high-compression bit stream BSc1.

The color difference high-compression processing unit 111 supplies the encoding difficulty level ID supplied from the signal analyzing unit 32, and the color difference signals PVU supplied from the signal conversion unit 31 to a sub-block size determining unit 121.

The sub-block size determining unit 121 divides the color difference signals PVU for each processing block into the sub-block size corresponding to the encoding difficulty level ID. Here, as described above, the encoding difficulty level ID principally represents the encoding difficulty level as to the luminance signal PY, and represents the difficulty level as to the color difference signals PVU only in the case that the encoding difficulty level of the luminance signal PY is an intermediate gray zone.

Here, in the case that the sizes of the sub-blocks are set so as to be small, and the number thereof is increased, the sub-block size determining unit 121 can apply a suitable nonlinear table or quantizing coefficient to the nonlinear quantization processing and the linear quantization processing (the details will be described later) executed for each sub-block, whereby the image quality can be improved. However, in the case that the number of the sub-blocks is increased, the sub-block size determining unit 121 increases the information of the used table and quantizing coefficient, and increases the code amount.

On the other hand, in the case that the sizes of the sub-blocks are increased, and the number thereof is reduced, the sub-block size determining unit 121 has difficulty in applying a suitable nonlinear table or quantizing coefficient, and accordingly, the image quality deteriorates. However, in the case that the number of the sub-blocks is reduced, the sub-block size determining unit 121 can reduce the information of the used table and quantizing coefficient, and accordingly, the code amount can be reduced.

The color difference high-compression bit stream BSc1 generated in the processing block is combined with the luminance signal bit stream BSy to be generated later in the processing block, and a code block made up of the fixed code amount (bus transfer increments) is generated.

In the case that the encoding difficulty level ID is high, the sub-block size determining unit 121 generates few sub-blocks by increasing the sizes of the sub-blocks. In the case of predicting that the encoding difficulty of the luminance signal PY is high, the sub-block size determining unit 121 assigns a great code amount as to the luminance signal PY while suppressing the code amount of the color difference high-compression bit stream BSc1. As a result thereof, the sub-block size determining unit 121 can prevent deterioration of the image quality due to deterioration in the luminance signal PY.

Also, in the case of predicting that the encoding difficulty level of the luminance signal PY is intermediate, and also the encoding difficulty level of the color difference signals PVU is high, the sub-block size determining unit 121 can prevent the code amount of the color difference high-compression bit stream BSc1 from being increased.

Also, in the case that the encoding difficulty level ID is low, the sub-block size determining unit 121 generates a great number of sub-blocks by reducing the sizes of the sub-blocks. In the case of predicting that the encoding difficulty level of the luminance signal PY is low, the sub-block size determining unit 121 can assign a relatively great code amount to the color difference high-compression bit stream BSc1, and can prevent deterioration in the image quality due to deterioration in the color difference signals PVU.

Further, in the case of predicting that the encoding difficulty level of the luminance signal PY is intermediate, and also the encoding difficulty level of the color difference signals PVU is low, the sub-block size determining unit 121 can prevent deterioration in the image quality in a sure manner by assigning an even greater code amount to the luminance signal bit stream BSy.

Specifically, the sub-block size determining unit 121 has a number-of-blocks assigning table wherein the number of the sub-blocks are assigned according to the level of the encoding difficulty level ID. The sub-block size determining unit 121 selects the number of the sub-blocks from the number-of-blocks assigning table according to the level of the encoding difficulty level ID, and divides the color difference signals PVU into sub-blocks.

Subsequently, the sub-block size determining unit 121 supplies the color difference signals PVU for each sub-block to a subtractor 122 and a first memory unit 125. As a result thereof, the color difference signals PVU are sequentially stored in the first memory unit 125.

The color difference signals PVU from the sub-block size determining unit 121, and the color difference signals PVU processed last (i.e., of the adjacent pixel) from a switching unit 134 (hereafter, referred to as "local color difference signal LVU") are supplied to the subtractor 122.

The subtractor 122 generates a difference value by subtracting the local color difference signals LVU from the color difference signals PVU, and supplies this to a nonlinear quantizing unit 123A and a quantizing mode determining unit 129.

Note that, in the case that the color difference signals PVU are the first pixel of the processing block, a difference value is not generated. In this case, the sub-block size determining unit 121 also supplies the color difference signals PVU to an entropy encoding unit 127. That is to say, the color difference signals PVU of the first pixel of the processing block are supplied to the entropy encoding unit 127 without change.

Here, the color difference high-compression processing unit 111 includes the nonlinear quantizing unit 123A and a linear quantizing unit 124A. The nonlinear quantizing unit 123A generates a nonlinear quantized value using the nonlinear quantizing mode by quantizing the difference value supplied from the subtractor 122. In the nonlinear quantizing mode, the code amount can be reduced, but the image quality deteriorates.

On the other hand, the linear quantizing unit 124A generates a linear quantized value using the linear quantizing mode by quantizing the color difference values PVU supplied from the sub-block size determining unit 121 without change. In the linear quantizing mode, though the image quality can be improved as compared to the nonlinear quantizing mode, the code amount increases. Subsequently, one quantizing mode is selected from the linear quantizing mode and the nonlinear quantizing mode, and entropy encoding is executed.

Figure 17A:
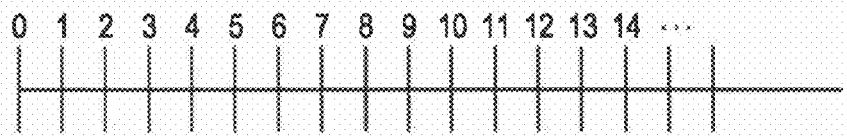
FIGS. 17A through 17E are schematic diagrams illustrating a nonlinear table.
Figure 17B:
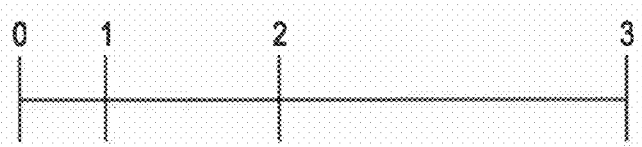
Figure 17C:
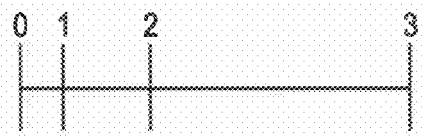

Specifically, the nonlinear quantizing unit 123A includes multiple nonlinear tables wherein the maximum value of quantized bits obtained by quantizing the difference values is a small value ("3" in the drawing), such as shown in FIGS. 17B and 17C, as a nonlinear table used for quantization.

The nonlinear quantizing unit 123A selects, such as shown in FIG. 17A, a nonlinear table to be used such that the maximum value of the difference values of the sub-block (hereafter, referred to as "difference maximum value") is assigned to the maximum quantized bit included in the nonlinear table.

For example, in the case that the difference maximum value is "13", the nonlinear quantizing unit 123A selects FIG. 17B as a nonlinear table. Also, in the case that the difference maximum value is "9", the nonlinear quantizing unit 123A selects FIG. 17C as a nonlinear table.

Thus, the nonlinear quantizing unit 123A can use the nonlinear table corresponding to the difference value included in the sub-block, whereby deterioration in the image quality due to quantization is prevented by reducing the number of quantized bits to be assigned to a greater value than the difference maximum value.

Subsequently, the nonlinear quantizing unit 123A adds a nonlinear table identifier representing the nonlinear table used for each sub-block.

Also, the color difference signals PVU are supplied to the linear quantizing unit 124A without change. The linear quantizing unit 124A calculates the remaining code amount allowed for the sub-block to be encoded from now by monitoring a second memory unit 128 where the encoded sub-block is stored.

That is to say, the linear quantizing unit 124A determines quantization precision (i.e., the number of bits of the linear quantized value subjected to quantization) according to the remaining code amount obtained by subtracting the code amount actually generated for each sub-block from the color difference target code amount set based on the encoding difficulty level ID. Subsequently, the linear quantizing unit 124A subjects the color difference signals PVU to linear quantization using the determined quantization precision, and adds a quantization precision identifier representing quantization precision to the generated linear quantized value.

The quantizing mode determining unit 129 executes quantizing mode selecting processing wherein one quantizing mode is selected from the nonlinear quantizing mode and the linear quantizing mode. Hereafter, the selected nonlinear quantizing mode or the selected linear quantizing mode will be referred to as the selected quantizing mode.

The quantizing mode determining unit 129 controls a switching unit 126 so as to transmit the quantized value generated with the selected quantizing mode (hereafter, referred to as "selected quantized value") to the entropy encoding unit 127.

The entropy encoding unit 127 subjects the selected quantized value to entropy encoding using a VLC (Variable Length Coding) table to generate a color difference high-compression bit stream BSc1. Subsequently, the entropy encoding unit 127 supplies the color difference high-compression bit stream BSc1 to the second memory unit 128 and the color difference signal encoding mode selecting unit 113. As a result thereof, the color difference high-compression bit stream BSc1 is stored in the second memory unit 128.

Also, the color difference high-compression processing unit 111 subjects the selected quantized value to local decoding to generate a local color difference signals LVU. The color difference high-compression processing unit 111 uses the local color difference signals LVU as the color difference signals PVU corresponding to the last pixel to calculate a difference value. Also, the color difference high-compression processing unit 111 calculates a color difference image quality evaluated value EVc1 representing how much the selected quantized value deteriorates by comparing the original color difference signals PVU and the local color difference signals LVU.

Specifically, the nonlinear quantized value and the linear quantized value are supplied to a nonlinear inverse quantizing unit 131 and a linear inverse quantizing unit 132, respectively. The linear inverse quantizing unit 132 subjects the linear quantized value to linear inverse quantization with precision represented by the quantization precision identifier to generate local color difference signals LVU.

The nonlinear inverse quantizing unit 131 subjects the nonlinear quantized value to nonlinear inverse quantization using the nonlinear table represented by the nonlinear table identifier to generate a difference value, and supplies this to an adder 133. The adder 133 adds the difference value to the local color difference signals LVU before being supplied from the first memory unit 125 to generate local color difference signals LVU. At this time, the nonlinear inverse quantizing unit 131 supplies the local color difference signals LVU to the subtractor 122.

The switching unit 134 supplies the local color difference signals PVU generated by subjecting the selected quantized value to inverse quantization, to the first memory unit 125, under the control of the quantizing mode determining unit 129.

As a result thereof, the color difference signals PVU supplied from the sub-block size determining unit 121 as appropriate, and the local color difference signals LVU obtained by decoding the selected quantized value, are stored in the first memory unit 125.

Upon all of the local color difference signals LVU as to the color difference signals PVU made up of the processing block being generated, an image quality evaluated value calculating unit 135 calculates a color difference image quality evaluated value EVc1 representing the degree of image quality deterioration of the local color difference signals LVU as to the color difference signals PVU, and supplies this to the color difference signal encoding mode selecting unit 113. The image quality evaluated value calculating unit 135 can calculate, for example, a mean square error (MSE) as the color difference image quality evaluated value EVc1.

Here, the color difference signal encoding unit 33 sets the number of sub-blocks to be variable by the sub-block size determining unit 121, thereby adjusting the code amount of the color difference high-compression bit stream BSc1 so as not to exceed the color difference target code amount corresponding to the encoding difficulty level ID.

However, the color difference signal encoding unit 33 executes variable length encoding by the entropy encoding unit 127, and accordingly, the code amount of the color difference high-compression bit stream BSc is not readily controlled only with the number of sub-blocks.

Therefore, the color difference signal encoding unit 33 monitors the code amount of the actually encoded sub-block using the quantizing mode determining unit 129, and switches the nonlinear quantizing mode and the linear quantizing mode for each sub-block according to that code amount. Thus, the color difference signal encoding unit 33 executes control such that the color difference high-compression bit stream BSc1 does not exceed the code amount according to the encoding difficulty level ID for each processing block.

The quantizing mode determining unit 129 executes, based on the encoding difficulty level ID, and the code amount of the actually encoded color difference high-compression bit stream BSc1, the quantizing mode selecting processing wherein one quantizing mode is selected from the nonlinear quantizing mode and the linear quantizing mode as the selected quantizing mode.

The quantizing mode determining unit 129 executes the quantizing mode selecting processing by monitoring the code amount of the color difference high-compression bit stream BSc1 for each sub-block by confirming the second memory unit 128. Thus, the quantizing mode determining unit 129 adjusts the code amount of the color difference high-compression bit stream BSc1 to be actually generated.

Specifically, the quantizing mode determining unit 129 operates so as to satisfy the following features to generate a color difference high-compression bit stream BSc1 with a few code amount while maintaining the image quality.

(1) In the case that the difference maximum value of the color difference signals PVU of the sub-block is small, deterioration in the image quality is small even in the case of using the nonlinear quantizing mode. Therefore, in the case that the difference maximum value of the color difference signals PVU is small, the quantizing mode determining unit 129 reduces the code amount by selecting the nonlinear quantizing mode.

(2) In the case that the encoding difficulty level ID represents "high", prediction is made that deterioration in the image quality due to the nonlinear quantizing mode is great with the luminance signal PY to be encoded from now, so the linear quantizing mode wherein the code amount increases has to be used. Also, with the color difference signals PVU, there are many sub-blocks whereby the nonlinear quantizing mode is not selected due to (1), there is a possibility that the linear quantizing mode may be frequently used, and the code amount of the color difference signal bit stream BSc may exceed the assumption. Therefore, the quantizing mode determining unit 129 uses the nonlinear quantizing mode to assign the code amount to the luminance signal bit stream BSy in a sure manner. In other words, in the case that the encoding difficulty level ID represents "high", the nonlinear quantizing mode is used constantly.

(3) In the case that the difference maximum value of the color difference signals PVU of the sub-block is great, and also the encoding difficulty level ID represents "low", while assignment of the code amount of the color difference signal bit stream BSc has leeway, deterioration in the image quality due to the nonlinear quantizing mode is great. Therefore, the quantizing mode determining unit 129 selects the linear quantizing mode whereby the image quality can be maintained.

(4) In the case that the code amount that can be assigned to the color difference signal bit stream BSc of the processing block is insufficient, the code amount is prioritized. That is to say, even in the case that the linear quantizing mode should be selected in (3), the quantizing mode determining unit 129 selects the nonlinear quantizing mode.

That is to say, the quantizing mode determining unit 129 sets it as a first priority to assign a sufficient code amount to the luminance signal bit stream BSy, and reduces the code amount of the color difference high-compression bit stream BSc using the nonlinear quantizing mode as less as possible. Subsequently, only in the case that there is a remaining code amount after assigning a sufficient code amount to the luminance signal bit stream BSy, the quantizing mode determining unit 129 uses the linear quantizing mode to improve the image quality of the color difference high-compression bit stream BSc.

Thus, the color difference high-compression processing unit 111 changes the number of sub-blocks based on the encoding difficulty level ID, thereby encoding the color difference signals PVU so as keep deterioration of the image quality as the whole of the bit stream BS including the luminance signal PY minimal. Subsequently, the color difference high-compression processing unit 111 selects the quantizing mode based on the code amount of the actually generated color difference high-compression bit stream BSc1.

Thus, the color difference high-compression processing unit 111 feeds back the code amount of the actually generated color difference high-compression bit stream BSc1 to selection of the quantizing mode, whereby this code amount can be readjusted. Therefore, the color difference high-compression processing unit 111 can generate the color difference high-compression bit stream BSc1 with the color difference target code amount corresponding to the encoding difficulty level ID in a sure manner.

1-4-1-2. Different Points Between Color Difference High-Compression Processing Unit and Color Difference Low-Compression Processing Unit Next, the different points between the color difference high-compression processing unit 111 and the color difference low-compression processing unit 112 will be described. The nonlinear quantizing unit 123A of the color difference high-compression processing unit 111 has, such as shown in FIGS. 17B and 17C, multiple nonlinear tables as nonlinear tables to be used for quantization wherein the maximum value of quantized bits obtained by the difference values being quantized is a small value ("3" in the drawing).

Figure 17D:
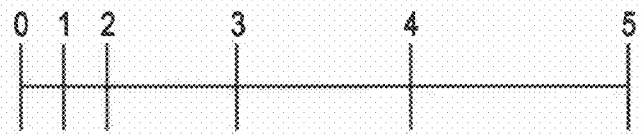
Figure 17E:
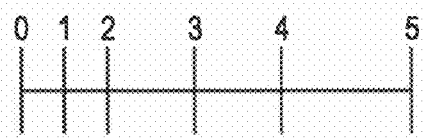
Figure 20:
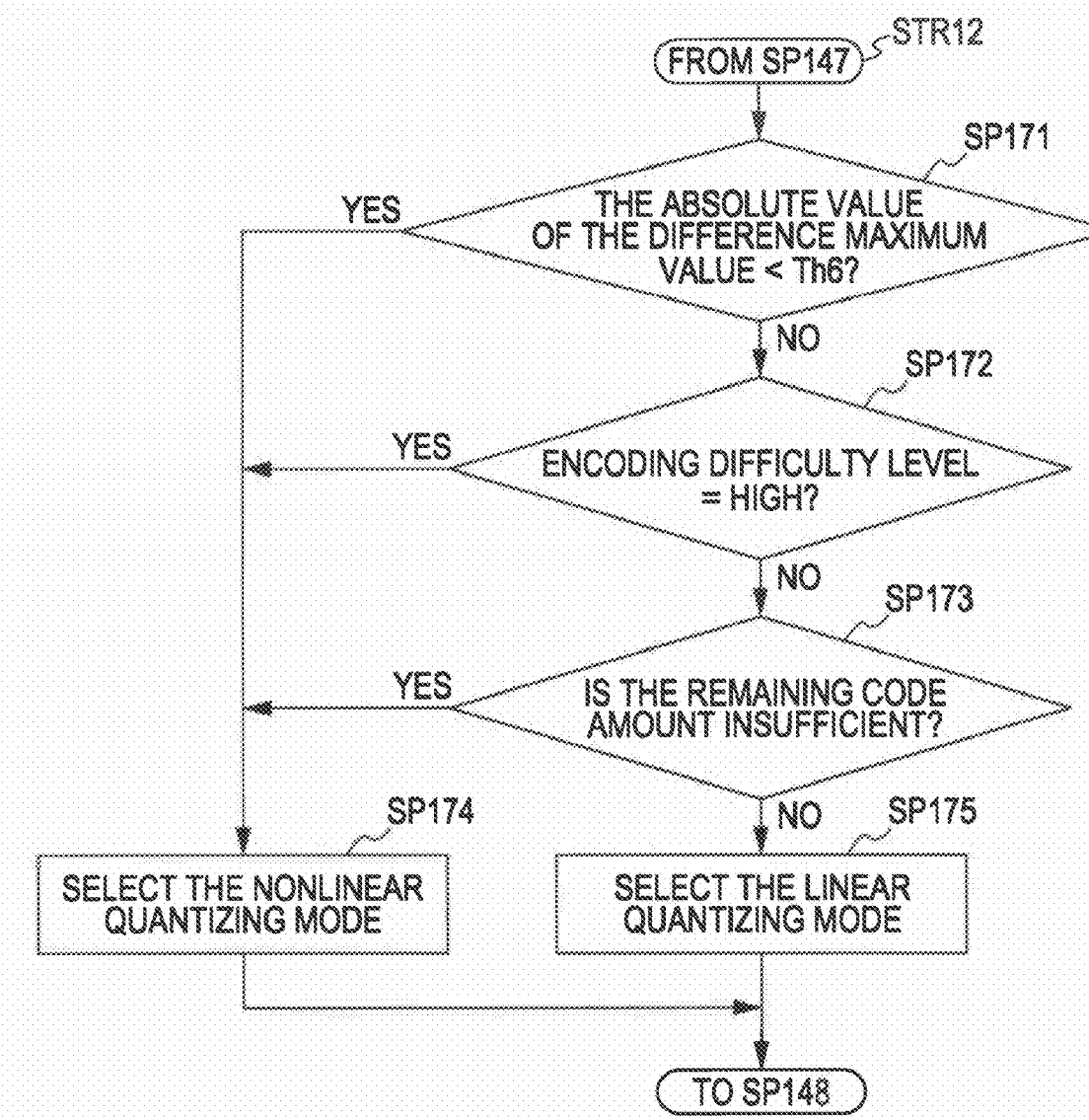
FIG. 20 is a flowchart for describing a quantizing mode selecting processing procedure at the color difference signal encoding unit.
Figure 21:
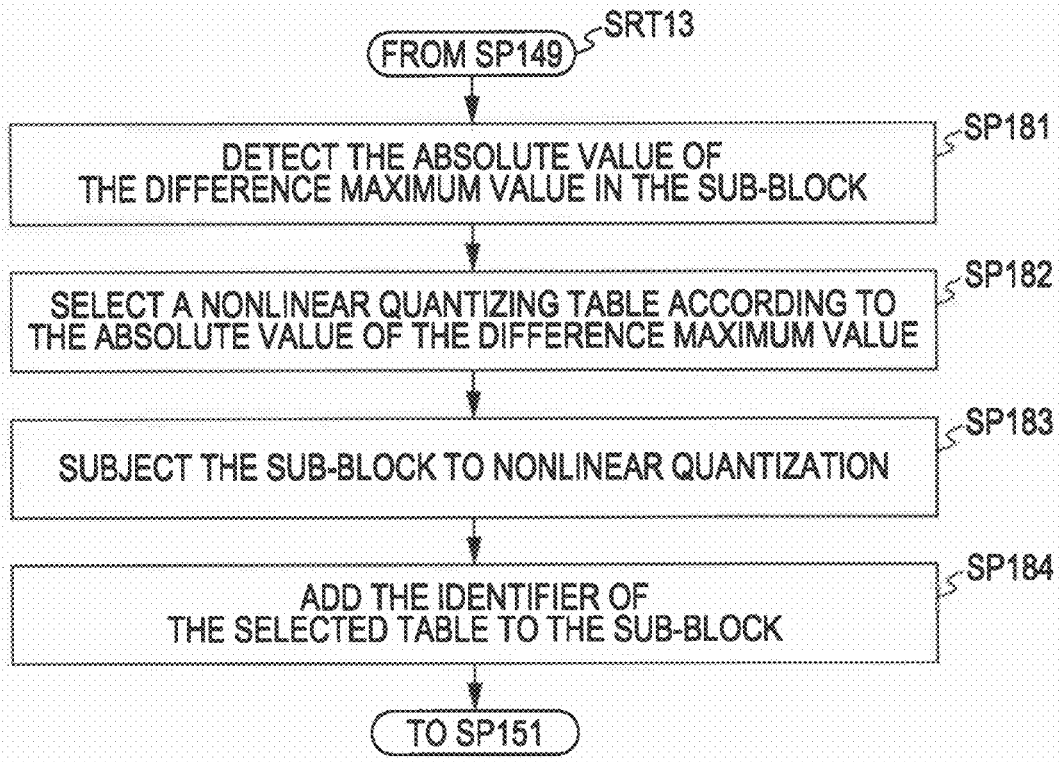
FIG. 21 is a flowchart for describing a nonlinear quantization processing procedure.
Figure 22:
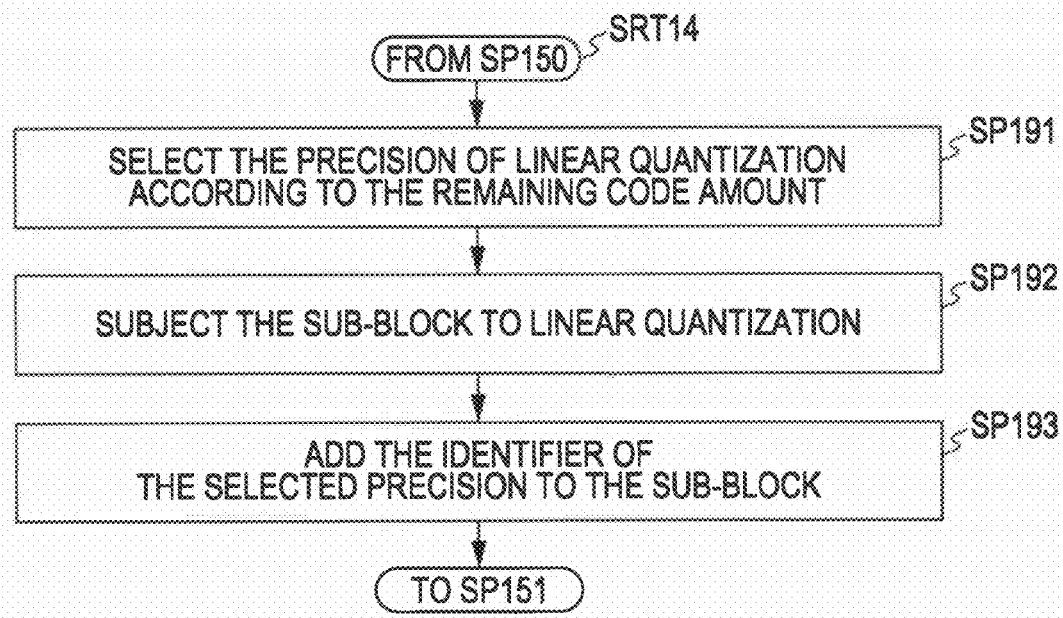
FIG. 22 is a flowchart for describing a linear quantization processing procedure.
Figure 23:
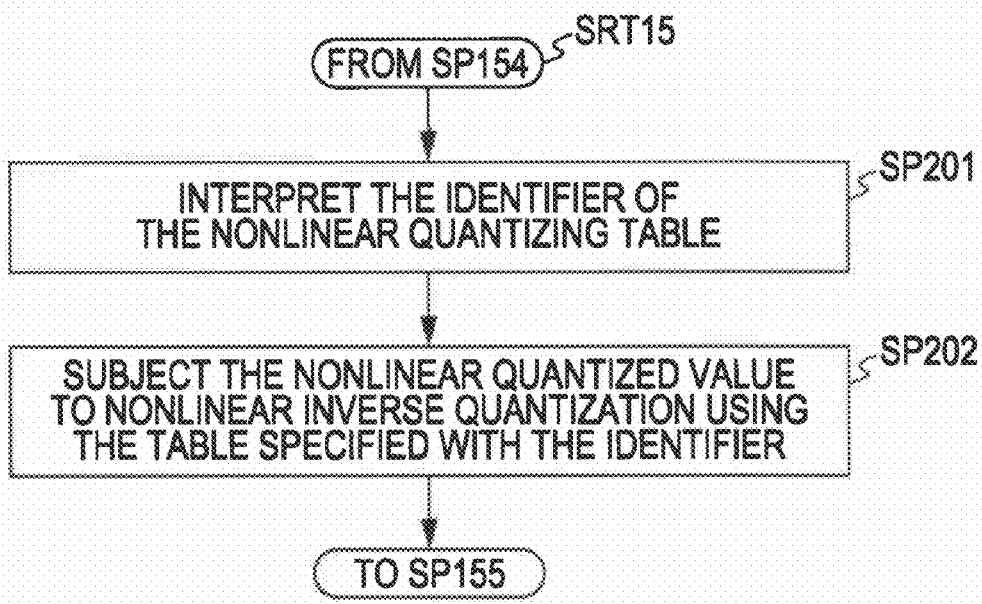
FIG. 23 is a flowchart for describing a nonlinear inverse quantization processing procedure.
Figure 24:
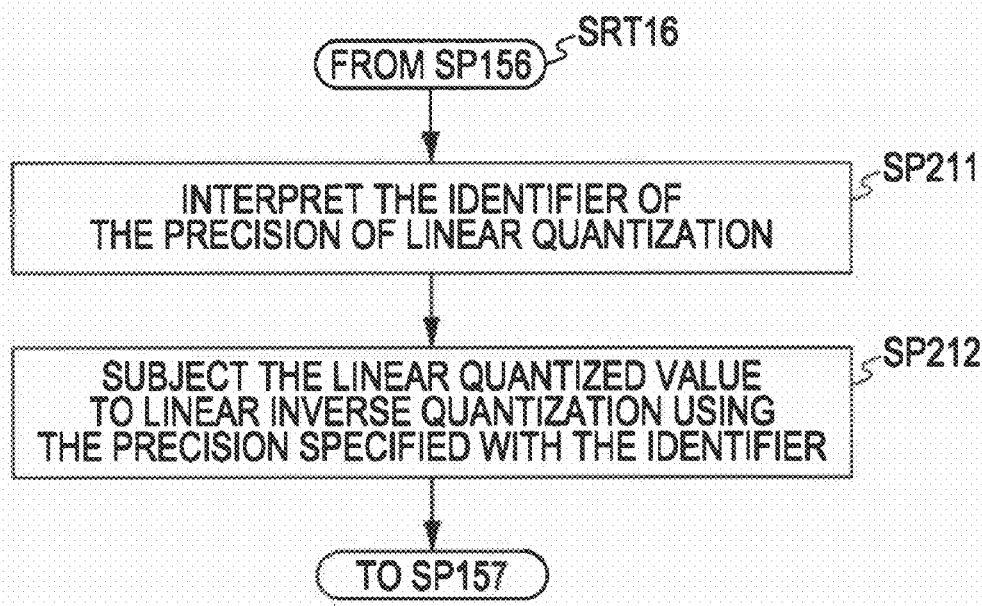
FIG. 24 is a flowchart for describing a linear inverse quantization processing procedure.
Figure 25:
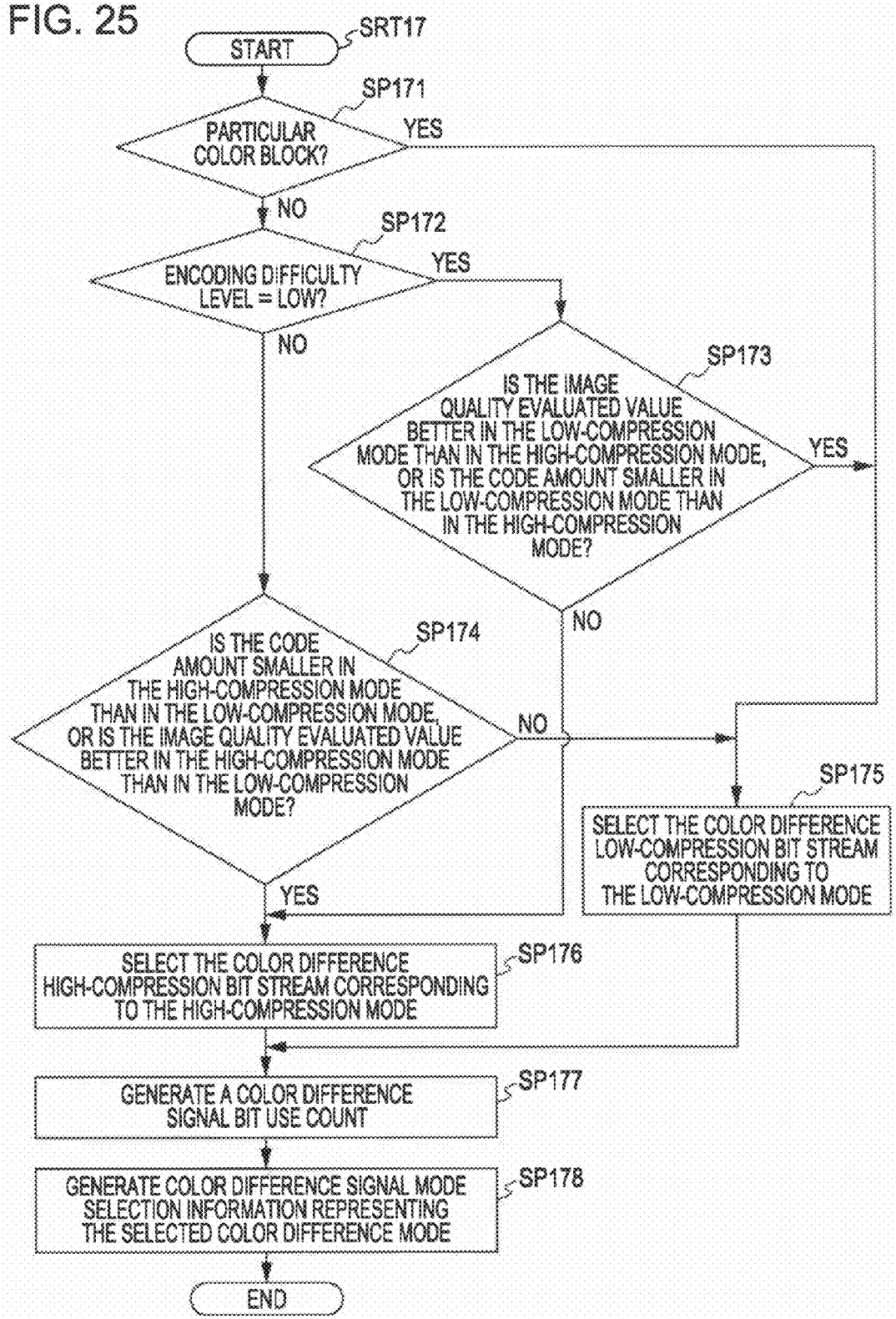
FIG. 25 is a flowchart for describing a color difference signal encoding mode selecting processing procedure.

On the other hand, the nonlinear quantizing unit 123B of the color difference low-compression processing unit 112 has, such as shown in FIGS. 17D and 17E, multiple nonlinear tables as nonlinear tables to be used for quantization wherein the maximum value of quantized bits is a great value ("5" in the drawing).

Thus, the nonlinear quantizing unit 123B can represent a difference value using many quantized bits as compared to the nonlinear quantizing unit 123A, and accordingly, deterioration in the image quality can be suppressed, though the code amount of the encoded sub-block increases (i.e., compression ratio decreases).

Also, the linear quantizing unit 124B of the color difference low-compression processing unit 112 improves the precision of quantization (increases the number of bits of the linear quantized value) as compared to the linear quantizing unit 124A.

Thus, the linear quantizing unit 124B increases the code amount of the encoded sub-block as compared to the linear quantizing unit 124A (i.e., compression ratio decreases), but can suppress deterioration in the image quality.

That is to say, upon the color difference signals PVU being supplied from the signal conversion unit 31, and the encoding difficulty level ID and color specification information IE being supplied from the signal analyzing unit 32, the color difference low-compression processing unit 112 executes the color difference encoding processing in the same way as with the color difference high-compression processing unit 111 to generate a color difference low-compression bit stream BSc2 and a color difference image quality evaluated value EVc2.

Note that, with the color difference high-compression processing unit 111 and the color difference low-compression processing unit 112, the same color difference target code amount is set to the quantizing mode determining unit 129.

Subsequently, the color difference low-compression processing unit 112 supplies the color difference low-compression bit stream BSc2 and the color difference image quality evaluated value EVc2 to the color difference signal encoding mode selecting unit 113.

1-4-2. Color Difference Signal Encoding Mode Selecting Processing

The color difference signal encoding mode selecting unit 113 of the color difference signal encoding unit 33 (FIG. 15) selects, of the high-compression mode and the low-compression mode, the color difference signal encoding mode corresponding to the color specification information IE and the encoding difficulty level ID.

Specifically, the color difference signal encoding mode selecting unit 113 determines whether or not the processing block is a particular color block including a great number of particular colors regarding which deterioration is visibly conspicuous, based on the color specification information IE. In the case that the processing block is a particular color block, the color difference signal encoding mode selecting unit 113 selects the low-compression mode as the selected color difference mode to keep deterioration in the image quality minimal.

In this low-compression mode, for example, the nonlinear table and the precision of quantization are set beforehand so as to be optimal as to the particular color, whereby deterioration in the color difference low-compression bit stream BSc2 as to the particular color can be kept minimal.

That is to say, the color difference signal encoding mode selecting unit 113 adjusts the assignment of the code amount of the bit stream BS so as to assign a relatively great code amount to the color difference signal bit stream BSc as to the particular color block. Further, in the low-compression mode the color difference signal encoding mode selecting unit 113 sets the nonlinear table and the precision of quantization beforehand so as to suppress deterioration in the image quality as to the particular color, thereby suppressing deterioration in the color difference low-compression bit stream BSc2 as to the particular color.

Thus, the color difference signal encoding mode selecting unit 113 can prevent the particular color from deteriorating, and can prevent visible deterioration in the image quality from being conspicuous.

On the other hand, in the case that the processing block is not a particular color block, the color difference signal encoding mode selecting unit 113 selects the selected color difference mode based on the encoding difficulty level ID.

Here, in the case that the encoding difficulty level ID represents "high", it can be predicted that the encoding difficulty level of the luminance signal PY is high, and the nonlinear mode does not have to be used frequently, and accordingly, a great code amount has to be assigned to the luminance signal bit stream BSy. Also, there is a possibility that the code amount of the color difference signal bit stream BSc may increase. At this time, the color difference signal encoding mode selecting unit 113 suppresses the code amount of the color difference signal bit stream BSc.

That is to say, in the case that the encoding difficulty level ID represents "high", the color difference signal encoding mode selecting unit 113 selects the color difference high-compression mode as the selected color difference mode.

On the other hand, in the case that the encoding difficulty level ID represents "low", it can be predicted that the encoding difficulty of the luminance signal PY is low, and deterioration in the image quality is small even if the nonlinear mode is frequently used, a great code amount does not have to be assigned to the luminance signal bit stream BSy. Also, it can be predicted that the code amount of the color difference signal bit stream BSc is small. At this time, the color difference signal encoding mode selecting unit 113 increases the code amount of the color difference signal bit stream BSc.

That is to say, in the case that the encoding difficulty level ID represents "low", the color difference signal encoding mode selecting unit 113 selects the color difference low-compression mode as the selected color difference mode.

Here, the color difference signal encoding unit 33 generates a color difference high-compression bit stream BSc1 and a color difference low-compression bit stream BSc2 while changing the number of sub-blocks, linear quantization, and nonlinear quantization. Therefore, there is a possibility that a reversal phenomenon may occur depending on images wherein the code amount of the color difference high-compression bit stream BSc1 is greater than the code amount of the color difference low-compression bit stream BSc2.

Therefore, the color difference signal encoding mode selecting unit 113 compares the color difference high-compression bit stream BSc1 and the color difference low-compression bit stream BSc2. In the case that one of the color difference signal bit streams BSc has little code amount and good image quality, the color difference signal encoding mode selecting unit 113 selects this one of the color difference signal bit streams BSc as the selected color difference signal bit stream BScS.

That is to say, in the case that the code amount of the color difference high-compression bit stream BSc1 is smaller than the code amount of the color difference low-compression bit stream BSc2 regardless of the encoding difficulty level ID, and also the color difference image quality evaluated value EVc1 is better (smaller) than the color difference image quality evaluated value EVc2, the color difference signal encoding mode selecting unit 113 selects the high-compression mode.

Also, in the case that the code amount of the color difference low-compression bit stream BSc2 is smaller than the code amount of the color difference high-compression bit stream BSc1 regardless of the encoding difficulty level ID, and also the color difference image quality evaluated value EVc2 is better (smaller) than the color difference image quality evaluated value EVc1, the color difference signal encoding mode selecting unit 113 selects the low-compression mode.

Thus, the color difference signal encoding mode selecting unit 113 can select the color difference signal bit stream BSc having a small code amount and good image quality as the selected color difference signal bit stream BScS. As a result thereof, the color difference signal encoding mode selecting unit 113 can improve the image quality maximally without increasing the code amount of the selected color difference signal bit stream BScS.

Subsequently, the color difference signal encoding mode selecting unit 113 generates a color difference signal use bit count IBc representing the code amount of the selected color difference signal bit stream BScS. Further, the color difference signal encoding mode selecting unit 113 generates color difference signal mode selection information ISc representing the selected color difference mode. The color difference signal encoding mode selecting unit 113 supplies the color difference signal use bit count IBc to the luminance signal encoding unit 34, while supplying the color difference signal use bit count IBc and the color difference signal mode selection information ISc to the color difference signal encoding mode reselecting unit 35.

As described above, the color difference signal encoding mode selecting unit 113 selects the low-compression mode regarding the particular color block wherein deterioration in the image quality is readily conspicuous. Thus, the color difference signal encoding mode selecting unit 113 can keep deterioration in the image quality regarding the particular color block minimal, and thus, can prevent the user from recognizing deterioration in the image quality.

Also, the color difference signal encoding mode selecting unit 113 selects the color difference signal encoding mode based on the encoding difficulty level ID regarding a block other than the particular color block wherein deterioration in the image quality is not conspicuous.

Thus, in the case that after a sufficient code amount is assigned to the luminance signal PY wherein deterioration is readily visibly conspicuous, and further the code amount has leeway, the color difference signal encoding mode selecting unit 113 can assign a relatively great code amount to the color difference signals PVU. As a result thereof, the color difference signal encoding mode selecting unit 113 can assign a code amount to the luminance signal PY and the color difference signals PVU while prioritizing the luminance signal PY without leaving over any code amount, and can keep deterioration in the image quality serving as the whole bit stream BS minimal.

1-4-3. Specific Processing Procedure

Next, a color difference signal encoding processing procedure RT5 will be described with reference to the flowcharts in FIGS. 18 through 25.

Upon the color difference signals PVU being supplied from the signal conversion unit 31, the color difference signal encoding unit 33 starts the color difference signal encoding processing, and proceeds to the next step SP121.

In step SP121, the color difference signal encoding unit 33 proceeds to a subroutine SRT11, and upon encoding the color difference signals PVU in the high-compression mode to generate a color difference high-compression bit stream BSc1, the color difference signal encoding unit 33 proceeds to the next step SP122.

In step SP122, the color difference signal encoding unit 33 proceeds to the subroutine SRT11, and upon encoding the color difference signals PVU in the low-compression mode to generate a color difference low-compression bit stream BSc2, the color difference signal encoding unit 33 proceeds to the next step SP123.

In step SP123, the color difference signal encoding unit 33 proceeds to a subroutine SRT17, and upon executing color difference signal encoding mode selecting processing for selecting one encoding mode of the high-compression mode and the low-compression mode, the color difference signal encoding unit 33 proceeds to the end step to end the color difference signal encoding processing procedure RT5.

In steps SP121 and SP122, the color difference signal encoding unit 33 proceeds to step SP141 in the subroutine SRT11 (FIG. 19) indicating a color difference signal compression processing procedure.

In step SP141, upon determining a sub-block size based on the encoding difficulty level ID, and also dividing the color difference signals PVU into sub-blocks for each processing block in accordance with this sub-block size, the color difference signal encoding unit 33 proceeds to the next step SP142.

In step SP142, the color difference signal encoding unit 33 determines whether or not a pixel of the color difference signals PVU serving as a processing object is the first pixel of the processing block. Here, in the case of having obtained a positive result, the color difference signal encoding unit 33 has difficulty in calculation of a difference value as to the last pixel, and accordingly, proceeds to the next step SP143.

In step SP143, the color difference signal encoding unit 33 supplies the first pixel to the entropy encoding unit 127, and proceeds to the next step SP144.

In step SP144, the color difference signal encoding unit 33 stores the first pixel in the first memory unit 125, and returns to step SP142.

On the other hand, in the case of having obtained a negative result in step SP142, the color difference signal encoding unit 33 proceeds to the next step SP146.

In step SP146, upon calculating a difference value between the pixel to be processed and the last pixel stored in the first memory unit 125 for each sub-block, the color difference signal encoding unit 33 proceeds to the next step SP147.

In step SP147, the color difference signal encoding unit 33 proceeds to step SP171 in subroutine SRT12 (FIG. 20) indicating a quantizing mode selecting processing procedure at the color difference signal encoding unit to execute selection of the quantizing mode based on the difference maximum value, encoding difficulty level ID, and remaining code amount.

In step SP171, the color difference signal encoding unit 33 determines whether or not the difference maximum value of the sub-blocks is less than a nonlinear threshold Th6.

Here, in the case of having obtained a positive result, this represents that deterioration in the image quality is small even in the event of executing nonlinear quantization processing whereby the code amount can be reduced, and at this time, the color difference signal encoding unit 33 proceeds to the next step SP174.

On the other hand, in the case of having obtained a negative result in step SP171, this represents that there is a possibility that the image quality may deteriorate due to the nonlinear quantization processing, and at this time, the color difference signal encoding unit 33 proceeds to the next step SP172.

In step SP172, the color difference signal encoding unit 33 determines whether or not the encoding difficulty level ID is "high". Here, in the case of having obtained a positive result, there is a possibility that the image quality may deteriorate when frequently using the nonlinear mode as to the luminance signal bit stream BSy, or in step SP171, a positive result is obtained regarding many sub-blocks, and the nonlinear mode is selected. Therefore, this represents that a great code amount should be assigned to the luminance signal bit stream BSy. At this time, the color difference signal encoding unit 33 proceeds to the next step SP174.

On the other hand, in the case of having obtained a negative result in step SP172, this represents that the code amount of the luminance signal bit stream BSy decreases, or the code amount of the color difference signal bit stream BSc increases, and accordingly, a great code amount does not have to be assigned to the luminance signal bit stream BSy. At this time, the color difference signal encoding unit 33 proceeds to the next step SP173.

In step SP173, the color difference signal encoding unit 33 determines whether or not the remaining code amount obtained by subtracting the code amount of the already encoded sub-block from the color difference signal target code amount set in the processing block according to the encoding difficulty level ID, is sufficient.

Here, in the case of having obtained a positive result, this represents that the code amount of the sub-block to be encoded from now has to be suppressed, and at this time, the color difference signal encoding unit 33 proceeds to the next step SP174.

In step SP174, upon selecting the nonlinear quantizing mode, the color difference signal encoding unit 33 proceeds to step SP148 in the subroutine SRT11 (FIG. 19).

On the other hand, in the case of having obtained a negative result in step SP173, this represents that there is a possibility that the image quality may deteriorate due to the nonlinear quantizing mode, a great code amount does not have to be assigned to the luminance signal bit stream BSy, and also the remaining code amount is sufficient. At this time, the color difference signal encoding unit 33 proceeds to step SP175, selects the linear quantizing mode to assign many code amounts to the color difference signal bit stream BSc, and proceeds to step SP148 in the subroutine SRT11 (FIG. 19).

In step SP148, the color difference signal encoding unit 33 determines whether or not the nonlinear quantizing mode has been selected. Here, in the case of having obtained a positive result, the color difference signal encoding unit 33 proceeds to step SP181 in subroutine SRT13 (FIG. 21) indicating a nonlinear quantization processing procedure from the next step SP149 to execute nonlinear quantization processing.

In step SP181, upon detecting the difference maximum value of the sub-blocks, the color difference signal encoding unit 33 proceeds to the next step SP182.

In step SP182, upon selecting the nonlinear table according to the difference maximum value, the color difference signal encoding unit 33 proceeds to the next step SP183.

In step SP183, upon subjecting the sub-block to nonlinear quantization using the nonlinear table selected in step SP182, the color difference signal encoding unit 33 proceeds to the next step SP184.

In step SP184, upon adding the nonlinear table identifier of the nonlinear table selected as to the sub-block subjected to nonlinear quantization, the color difference signal encoding unit 33 proceeds to step SP151 in the subroutine SRT11 (FIG. 19).

On the other hand, in the case of having obtained a negative result in step SP148 (FIG. 19), the color difference signal encoding unit 33 proceeds to step SP191 in subroutine SRT14 (FIG. 22) indicating a linear quantization processing procedure from the next step SP150 to execute linear quantization processing.

In step SP191, upon selecting the precision of linear quantization (i.e., the number of bits of a quantized value) according to the remaining code amount obtained by subtracting the code amount of the already encoded sub-block from the color difference signal target code amount set for each processing block, the color difference signal encoding unit 33 proceeds to the next step SP192.

In step SP192, upon subjecting the sub-block to linear quantization with the precision selected in step SP191, the color difference signal encoding unit 33 proceeds to the next step SP193.

In step SP193, upon adding a quantization precision identifier representing the precision selected as to the sub-block subjected to linear quantization, the color difference signal encoding unit 33 proceeds to step SP151 in the subroutine SRT11 (FIG. 19).

In step SP151, upon executing entropy encoding (i.e., variable length encoding) as to the quantized value quantized in step SP149 or step SP150, the color difference signal encoding unit 33 proceeds to the next step SP152.

In step SP152, the color difference signal encoding unit 33 determines whether or not the nonlinear quantizing mode has been selected.

Here, in the case of having obtained a positive result, the color difference signal encoding unit 33 proceeds to the next step SP154 to execute nonlinear inverse quantization processing.

In step SP154, the color difference signal encoding unit 33 proceeds to step SP201 in subroutine SRT15 (FIG. 23) indicating a nonlinear inverse quantization processing procedure.

In step SP201, upon interpreting the nonlinear table used at the time of the nonlinear quantized value being quantized from the nonlinear table identifier, the color difference signal encoding unit 33 proceeds to the next step SP202.

In step SP202, upon executing nonlinear inverse quantization as to the nonlinear quantized value using the nonlinear table interpreted in step SP201, the color difference signal encoding unit 33 proceeds to step SP155 in the subroutine SRT11 (FIG. 19).

In step SP155, upon generating local color difference signals LVU of the pixel to be processed by adding the nonlinear quantized value generated and subjected to nonlinear inverse quantization in step SP202, to the local color difference signals LVU corresponding to the last pixel, the color difference signal encoding unit 33 proceeds to the next step SP157.

On the other hand, in the case of having obtained a negative result in step SP152, the color difference signal encoding unit 33 proceeds to step SP211 in subroutine SRT16 (FIG. 24) representing a linear inverse quantization processing procedure to execute linear inverse quantization processing.

In step SP211, upon interpreting the precision of linear quantization from the quantization precision identifier, the color difference signal encoding unit 33 proceeds to the next step SP212.

In step SP212, upon generating local color difference signals LVU by executing linear inverse quantization as to the linear quantized value using the precision of linear quantization interpreted in step SP211, the color difference signal encoding unit 33 proceeds to step SP157 in the subroutine SRT11 (FIG. 19).

In step SP157, the color difference signal encoding unit 33 stores the local color difference signals LVU in the first memory unit 125, and proceeds to the next step SP158.

In step SP158, the color difference signal encoding unit 33 determines whether or not encoding as to all the sub-blocks of the processing block has been completed.

Here, in the case of having obtained a negative result, this represents that encoding of the next sub-block has to be executed, and at this time, the color difference signal encoding unit 33 proceeds to the next step SP159.

In step SP159, upon storing the encoding result of the entropy encoding executed in step SP151 in the second memory unit 128, the color difference signal encoding unit 33 returns to step SP142 to continue the color difference signal compression processing procedure.

On the other hand, in the case of having obtained a positive result in step SP158, this represents that the color difference signal compression processing as to the processing block has been completed, and at this time, the color difference signal encoding unit 33 proceeds to the next step SP160.

In step SP160, upon calculating the color difference image quality evaluated value EVc representing the degree of deterioration in the local color difference signals LVU as to the color difference signals PVU, the color difference signal encoding unit 33 returns to step SP123 in the color difference signal encoding processing procedure RT5 (FIG. 18).

In step SP123, the color difference signal encoding unit 33 proceeds to step SP171 in subroutine SRT17 (FIG. 25) indicating a color difference signal encoding mode selecting processing procedure to select one of the high-compression mode and the low-compression mode.

In step SP171, the color difference signal encoding unit 33 determines, based on the color specification information IE, whether or not the processing block is a particular color block.

Here, in the case of having obtained a positive result, this represents that the processing block includes the many particular colors regarding which deterioration in the image quality is readily conspicuous, and accordingly, deterioration in the image quality of the color difference signal bit stream BSc has to be suppressed. At this time, the color difference signal encoding unit 33 proceeds to the next step SP175.

On the other hand, in the case of having obtained a negative result in step SP171, consideration as to the particular color does not have to be had, and accordingly, the color difference signal encoding unit 33 proceeds to the next step SP172.

In step SP172, the color difference signal encoding unit 33 determines whether or not the encoding difficulty level ID as to the processing block represents "low".

Here, in the case of having obtained a positive result, this represents that a great code amount has to be assigned to the color difference signal bit stream BSc, and at this time, the color difference signal encoding unit 33 proceeds to the next step SP173.

In step SP173, the color difference signal encoding unit 33 compares the high-compression mode and the low-compression mode. At this time, the color difference signal encoding unit 33 determines whether or not the color difference image quality evaluated value EVc is smaller and more preferable in the low-compression mode as compared to the high-compression mode, or the code amount of the color difference signal bit stream BSc is smaller and more preferable in the low-compression mode as compared to the high-compression mode.

Here, in the case of having obtained a positive result, this represents that at least one of the image quality and the code amount is more preferable in the low-compression mode as compared to the high-compression mode, and accordingly, the color difference low-compression mode should be selected. At this time, the color difference signal encoding unit 33 proceeds to the next step SP175.

On the other hand, in the case of having obtained a negative result in step SP173, this represents that the image quality and the code amount are both more preferable in the high-compression mode, and accordingly, the color difference high-compression mode should be selected. At this time, the color difference signal encoding unit 33 proceeds to the next step SP176.

On the other hand, in the case of having obtained a negative result in step SP172, this represents that a small code amount has to be assigned to the color difference signal bit stream BSc. At this time, the color difference signal encoding unit 33 proceeds to the next step SP174.

In step SP174, the color difference signal encoding unit 33 compares the high-compression mode and the low-compression mode. At this time, the color difference signal encoding unit 33 determines whether or not the color difference image quality evaluated value EVc is smaller and more preferable in the high-compression mode as compared to the low-compression mode, or the code amount of the color difference signal bit stream BSc is smaller and more preferable in the high-compression mode as compared to the low-compression mode. Here, in the case of having obtained a positive result, this represents that at least one of the image quality and the code amount is more preferable in the high-compression mode as compared to the low-compression mode, and accordingly, the color difference high-compression mode should be selected. At this time, the color difference signal encoding unit 33 proceeds to the next step SP176.

On the other hand, in the case of having obtained a negative result in step SP174, this represents that the image quality and the code amount are both more preferable in the low-compression mode, and accordingly, the color difference low-compression mode should be selected. At this time, the color difference signal encoding unit 33 proceeds to the next step SP175.

In step SP175, upon selecting the color difference low-compression bit stream BSc2 corresponding to the color difference low-compression mode as the selected color difference signal bit stream BScS, the color difference signal encoding unit 33 proceeds to the next step SP177.

In step SP176, upon selecting the color difference high-compression bit stream BSc1 corresponding to the color difference high-compression mode as the selected color difference signal bit stream BScS, the color difference signal encoding unit 33 proceeds to the next step SP177.

In step SP177, upon generating a color difference signal use bit count IBc representing the code amount of the selected color difference signal bit stream BScS, the color difference signal encoding unit 33 proceeds to the next step SP178.

In step SP178, upon generating color difference signal mode selection information ISc representing the selected color difference mode, the color difference signal encoding unit 33 returns to step SP123 in the color difference signal encoding processing procedure RT5 (FIG. 18). Subsequently, the color difference signal encoding unit 33 proceeds to the end step from step SP123 to end the color difference signal encoding processing procedure RT5.

1-5. Configuration of Luminance Signal Encoding Unit

Figure 26:
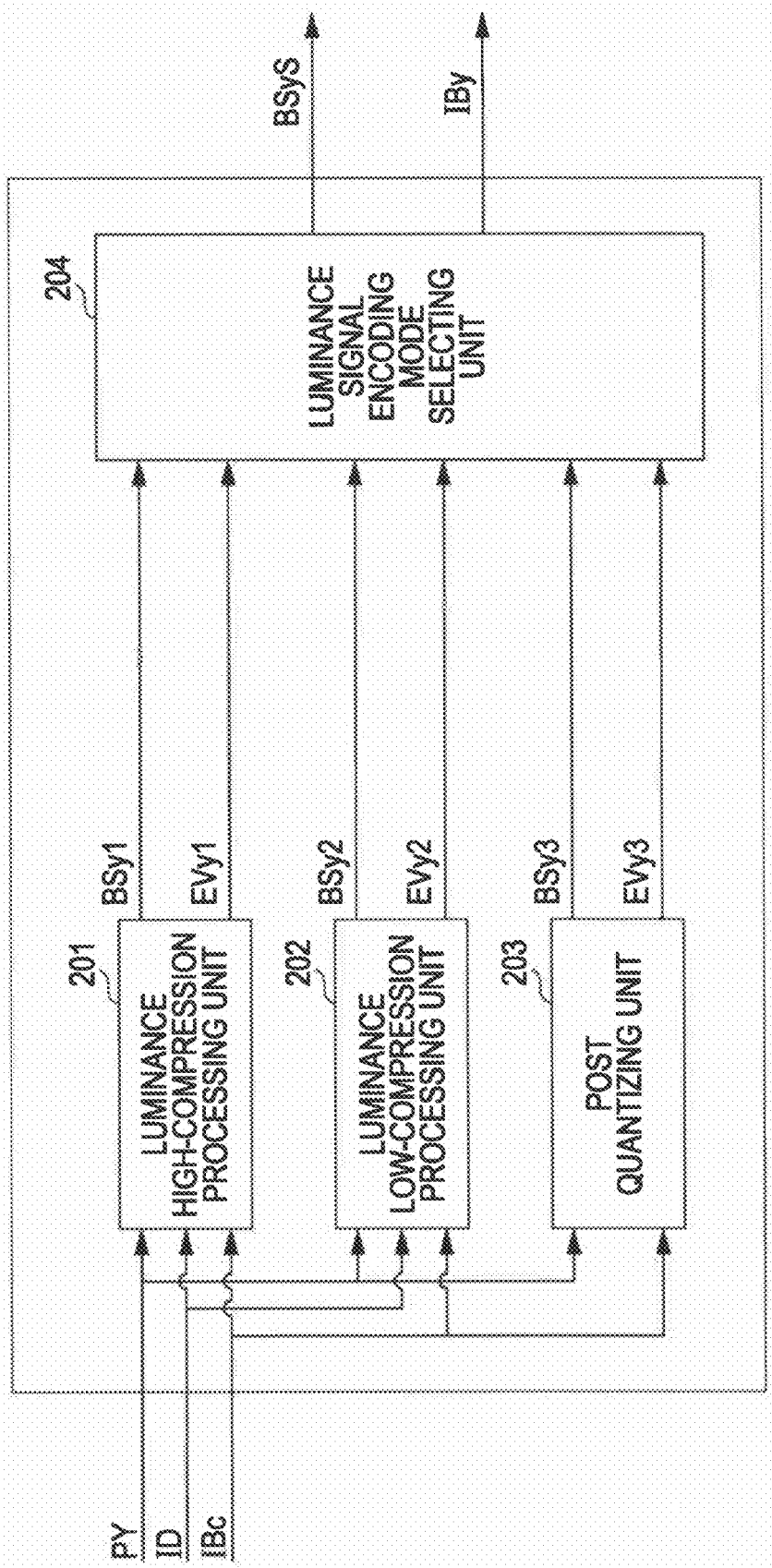
FIG. 26 is a schematic diagram illustrating the configuration of a luminance signal encoding unit.

Next, the configuration of the luminance signal encoding unit 34 will be described. Such as shown in FIG. 26, the luminance signal encoding unit 34 encodes the luminance signal PY using the three luminance signal encoding modes by a luminance high-compression processing unit 201, luminance low-compression processing unit 202, and post quantizing unit 203 to generate three luminance signal bit streams BSy. Subsequently, the luminance signal encoding unit 34 selects one luminance signal encoding mode by the luminance signal encoding mode selecting unit 204.

Note that the luminance signal encoding unit 34 sets the value obtained by subtracting the code amount of the selected color difference signal bit stream BScS that the color difference signal use bit count IBc represents, and the code amount used for the header from the bus transfer increments, as the luminance target code amount.

1-5-1. Luminance Signal Encoding Processing

Figure 27:
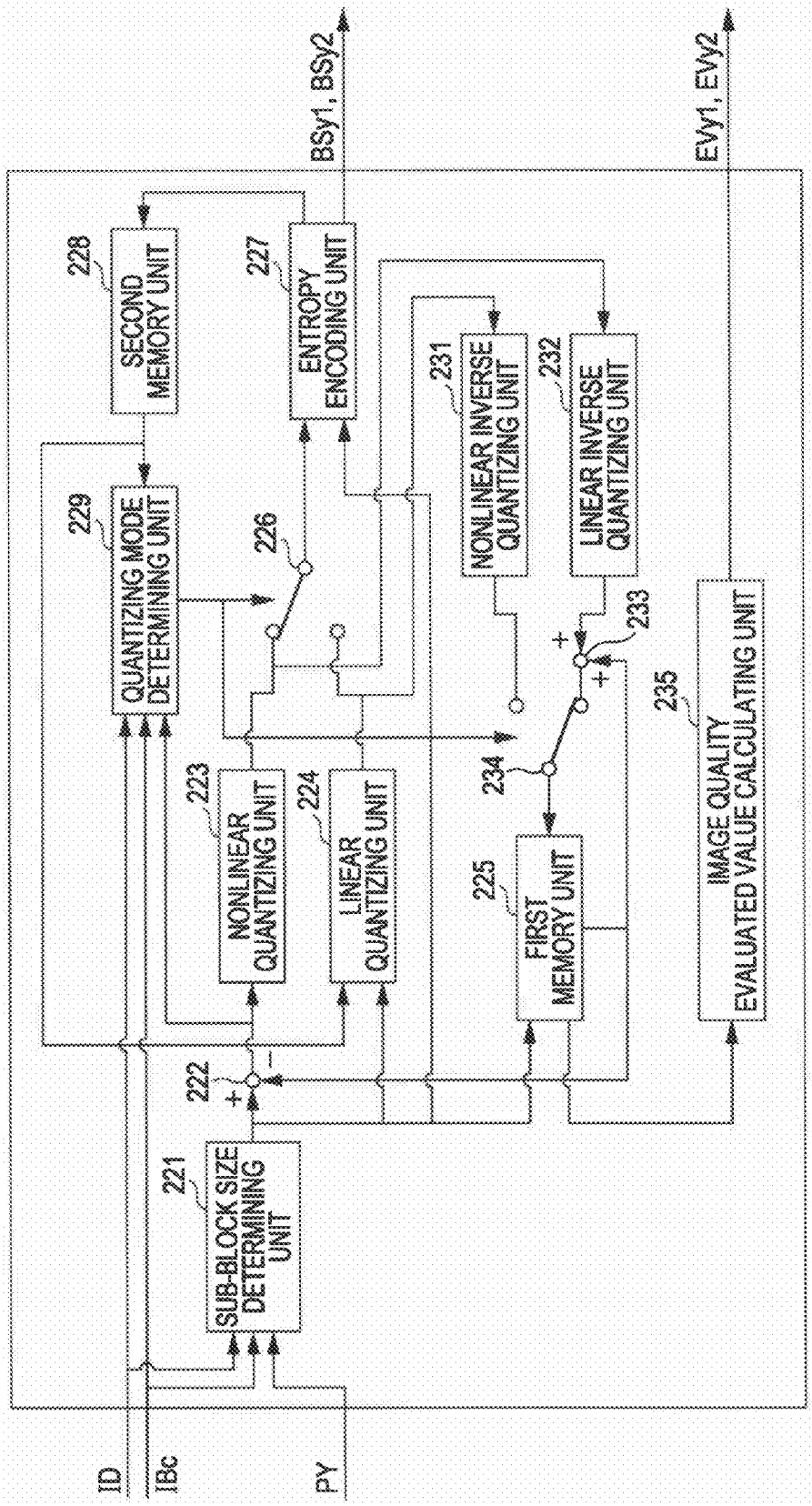
FIG. 27 is a schematic diagram illustrating the configuration of a luminance high-compression processing unit and a luminance low-compression processing unit.

As shown in FIG. 27, the luminance high-compression processing unit 201 has generally the same configuration as the color difference high-compression processing unit 111 shown in FIG. 16. Also, the luminance low-compression processing unit 202 has generally the same configuration as the luminance high-compression processing unit 201 except that the precision of quantization differs, in the same way as with the color difference low-compression processing unit 112, and accordingly, description thereof will be omitted.

Note that FIG. 27 illustrates the portions corresponding to FIG. 16 with reference numerals obtained by adding 100 to the reference numerals in FIG. 16. Hereafter, with regard to the luminance high-compression processing unit 201, only the points different from the color difference high-compression processing unit 111 will be described, and description regarding the same processing as the color difference high-compression processing unit 111 will be omitted.

The luminance signal PY from the signal conversion unit 31, the encoding difficulty level ID from the signal analyzing unit 32, and the color difference signal use bit count IBc from the color difference signal encoding unit 33 are supplied to the luminance high-compression processing unit 201. The luminance high-compression processing unit 201 supplies the luminance signal PY, encoding difficulty level ID, and color difference signal use bit count IBc to a sub-block size determining unit 221, and also supplies the encoding difficulty level ID, and color difference signal use bit count IBc to a quantizing mode determining unit 229.

The sub-block size determining unit 221 divides the luminance signal PY for each processing block into the sub-block size corresponding to the color difference signal use bit count IBc and the encoding difficulty level ID.

That is to say, in the case that the color difference signal use bit count IBc is great, the sub-block size determining unit 221 has to set the luminance signal target code amount small that can be assigned to the luminance signal bit stream BSy, and accordingly, sets the sub-block size great, to reduce the number of sub-blocks.

Also, in the case that the color difference signal use bit count IBc is small, the sub-block size determining unit 221 has to set the luminance signal target code amount great that can be assigned to the luminance signal bit stream BSy, and accordingly, sets the sub-block size small, to increase the number of sub-blocks.

Further, in the case that the encoding difficulty level ID is high, it can be predicted that the encoding difficulty of the luminance signal PY is high or intermediate, and the code amount of the luminance signal bit stream BSy to be generated increases, and accordingly, the sub-block size determining unit 221 sets the sub-block size great.

Further, in the case that the encoding difficulty level ID is low, it can be predicted that the encoding difficulty of the luminance signal PY is low or intermediate, and the code amount of the luminance signal bit stream BSy to be generated decreases, and accordingly, the sub-block size determining unit 221 sets the sub-block size small.

Specifically, the sub-block size determining unit 221 includes a number-of-blocks assignment table correlated with the number of blocks as to the color difference signal use bit count IBc and the encoding difficulty level ID. The sub-block size determining unit 221 selects the number of blocks corresponding to the color difference signal use bit count IBc and the encoding difficulty level ID.

Subsequently, the sub-block size determining unit 221 divides the luminance signal PY supplied for each processing block into sub-blocks made up of the selected number of blocks, and supplies these to a subtractor 222, a linear quantizing unit 224, and a first memory unit 225, respectively.

As a result thereof, the luminance high-compression processing unit 201 can subject the luminance signal PY to the nonlinear quantization processing and the linear quantization processing for each sub-block corresponding to the color difference signal use bit count IBc and the encoding difficulty level ID. Accordingly, the luminance high-compression processing unit 201 can adjust the code amount of the luminance high-compression bit stream Bsy1 for each processing block so as to fit in the luminance signal target code amount.

Here, the color difference high-compression processing unit 111 has used the encoding difficulty level ID at the time of selecting the quantizing mode to assign a code amount to the luminance signal bit stream BSy preferentially. On the other hand, with the luminance high-compression processing unit 201, such a code amount does not have to be taken into consideration. Accordingly, with the luminance high-compression processing unit 201, the encoding difficulty level ID is not taken into consideration at the time of selecting the quantizing mode.

Specifically, in the case that the difference maximum value of the sub-blocks is small, and is less than a nonlinear quantizing mode threshold Th7, the image quality does not deteriorate great even in the event of executing the nonlinear quantization processing as to the sub-block, and accordingly, the quantizing mode determining unit 229 of the luminance high-compression processing unit 201 selects the nonlinear quantizing mode.

Further, in the case that the difference maximum value is great, and is equal to or greater than the nonlinear quantizing mode threshold Th7, the quantizing mode determining unit 229 confirms the remaining code amount obtained by subtracting the code amount of the already encoded sub-block from the luminance signal target code amount. In the event that the remaining code amount is sufficient, the quantizing mode determining unit 229 selects the linear quantizing mode wherein the code amount increases and on the other hand, in the event that the remaining code amount is insufficient, selects the nonlinear quantizing mode wherein the code amount decreases.

Thus, the luminance high-compression processing unit 201 can adjust the code amount of the luminance signal bit stream BSy so as to fit in the luminance signal target code amount by selecting the quantizing mode according to the remaining code amount.

1-5-2. Post Quantization Processing

The post quantizing unit 203 executes post quantization processing wherein the luminance signal PY is encoded from a significant bit until the luminance signal PY becomes the luminance target code amount, and at the time of reaching the target code amount, the remaining bits are discarded, thereby generating a luminance quantization bit stream BSy3.

Figure 28:
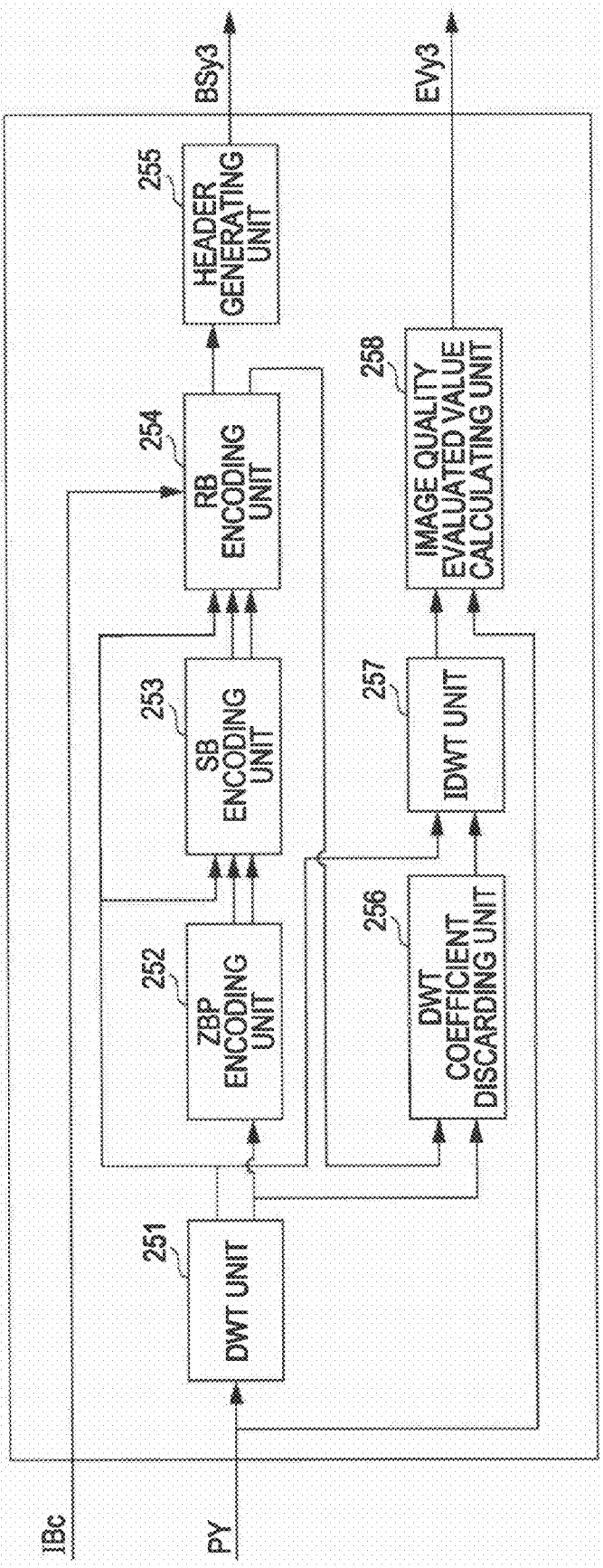
FIG. 28 is a schematic diagram illustrating the configuration of a post quantizing unit.

Specifically, such as shown in FIG. 28, upon the color difference use bit count IBc and the luminance signal PY being supplied, the post quantizing unit 203 supplies the color difference signal use bit count IBc to a RB (Refinement Bit) encoding unit 254, and supplies the luminance signal PY to an image quality evaluated value calculating unit 258 and a DWT (Discrete Wavelet Transform) unit 251.

The DWT unit 251 executes DC level shift processing wherein the luminance signal PY is represented with the number of bits less one bit than the luminance signal PY and a positive/negative sign. The DWT unit 251 executes the DWT processing as to the luminance signal PY subjected to this DC shift level processing to calculate the absolute value (hereafter, referred to as "DWT absolute value") of a DWT coefficient and a positive/negative sign. Hereafter, a DWT absolute value and a positive/negative sign will be referred to as "DWT coefficient" collectively.

Figure 29:
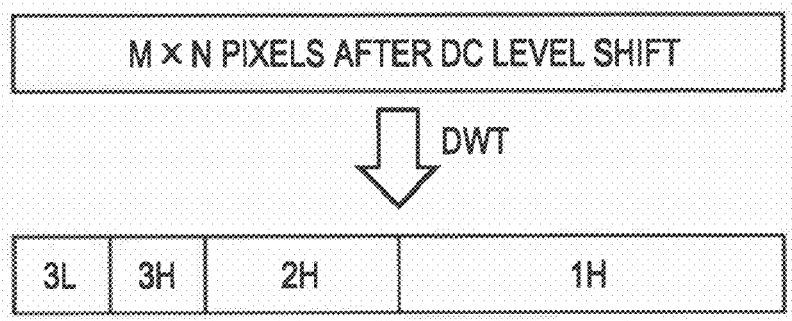
FIG. 29 is a schematic diagram for describing DWT transform processing.

At this time, the DWT unit 251 executes, such as shown in FIG. 29 for example, the DWT processing as to the luminance signal PY for each processing block subjected to the DC shift level processing, thereby breaking down into a region 3L that is a low-frequency component, and regions 3H, 2H, and 1H that are high-frequency components. Note that the name of each region represents that as the top numeric value becomes a small value, the degree of high frequency increases.

The DWT unit 251 supplies the DWT absolute value to a ZBP (Zero Bit Plane) encoding unit 252 and a DWT coefficient discarding unit 256. Also, the DWT unit 251 supplies a positive/negative bit to an SB (Significant Bit) encoding unit 253, a RB encoding unit 254, and an IDWT (Inverse DWT) unit 257.

Figure 30:
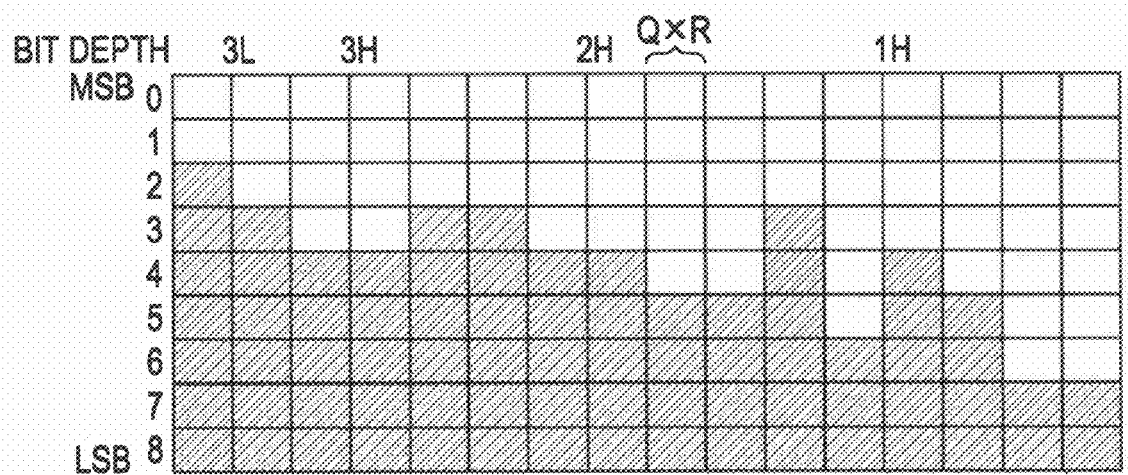
FIG. 30 is a schematic diagram illustrating the configuration of bit planes.

As shown in FIG. 30, the ZBP encoding unit 252 divides the DWT absolute value into a coding block of Q×R pixels, and is broken down into bit planes. Hereafter, the DWT absolute value broken down into bit planes will be referred to as "planed DWT absolute value". In FIG. 30, a bit of which the bit depth is "0" is represented as an MSB (Most Significant Bit) that is the uppermost bit, and a bit of which the bit depth is "8" is represented as an LSB (Least Significant Bit) that is the lowermost bit.

Note that, in FIG. 30, a coding block is made up of nine blocks represented with bit depths "0" through "8", and a block for each bit depth of this coding block will be referred to as a "coding plane". With this post quantization processing, resolution can be improved by reducing the size of a coding block (i.e., the value of Q×R pixels).

Note that a coding plane represented with no slanted lines in FIG. 30 is a coding plane indicating that the upper bits of the DWT absolute value are all "0" of the upper coding blocks including the self coding plane (hereafter, referred to as "zero plane"). Also, a coding plane represented with slanted lines represents a coding plane wherein at least one "1" appears in the self coding plane, or at least one "1" appears in the upper coding planes.

Figure 31:
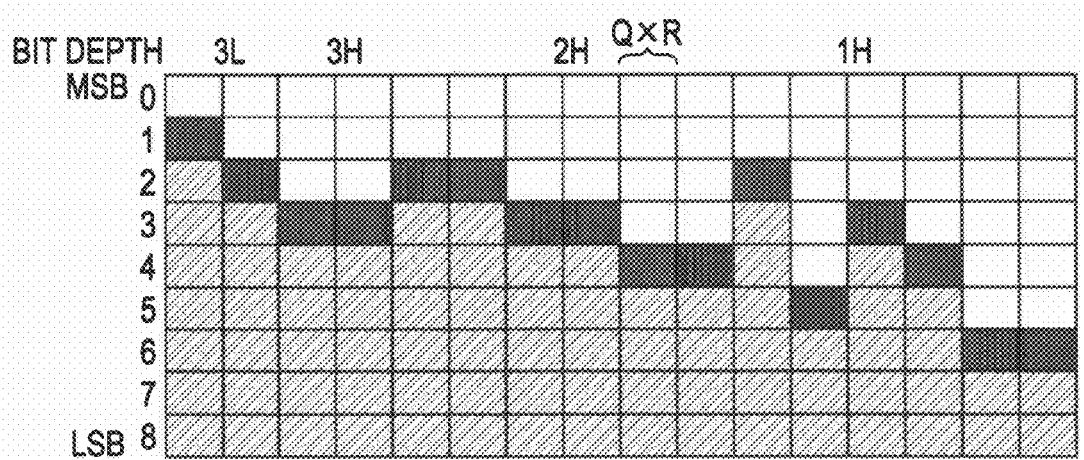
FIG. 31 is a schematic diagram illustrating zero bit planes.

The ZBP encoding unit 252 detects to which bit depth a zero plane continues from the MSB side towards the LBS side, for each coding plane. Subsequently, as shown in FIG. 31, the ZBP encoding unit 252 defines a zero plane positioned on the most LSB side as a zero bit plane (represented with vertical lines).

The ZBP encoding unit 252 subjects the position of a zero bit plane to variable length encoding using a VLC table, and generates zero bit encoded information. As a variable length encoding method, for example, Huffman coding, tag tree encoding employed with JPEG (Joint Photographic Experts Group) 2000, or the like is used. Subsequently, the ZBP encoding unit 252 supplies the planed DWT value and the zero bit encoded information to the SB encoding unit 253.

The planed DWT value and the zero bit encoded information from the ZBP encoding unit 252, and the positive/negative sign from the DWT unit 251 are supplied to the SB encoding unit 253. The SB encoding unit 253 determines an SIG block from the position of the zero bit plane that the zero bit encoded information represents.

Figure 32:
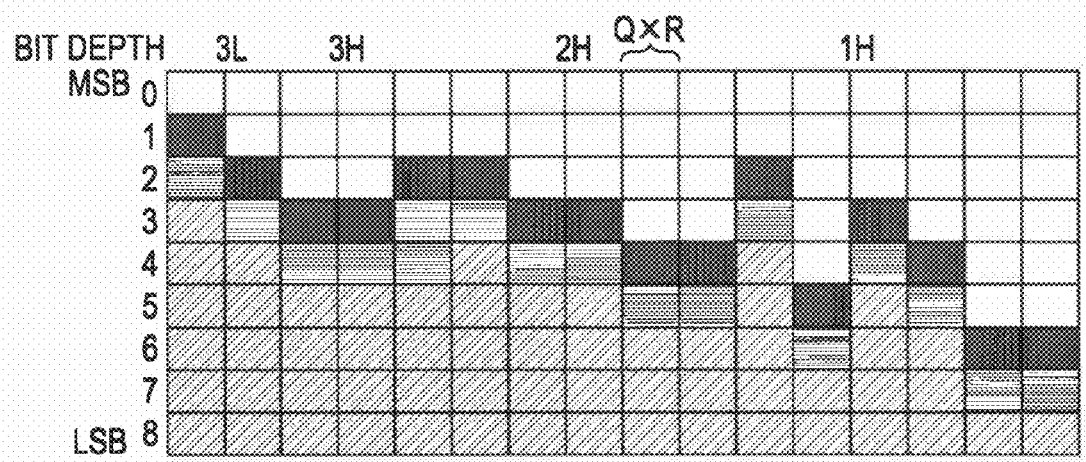
FIG. 32 is a schematic diagram illustrating SIG bit planes.

Here, such as shown in FIG. 32, one lower block of a zero bit plane, i.e., a coding plane wherein "1" is obtained on the uppermost position as viewed from the MSB side (represented with horizontal lines) will be referred to as SIG plane. This SIG plane includes "1" positioned in the uppermost position within each DWT absolute value, and accordingly, has the highest significance.

The SB encoding unit 253 encodes each bit included in the SIG plane using the VLC table. Also, the SB encoding unit 253 confirms the SIG plane in increments of one bit, and in the case that a bit of "1" is obtained, encodes the positive/negative sign corresponding to the DWT absolute value to which the bit thereof belongs. Note that the SB encoding unit 253 does not encode the positive/negative sign corresponding to a bit of "0".

Subsequently, the SB encoding unit 253 supplies the SIG bit included in the encoded SIG plane, and the positive/negative sign corresponding to "1" to the RB encoding unit 254 as SIG encoded information along with the planed DWT value and zero bit encoded information.

The planed DWT value and the SIG bit encoded information from the SB encoding unit 253, and the positive/negative sign from the DWT unit 251 are supplied to the RB encoding unit 254. The RB encoding unit 254 determines a RF plane from the position of the zero bit plane that the zero bit encoded information represents.

Here, a plane lower than the SIG plane (represented with slanted lines) will be referred to as a RF plane. Incidentally, as described above, with the DWT absolute value, the lower the frequency is, the higher significance is, and the higher the frequency is, the lower significance is. Also, with the planed DWT value, the lower MSB side the bit depth is, the higher significance is, and the deeper LSB side the bit depth is, the lower significance is.

Figure 33:
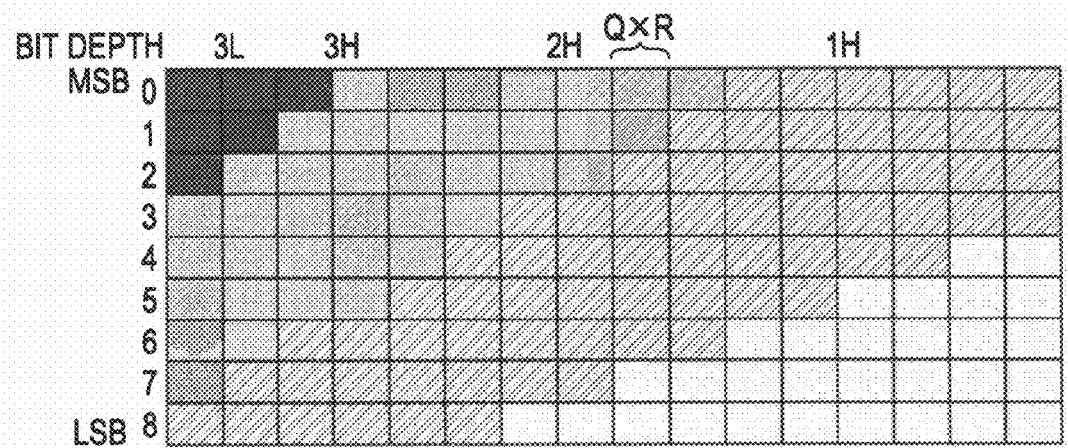
FIG. 33 is a schematic diagram illustrating importance of zero bit planes.

That is to say, such that imagery is shown in FIG. 33, with the planed DWT value, the upper left the position is, the higher significance is, and the lower right the position is, the lower significance is. Accordingly, the RB encoding unit 254 encodes the coding planes in order from a coding plane of which the significance is high with the planed DWT value.

Specifically, the RB encoding unit 254 scans from the planed DWT value of which the significance is high, and skips the zero planes and SIG planes based on the SIG encoded information, thereby encoding only each RF bit of the RF planes.

At this time, the RB encoding unit 254 encodes each bit included in the RF planes using the VLC table. Also, the RB encoding unit 254 confirms the RF planes in increments of one bit (i.e., for each RF bit), and in the case that a bit of "1" is obtained, confirms the upper bits. In the case that the upper bits do not include "1", the RB encoding unit 254 encodes the positive/negative sign corresponding to the DWT absolute value to which the RF bit belongs. Hereafter, the encoded RF plane and positive/negative sign will be referred to RF encoded information.

In other words, the SB encoding unit 253 and the RB encoding unit 254 confirm the DWT absolute value from the upper bit, and only when "1" is obtained for the first time, encode the positive/negative sign corresponding to the DWT absolute value.

At this time, the RB encoding unit 254 sets the value obtained by subtracting the code amount used for the color difference signal use bit count IBc and the header from the code amount of the code block serving as the fixed code amount (bus transfer increments), to the luminance target code amount. Subsequently, upon the luminance total code amount that is the total code amount of the zero bit encoded information, SIG encoded information, and RF encoded information reaching the luminance target code amount, the RB encoding unit 254 takes the range fitting in this luminance target code amount as RF encoded information. Subsequently, the RB encoding unit 254 generates discarding information representing the position where encoding has been completed.

Note that in the case that encoding of all the RF planes has been completed before the total code amount reaches the luminance target code amount, the RB encoding unit 254 ends encoding at that time, and generates discarding information.

Figure 34:
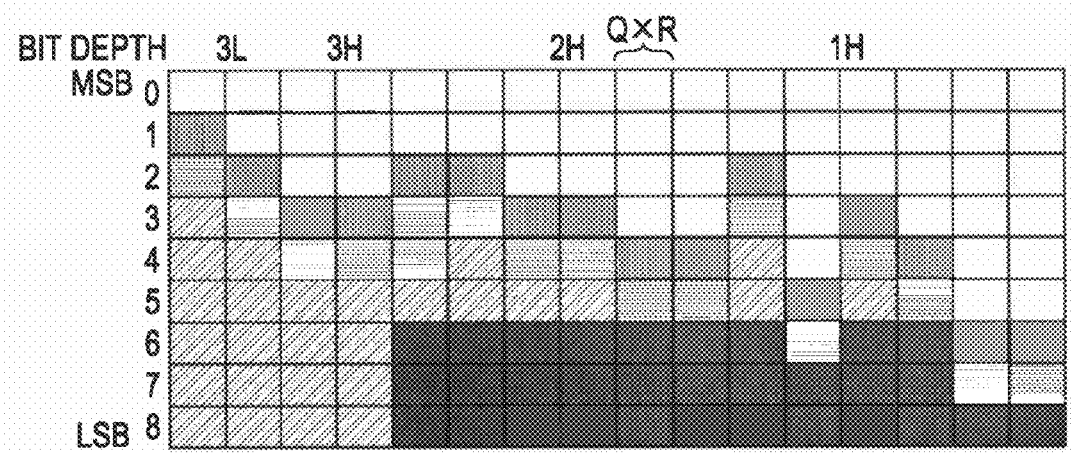
FIG. 34 is a schematic diagram for describing discarding of bit planes.

That is to say, such as shown in FIG. 34, in the case that the luminance total code amount has reached the luminance target code amount before ending encoding of all the RF planes, the RB encoding unit 254 discards the RF planes wherein encoding has not been completed. Thus, the RB encoding unit 254 can discard only bits having low significance, and accordingly, deterioration of the image quality can be kept minimal.

Also, the RB encoding unit 254 encodes the RF planes until the luminance total code amount reaches the luminance target code amount, and generates RF encoded information within a range fitting in the luminance target code amount. Thus, the RB encoding unit 254 can maximally bring the code amount obtained by adding the selected color difference signal bit stream BScS and the luminance quantized bit stream BSy3 closer to the code amount of the code block serving as the bus transfer increments.

Subsequently, the RB encoding unit 254 supplies the discarding information to the DWT discarding unit 256 while supplying the zero bit encoded information, SIG encoded information, RF encoded information, and discarding information to a header generating unit 255.

The header generating unit 255 generates a luminance quantized bit stream BSy3 by sorting the discarding information as the header, and supplies this to the luminance signal encoding mode selecting unit 204.

Here, the post quantizing unit 203 generates a luminance image quality evaluated value EVy3 representing how much the image quality of the luminance signal PY deteriorates using post quantization processing by an image quality evaluating unit 258.

Incidentally, lossy encoding wherein the image quality may deteriorate with the post quantization processing involves only discarding of the RF planes. Therefore, the post quantizing unit 203 discards the bit plane corresponding to the RF plane discarded with the luminance quantized bit stream BSy3, from the planed DWT value generated by the DWT unit 251. Subsequently, the post quantizing unit 203 generates a local luminance signal LY based on the planed DWT value of which the bit plane has been discarded (hereafter, referred to as "discarded DWT value").

Thus, the post quantizing unit 203 can generate, without taking the trouble to decode the encoded information (zero bit encoded information, SIG encoded information, and RF encoded information), a local luminance signal LY indicating the same image quality deterioration as with the case of decoding this encoded information.

That is to say, the post quantizing unit 203 simply discards the planed DWT value corresponding to the discarded RF plane, whereby processing load for generating a local luminance signal LY can be reduced as compared to the case of decoding the luminance quantized bit stream BSy3.

Specifically, the DWT discarding unit 256 temporarily stores the planed DWT value supplied from the DWT unit 251. Subsequently, upon the discarding information being supplied from the RB encoding unit 254, the DWT discarding unit 256 discards, of the planed DWT value, the bit plane corresponding to the RF plane discarded at the RB encoding unit 254 to generate a discarded DWT value, and supplies this to an IDWT unit 257.

Figure 35:
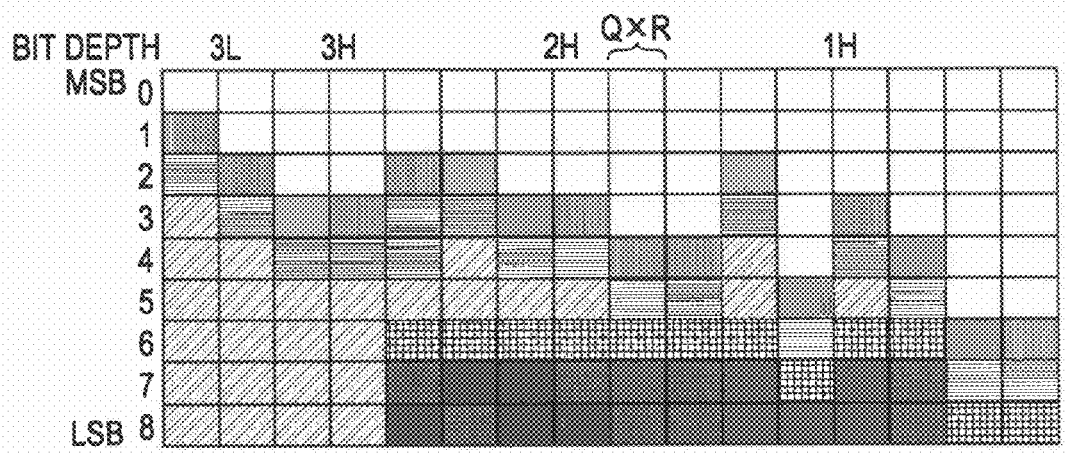
FIG. 35 is a schematic diagram for describing adding of bits.

Further, such as shown in FIG. 35, of the discarded RF planes, the DWT discarding unit 256 adds "1" to the highest-order bit plane (represented with a grid pattern). At this time, only in the case that the high-order bit plane for each RF bit includes "1", the DWT discarding unit 256 adds "1". On the other hand, in the case that the high-order bit plane does not include "1", the DWT discarding unit 256 does not add "1".

That is to say, "1" is added to the bit including "1" in the high-order bit plane, whereby the same effect as the case of rounding the discarded bit can be obtained, and the image quality with the planed DWT value can be improved. This processing is executed at the time of decoding, whereby the image quality of the luminance quantized bit stream BSy3 can be improved.

That is to say, the DWT discarding unit 256 executes the same processing as with the case of decoding, thereby generating a local luminance signal LY representing the image quality at the time of being decoded.

Figure 36:
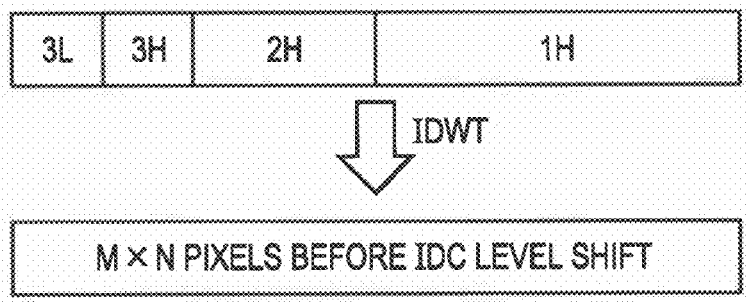
FIG. 36 is a schematic diagram for describing IDWT transform processing.
Figure 37:
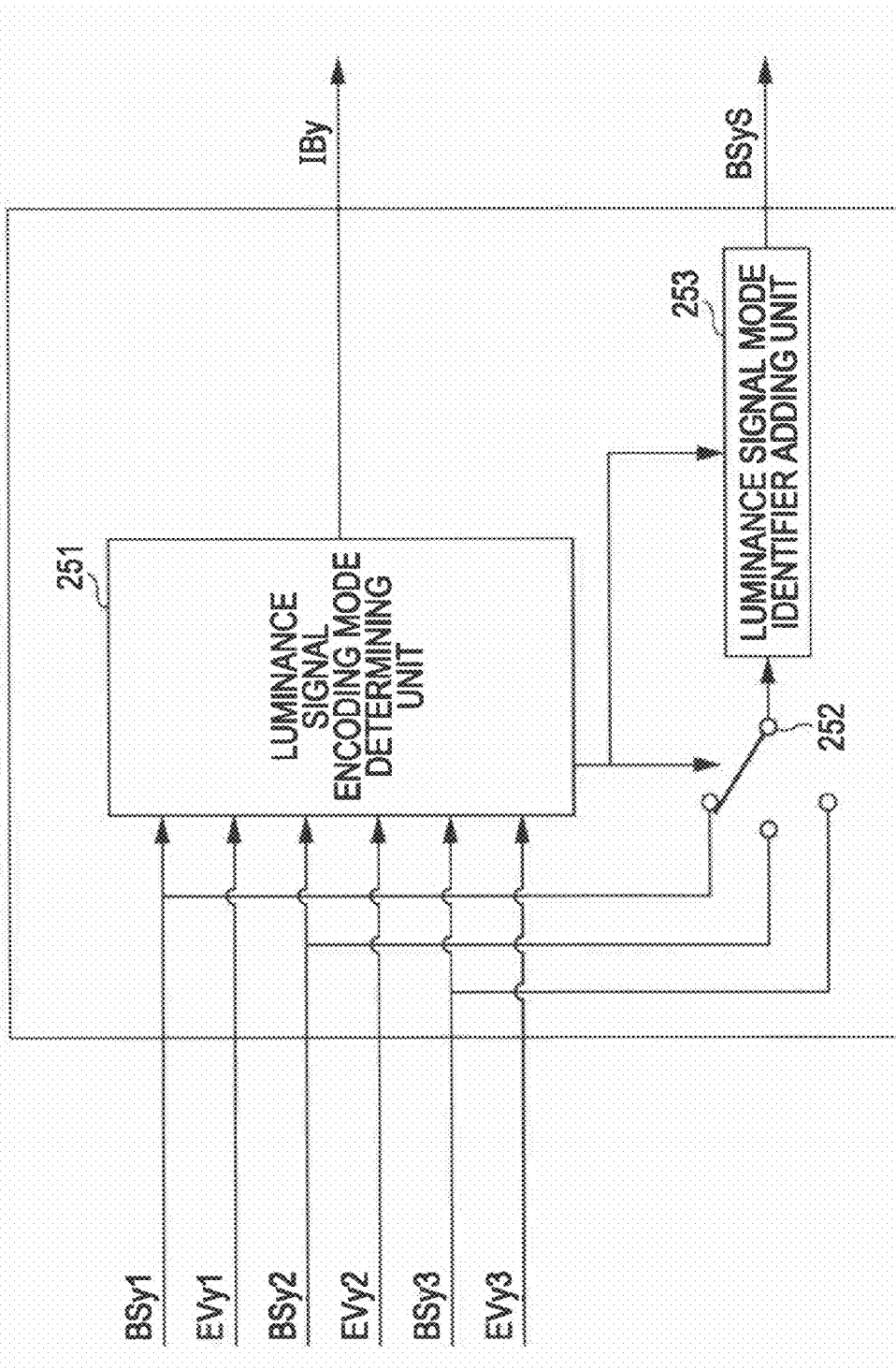
FIG. 37 is a schematic diagram illustrating the configuration of a luminance signal encoding mode selecting unit.

As shown in FIG. 36, upon the discarded DWT value to which a bit has been added being supplied, the IDWT unit 257 executes IDWT processing as to the discarded DWT value to which the bit has been added, thereby transforming the discarded DWT value made up of the four bands of 3L, 3H, 2H, and 1H into a spatial domain.

Further, the IDWT unit 257 adds the same value as the value subtracted at DC level shift to the discarded DWT value transformed into a spatial domain, thereby executing IDC level shift processing to generate a local luminance signal LY. Subsequently, the IDWT unit 257 supplies the local luminance signal LY to the image quality evaluated value calculating unit 258.

The luminance signal PY and the local luminance signal LY are supplied to the image quality evaluated value calculating unit 258. The image quality evaluated value calculating unit 258 calculates, for example, a mean squared error between the luminance signal PY and the local luminance signal LY, thereby calculating a value representing the degree of the image quality deterioration of the local luminance signal LY as to the luminance signal PY, and supplying this to the luminance signal encoding mode selecting unit 204 as a luminance image quality evaluated value EVy3.

Thus, the post quantizing unit 203 executes encoding in order from a bit plane having higher significance, and in the case of exceeding the luminance signal target code amount based on the color difference use bit count IBc, discards this bit plane in order from a bit plane having lower significance.

Thus, the post quantizing unit 203 can maximally bring the total code amount of the luminance quantized bit stream BSy3 and the selected color difference signal bit stream BScS closer to the target code amount (bus transfer increments). Accordingly, in the case of having generated a code block using the luminance quantized bit stream BSy3, the post quantizing unit 203 does not have to add dummy data in this code block.

1-5-3. Configuration of Luminance Signal Encoding Mode Selecting Unit

Next, the luminance signal encoding mode selecting unit 204 will be described. As shown in FIG. 26, the luminance high-compression bit stream BSy1 and luminance image quality evaluated value EVy1, the luminance low-compression bit stream BSy2 and luminance image quality evaluated value EVy2, and the luminance quantized bit stream BSy3 and luminance image quality evaluated value EVy3 are supplied to the luminance signal encoding mode selecting unit 204.

The luminance signal encoding mode selecting unit 204 compares the luminance image quality evaluated values EVy1, EVy2, and EVy3, and selects the luminance signal encoding mode corresponding to the best (the least value) luminance image quality evaluated value EVy as the selected luminance mode.

Subsequently, the luminance signal encoding mode selecting unit 204 adds a luminance mode identifier representing this luminance signal encoding mode to the luminance signal bit stream BSy corresponding to the selected luminance mode, and supplies this to the multiplexing unit 36 as the selected luminance signal bit stream BSyS. Also, the luminance signal encoding mode selecting unit 204 generates a luminance signal use bit count IBy representing the code amount of the selected luminance signal bit stream BSyS, and supplies this to the color difference signal encoding mode reselecting unit 35.

Here, the luminance signal encoding unit 34 realizes quantization by a technique greatly different from the luminance high-compression processing unit 201 and luminance low-compression processing unit 202. Accordingly, the luminance signal encoding mode selecting unit 204 can select the luminance signal bit stream BSy having the best image quality from the three types of the luminance signal bit stream BSy having a different image quality deterioration degree as the selected luminance signal bit stream BSyS.

That is to say, the luminance signal encoding mode selecting unit 204 executes a great number of different quantization processes, whereby deterioration in image quality as to the luminance signal PY made up of various types of image quality can be kept minimal.

Note that, in the case that there are multiple luminance signal encoding modes having the same luminance image quality evaluated value EVy, the luminance signal encoding mode selecting unit 204 selects the luminance signal encoding mode wherein the code amount of the luminance signal bit stream BSy is small.

Thus, in the case that the multiple luminance signal bit streams BSy have the same image quality, the luminance signal encoding mode selecting unit 204 can suppress the code amount of the luminance signal bit stream BSy.

1-5-4. Specific Processing Procedure

Next, a luminance signal encoding processing procedure RT6 will be described with reference to the flowcharts in FIGS. 38 through 41.

Upon the luminance signal PY, encoding difficulty level ID, and color difference signal use bit count IBc being supplied, the luminance signal encoding unit 34 starts the luminance signal encoding processing procedure RT6, and proceeds to step SP201.

In step SP201, the luminance signal encoding unit 34 proceeds to step SP141 in the subroutine SRT11 (FIG. 19), and upon encoding the luminance signal PY in the high-compression mode, proceeds to the next step SP202.

In step SP202, the luminance signal encoding unit 34 proceeds to step SP141 in the subroutine SRT11 (FIG. 19), and upon encoding the luminance signal PY in the low-compression mode, proceeds to the next step SP203.

Now, let us say that, with the subroutine SRT11, the color difference signal encoding unit 33 is read as the luminance signal encoding unit 34, the color difference signal PVU as the luminance signal PY, the local color difference signals LVU as the local luminance signal LY, and the color difference signal bit stream BSc as the luminance signal bit stream BSy, respectively.

Figure 39:
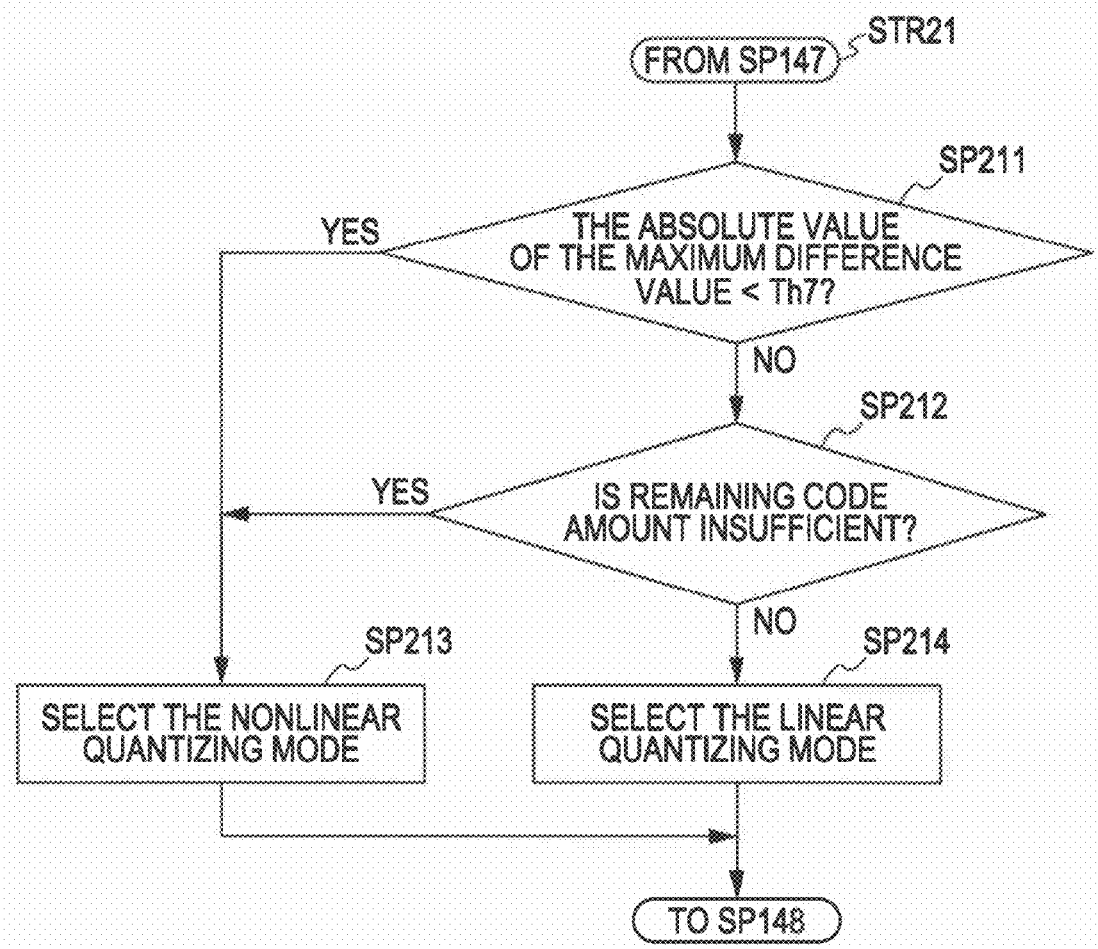
FIG. 39 is a flowchart for describing a quantizing mode selecting processing procedure at the luminance signal encoding unit.
Figure 40:
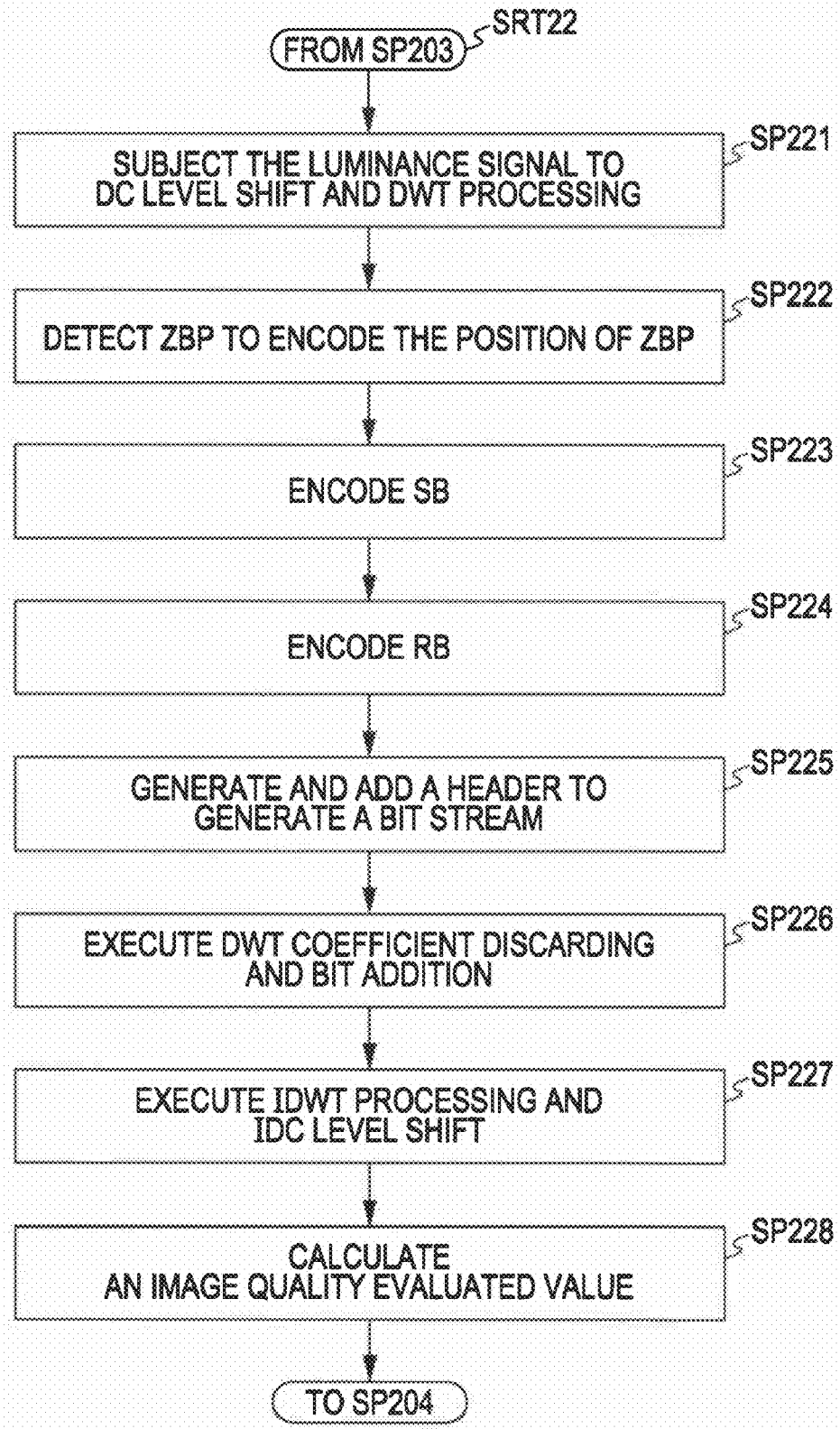
FIG. 40 is a flowchart for describing a post quantizing processing procedure.
Figure 41:
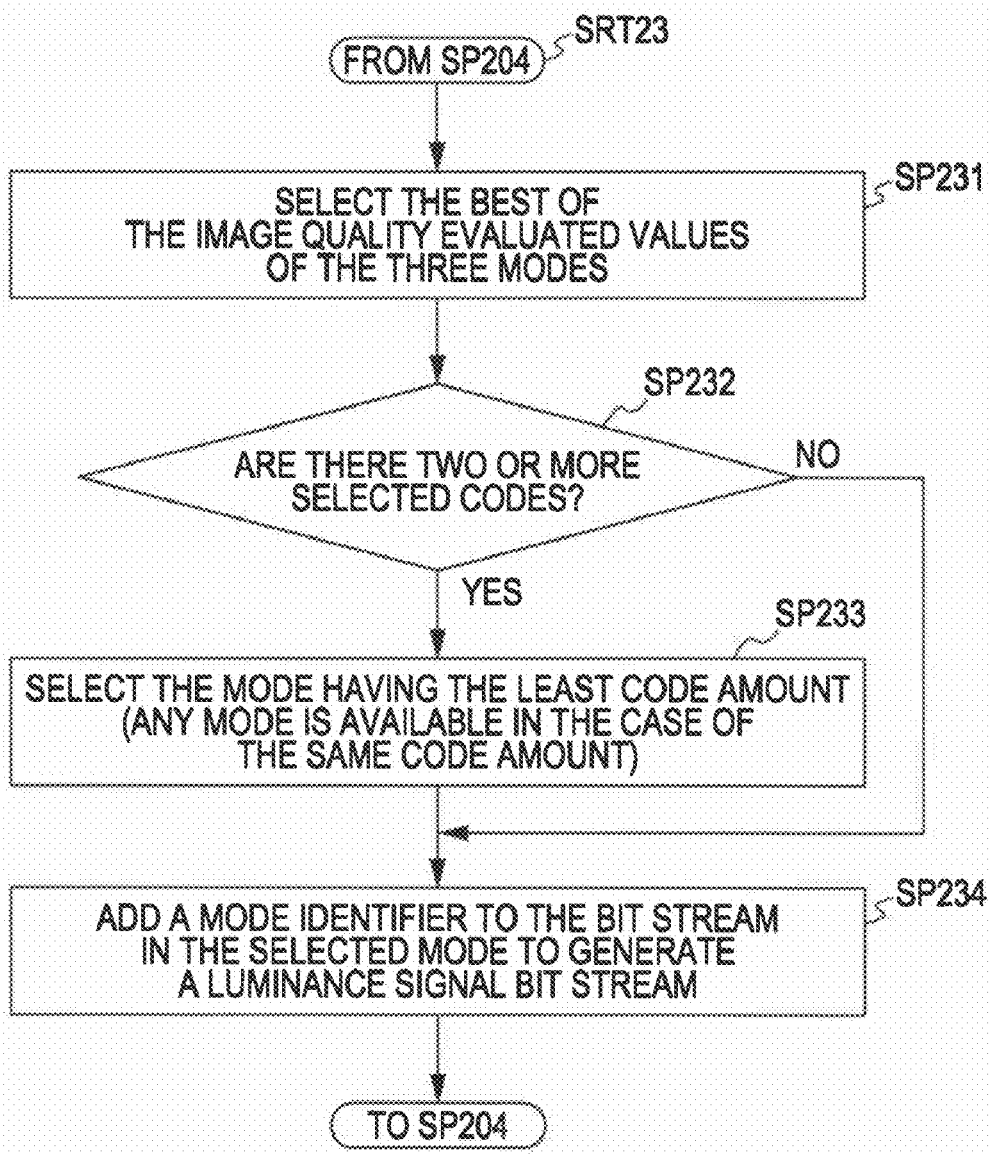
FIG. 41 is a flowchart for describing a luminance signal encoding mode selecting processing procedure.

Also, in step SP147, the luminance signal encoding unit 34 proceeds to step SP211 in subroutine SRT21 representing a quantizing mode selecting processing procedure at the luminance signal encoding unit (FIG. 39).

In step SP211, the luminance signal encoding unit 34 determines whether or not the difference maximum value is less than the nonlinear quantizing mode threshold Th7.

Here, upon obtaining a positive result, this represents that the image quality does not deteriorate greatly even if the nonlinear quantization processing is executed as to the sub-block, and accordingly, the linear quantizing mode should be selected as the selected quantizing mode. At this time, the luminance signal encoding unit 34 proceeds to the next step SP213.

On the other hand, in step SP211, upon obtaining a negative result, this represents that there is a possibility that the image quality may deteriorate greatly at the time of executing the nonlinear quantization processing as to the sub-block. At this time, the luminance signal encoding unit 34 proceeds to the next step SP212.

In step SP212, the luminance signal encoding unit 34 compares the luminance signal target code amount and the code amount of the already encoded sub-block, and determines whether or not the remaining code is sufficient.

Here, in the case of having obtained a positive result, this represents that the nonlinear quantizing mode should be selected to suppress the code amount of the sub-block to be encoded from now. At this time, the luminance signal encoding unit 34 proceeds to the next step SP213.

On the other hand, in the case of having obtained a negative result in step SP212, this represents that the code amount of the sub-block does not have to be suppressed, and accordingly, the linear quantizing mode should be selected. At this time, the luminance signal encoding unit 34 proceeds to the next step SP214.

In step SP213, upon selecting the nonlinear quantizing mode as the quantizing mode, the luminance signal encoding unit 34 proceeds to step SP148 in the subroutine SRT11 (FIG. 19).

Similarly, in step SP214, upon selecting the linear quantizing mode as the quantizing mode, the luminance signal encoding unit 34 proceeds to step SP148 in the subroutine SRT11 (FIG. 19).

Figure 38:
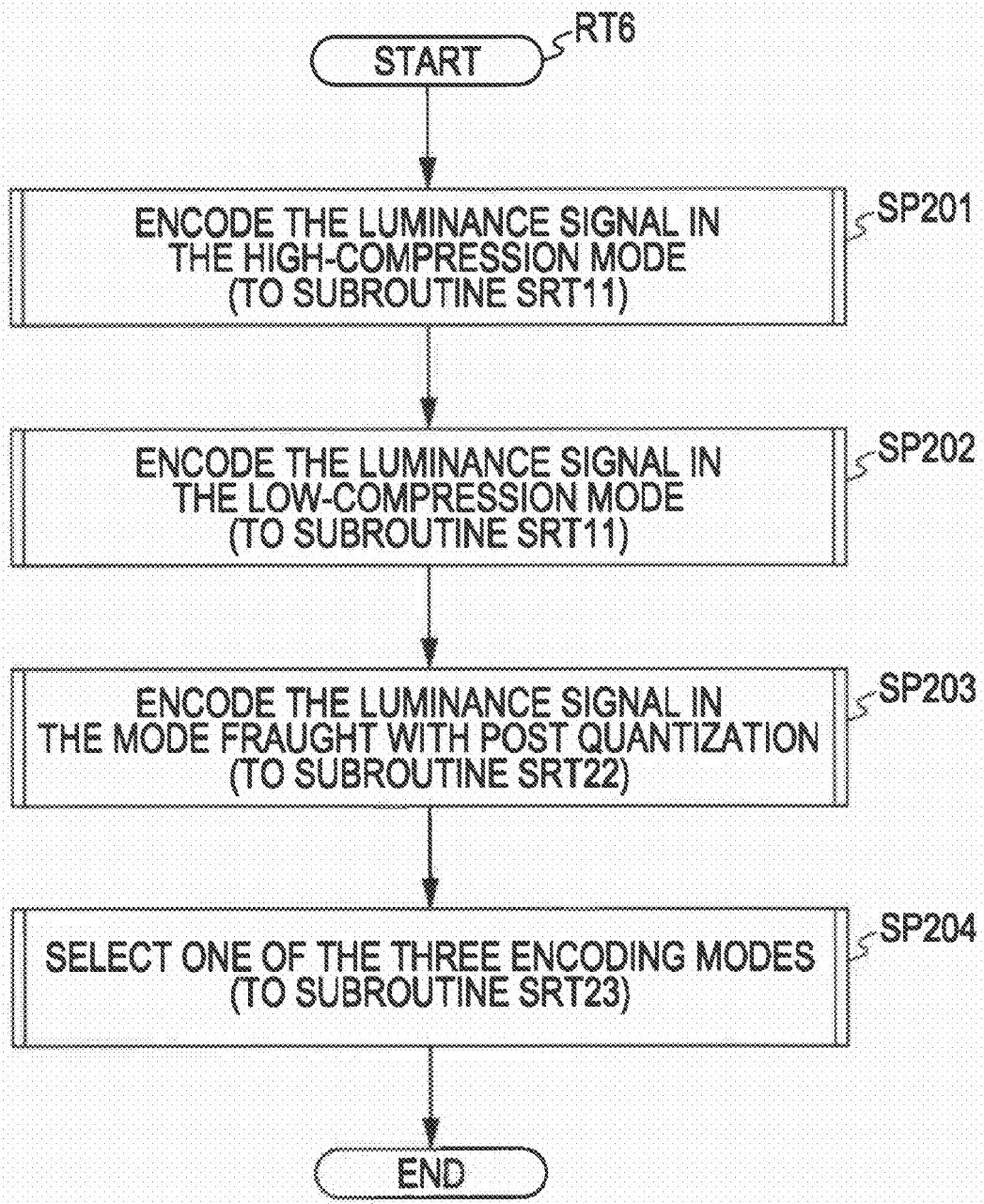
FIG. 38 is a flowchart for describing a luminance signal encoding processing procedure.

Subsequently, upon ending the subroutine SRT11, the luminance signal encoding unit 34 returns to step SP203 of the luminance signal encoding processing procedure RT6 (FIG. 38).

In step SP203, the luminance signal encoding unit 34 proceeds to step SP221 of a subroutine SRT22 (FIG. 40), and executes the post quantization processing as to the luminance signal PY.

In step SP221, the luminance signal encoding unit 34 executes the DC level shift and DWT processing as to the luminance signal PY for each processing block to calculate a DWT absolute value and a positive/negative sign. Further, upon breaking the DWT absolute value down into bit planes to generate a planed DWT value, the luminance signal encoding unit 34 proceeds to the next step SP222.

In step SP222, with the planed DWT value, the luminance signal encoding unit 34 detects the last bit plane wherein the bits of all the upper bit planes including the self bit plane are all "0", as a zero bit plane. Upon encoding the position of the zero bit plane, the luminance signal encoding unit 34 proceeds to the next step SP223.

In step SP223, upon detecting a bit plane having "1" for the first time as counted from the upper bit planes as an SIG plane, and encoding the SIG bit of this SIG plane, the luminance signal encoding unit 34 proceeds to the next step SP224.

In step SP224, the luminance signal encoding unit 34 detects a RF plane existing in the lower position than the SIG plane. Subsequently, upon encoding the RF bit of this RF plane until the code amount reaches the luminance signal target code amount, or all the RF bits are encoded, the luminance signal encoding unit 34 proceeds to the next step SP225.

In step SP225, upon generating a luminance quantized bit stream BSy3 by generating a header, and adding this header to the encoded information encoded in steps SP222, SP223, and SP224, the luminance signal encoding unit 34 proceeds to the next step SP226.

In step SP226, the luminance signal encoding unit 34 executes discarding of the bit plane corresponding to the RF plane not encoded in step SP224 as to the planed DWT value generated in step SP221 to generate a discarded DWT value. Further, upon adding "1" to the upper bits having "1" at the uppermost bit plane of the discarded bit planes, the luminance signal encoding unit 34 proceeds to the next step SP227.

In step SP227, upon generating a local luminance signal LY by executing the IDWT processing and IDC level shift processing as to the discarded DWT value to which the bit is added in step SP226, the luminance signal encoding unit 34 proceeds to the next step SP228.

In step SP228, upon calculating the deterioration degree of the local luminance signal LY as to the luminance signal PY as the luminance image quality evaluated value EVy3, the luminance signal encoding unit 34 proceeds to step SP204 in the luminance signal encoding processing procedure RT6 (FIG. 38).

In step SP204, the luminance signal encoding unit 34 proceeds to step SP231 in subroutine SRT23 (FIG. 41) representing a luminance signal encoding mode selecting processing procedure, and selects one of the three luminance signal encoding modes.

In step SP231, upon selecting the luminance signal encoding mode corresponding to the best luminance image quality evaluated value EVy of the three luminance signal encoding modes, the luminance signal encoding unit 34 proceeds to the next step SP232.

In step SP232, the luminance signal encoding unit 34 determines whether or not there are two or more luminance modes selected in step SP231.

Here, in the case of having obtained a positive result, this represents that one of the luminance signal encoding modes should be selected. At this time, the luminance signal encoding unit 34 proceeds to the next step SP233.

In step SP233, upon selecting one luminance signal encoding mode having the least code amount as the selected luminance mode, of the luminance signal encoding modes, the luminance signal encoding unit 34 proceeds to the next step SP234. Note that, in the case of the same code amount, any luminance signal encoding mode may be selected.

On the other hand, in the case of having obtained a negative result in step SP232, this represents that one luminance signal encoding mode has already been selected. At this time, upon selecting this selected luminance signal encoding mode as the selected luminance mode, the luminance signal encoding unit 34 proceeds to the next step SP234.

In step SP234, the luminance signal encoding unit 34 generates a selected luminance signal bit stream BSyS by adding a luminance mode identifier to the luminance signal bit stream BSy corresponding to the selected luminance mode as a header. Subsequently, the luminance signal encoding unit 34 returns to step SP204 in the luminance signal encoding processing procedure RT6 (FIG. 38), and proceeds to the end step to end the luminance signal encoding processing procedure RT6.

1-6. Configuration of Color Difference Encoding Mode Reselecting Unit

Next, the configuration of the color difference encoding mode reselecting unit 35 will be described. The color difference encoding mode reselecting unit 35 reselects the color difference signal bit stream BSc based on the actual code amount of the selected luminance signal bit stream BSyS.

Figure 42:
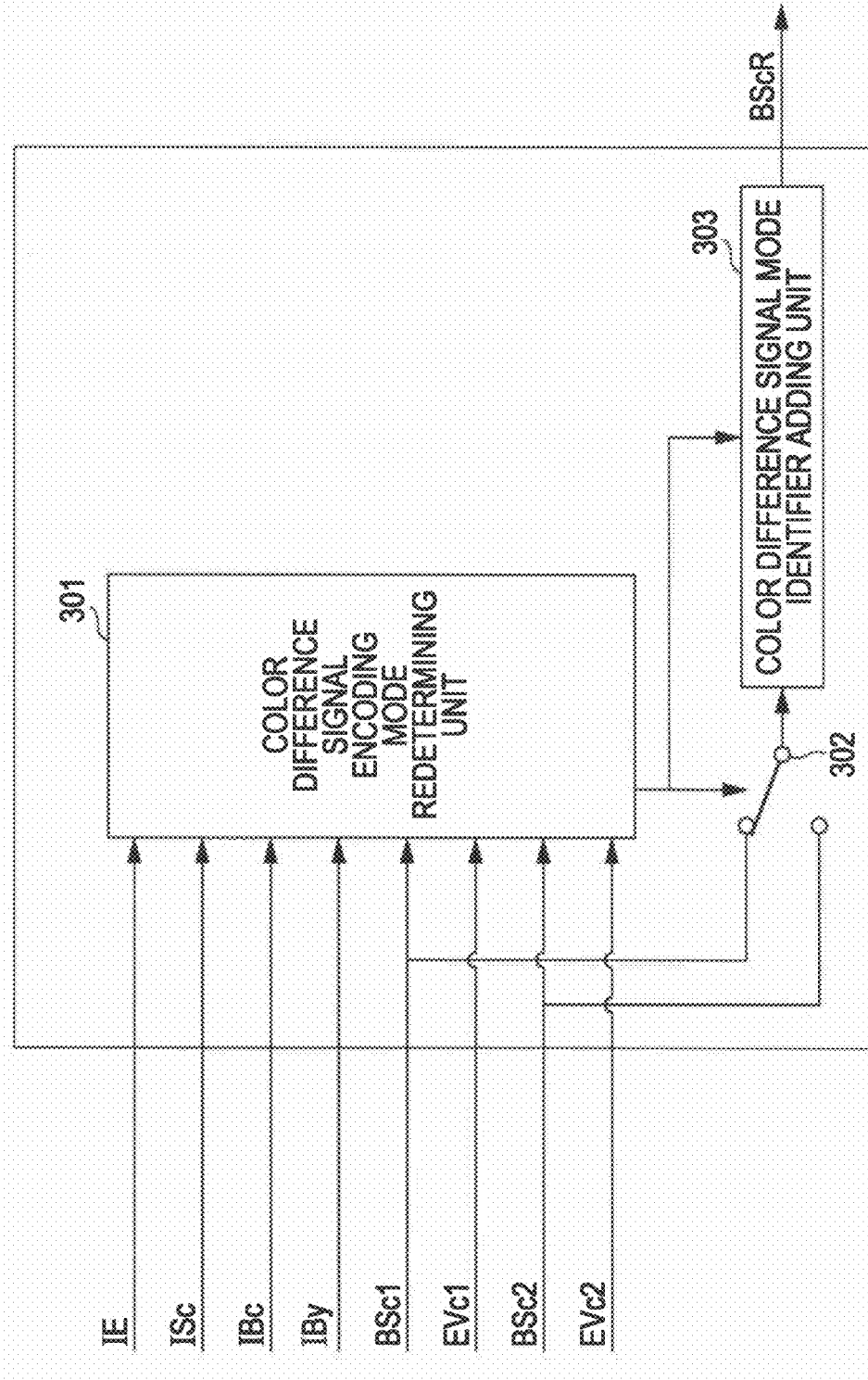
FIG. 42 is a schematic diagram illustrating the configuration of a color difference signal encoding mode reselecting unit.

As shown in FIG. 42, the color specification information IE, color difference signal mode selecting information ISc, color difference signal use bit count IBc, luminance signal us bit count IBy, color difference high-compression bit stream BSc1, color difference image quality evaluated value EVc1, color difference low-compression bit stream BSc2, and color difference image quality evaluated value EVc2 are supplied to the color difference encoding mode reselecting unit 35.

As described above, the luminance signal encoding unit 34 generates a luminance signal bit stream BSy in the three luminance signal encoding modes such that the code amount fits in the luminance signal target code amount, and also selects one luminance signal encoding mode. In other words, the code amount of the luminance signal bit stream BSy is controlled so as not to exceed the luminance signal target code amount, but high-precision rate control is not executed wherein the code amount is increased so as to approximate to the luminance signal target code amount.

With the luminance high-compression bit stream BSy1 and the luminance low-compression bit stream BSy2, for example, in the case that the difference maximum value of the sub-blocks is small, and only the nonlinear quantizing mode has frequently been selected, there is a possibility that the code amount for each processing block may be less than the luminance signal target code amount.

Also, with the luminance quantized bit stream BSy3, in the case that the DWT absolute value is small, and also the number of RF planes is small, even if all the RF planes are encoded, there is a possibility that the code amount for each processing block may be much less than the luminance signal target code amount.

Here, the selected luminance signal bit stream BSyS having the best image quality has been selected, and accordingly, there is no room for reselection. Therefore, the color difference encoding mode reselecting unit 35 reselects the color difference signal bit stream BSc based on the luminance signal use bit count IBy. Thus, the color difference encoding mode reselecting unit 35 uses the code amount allowed for the code block serving as the fixed code amount (bus transfer increments) exhaustively to suppress deterioration in image quality to the minimum.

Specifically, the color difference signal encoding mode redetermining unit 301 of the color difference signal encoding mode reselecting unit 35 confirms whether or not the processing block is a particular color block based on the color specification information IE. In the case that the processing block is a particular color block, the color difference encoding mode reselecting unit 35 selects the low-compression mode suitable for this particular color block as the color difference signal encoding mode.

Also, in the case that the processing block is not a particular color block, the color difference signal encoding mode redetermining unit 301 sets the value obtained by subtracting the code amount that the luminance signal use bit count IBy represents from the bus transfer increments to a reselected target code amount.

Subsequently, the color difference signal encoding mode redetermining unit 301 reselects the color difference signal encoding mode having better image quality within a range fitting in the reselected target code amount, and takes this as a reselected color difference mode.

First, the color difference signal encoding mode redetermining unit 301 determines the selected color difference mode by the color difference signal encoding mode selecting unit 113 based on the color difference signal mode selection information ISc.

Subsequently, in the case that the low-compression mode has been selected, the color difference signal encoding mode redetermining unit 301 confirms that the color difference signal encoding mode having better image quality has already been selected. Upon confirming that the color difference image quality evaluated value EVc2 of the low-compression mode is better than the color difference image quality evaluated value EVc1 of the high-compression mode, the color difference signal encoding mode redetermining unit 301 reselects the low-compression mode without change.

Even in the case that the color difference image quality evaluated value EVc2 of the low-compression mode is not better than the color difference image quality evaluated value EVc1 of the high-compression mode, in the event that the code amount due to the high-compression mode does not fit in the reselected target code amount, the color difference signal encoding mode redetermining unit 301 reselects the low-compression mode without change.

On the other hand, in the case that the color difference image quality evaluated value EVc1 of the high-compression mode is not better than the color difference image quality evaluated value EVc2 of the low-compression mode, and also in the event that the code amount due to the high-compression mode fits in the reselected target code amount, the color difference signal encoding mode redetermining unit 301 reselects the high-compression mode having better image quality.

Also, in the case that the high-compression mode has been selected, when the color difference image quality evaluated value EVc1 of the high-compression mode is better than the color difference image quality evaluated value EVc2 of the low-compression mode, the color difference signal encoding mode redetermining unit 301 reselects the high-compression mode without change.

Even in the case that the color difference image quality evaluated value EVc1 of the high-compression mode is not better than the color difference image quality evaluated value EVc2 of the low-compression mode, when the code amount due to the low-compression mode does not fit in the reselected target code amount, the color difference signal encoding mode redetermining unit 301 reselects the high-compression mode without change.

On the other hand, in the case that the color difference image quality evaluated value EVc1 of the high-compression mode is not better than the color difference image quality evaluated value EVc2 of the low-compression mode, and also the code amount due to the low-compression mode fits in the reselected target code amount, the color difference signal encoding mode redetermining unit 301 reselects the low-compression mode having better image quality.

Subsequently, the color difference signal encoding mode redetermining unit 301 supplies the reselected information representing the color difference signal bit stream BSc corresponding to the reselected color difference encoding mode to a switching unit 302 and a color difference signal mode identifier adding unit 303.

The color difference high-compression bit stream BSc1 and the color difference low-compression bit stream BSc2 are supplied to the switching unit 302. The switching unit 302 supplies the color difference signal bit stream BSc corresponding to the reselected color difference signal encoding mode to the color difference signal mode identifier adding unit 303 in accordance with the reselected information.

The color difference signal mode identifier adding unit 303 generates a reselected color difference signal bit stream BScS by adding a reselected color difference mode identifier representing the reselected color difference mode that the reselected information represents to the supplied color difference signal bit stream BSc. The color difference signal mode identifier adding unit 303 supplies the reselected color difference signal bit stream BScS to the multiplexing unit 36.

As described above, the same value corresponding to the encoding difficulty level ID is set to the color difference high-compression processing unit 111 and the color difference low-compression processing unit 112 of the color difference signal encoding unit 33 as the color difference target code amount.

In the case that the encoding difficulty level ID indicates "high", the color difference signal encoding unit 33 takes only the nonlinear quantizing mode as the selected quantizing mode, and generates a color difference high-compression bit stream BSc1 and a color difference low-compression bit stream BSc2, made up of the nonlinear quantized value using a different nonlinear table.

In this case, the code amount of the color difference high-compression bit stream BSc1 is less than the code amount of the color difference low-compression bit stream BSc2 according to difference between the nonlinear tables. The color difference signal encoding unit 33 has selected the color difference high-compression bit stream BSc1 having a small code amount as the selected color difference signal bit stream BScS.

Accordingly, in the case that the encoding difficulty level ID indicates "high", and the code amount fits in the reselected target code amount, the color difference signal encoding mode reselecting unit 35 can reselect the color difference low-compression bit stream BSc2 having better image quality as the reselected color difference signal bit stream BScR.

Also, in the case that the encoding difficulty level ID indicates "low", the color difference signal encoding unit 33 executes nonlinear quantization as to a sub-block having low deterioration in image quality due to nonlinear quantization. The color difference signal encoding unit 33 executes linear quantization as to a sub-block having great deterioration in image quality due to nonlinear quantization within a range wherein the code amount of the color difference signal bit stream BSc is included in the color difference target code amount.

In this case, essentially, the code amount of the color difference high-compression bit stream BSc1 is less than the code amount of the color difference low-compression bit stream BSc2 due to difference of nonlinear tables and quantization precision. Also, essentially, the image quality of the color difference high-compression bit stream BSc1 deteriorates as compared to the image quality of the color difference low-compression bit stream BSc2.

Accordingly, the color difference signal encoding unit 33 essentially selects the color difference high-compression bit stream BSc1 wherein the code amount may be great and the image quality may be better, as the selected color difference signal bit stream BScS. However, there is a case where the code amount or image quality, or relationship between both thereof is inverted with the color difference high-compression bit stream BSc1 and the color difference low-compression bit stream BSc2.

In the case that one of the code amount and the image quality is inverted, the color difference signal encoding unit 33 prioritizes the principle to select the color difference low-compression bit stream BSc2. In other words, there is a possibility that the color difference signal encoding unit 33 may select the color difference low-compression bit stream BSc2 having low image quality and small code amount as compared to the color difference high-compression bit stream BSc1, as the selected color difference signal bit stream BScS.

Accordingly, even in the case that the encoding difficulty level ID indicates "low", the color difference signal encoding mode reselecting unit 35 can reselect the color difference high-compression bit stream BSc1 having better image quality within a range where the code amount fits in the reselected target code amount as the reselected color difference signal bit stream BScR.

Thus, the color difference signal encoding mode reselecting unit 35 reselects the color difference signal bit stream BSc having the best image quality within a range wherein the total code amount including the code amount of the selected luminance signal bit stream BSyS fits in the bus transfer increments, after the code amount of the selected luminance signal bit stream BSyS is determined.

Thus, the color difference signal encoding mode reselecting unit 35 is configured so as not to degrade the image quality while using the code amount (but transfer increments) allowed as a code block at a maximum.

Next, a color difference signal encoding mode reselecting processing procedure RT7 will be described with reference to the flowchart in FIG. 43.

Upon the color specification information IE, color difference signal mode selection information ISc, color difference signal use bit count IBc, luminance signal use bit count IBy, or the like having been supplied, the color difference signal encoding mode reselecting unit 35 starts the color difference signal encoding mode reselecting processing procedure RT7, and proceeds to the next step SP301.

In step SP301, the color difference signal encoding mode reselecting unit 35 determines whether or not the processing block is a particular color block.

Here, in the case of having obtained a positive result, this represents that deterioration in the image quality as to the color difference signal bit stream BSc is conspicuous, and accordingly, the low-compression mode having low deterioration in image quality should be selected. At this time, the color difference signal encoding mode reselecting unit 35 proceeds to the next step SP305.

On the other hand, in the case of having obtained a negative result in step SP301, the color difference signal encoding mode reselecting unit 35 proceeds to the next step SP302.

In step SP302, the color difference signal encoding mode reselecting unit 35 determines whether or not the low-compression mode has been selected as the selected color difference mode, based on the color difference signal mode selection information ISc.

Here, in the case of having obtained a positive result, this represents that there is a possibility that the color difference signal encoding mode having better image quality might have been selected. At this time, the color difference signal encoding mode reselecting unit 35 proceeds to the next step SP303.

In step SP303, the color difference signal encoding mode reselecting unit 35 determines whether the color difference image quality evaluated value EVc2 corresponding to the low-compression mode is better than the color difference image quality evaluated value EVc1 corresponding to the high-compression mode, or the code amount in the high-compression mode does not fit in the reselected target code amount.

Here, in the case of having obtained a positive result, this represents that the image quality in the low-compression mode is better than the image quality in the high-compression mode, or the code amount in the high-compression mode does not fit in the reselected target code amount, though the image quality in the high-compression mode is better than the image quality in the low-compression mode, and accordingly, the low-compression mode should be selected without change. At this time, the color difference signal encoding mode reselecting unit 35 proceeds to the next step SP305.

On the other hand, in the case of having obtained a negative result in step SP303, this represents that the image in the image quality in the high-compression mode is better than the image quality in the low-compression mode, and also the code amount of the color difference high-compression bit stream BSc2 generated with the high-compression mode fits in the reselected target code amount, and accordingly, the high-compression mode should be selected. At this time, the color difference signal encoding mode reselecting unit 35 proceeds to the next step SP306.

On the other hand, in the case of having obtained a negative result in step SP302, the color difference signal encoding mode reselecting unit 35 proceeds to the next step SP304.

In step SP304, the color difference signal encoding mode reselecting unit 35 determines one or the other of whether the color difference image quality evaluated value EVc1 corresponding to the high-compression mode is better than the color difference image quality evaluated value EVc2 corresponding to the low-compression mode, or the code amount in the low-compression mode does not fit in the reselected target code amount.

Here, in the case of having obtained a positive result, this represents that the image quality in the high-compression mode is better than the image quality in the low-compression mode, or the code amount in the low-compression mode does not fit in the reselected target code amount, though the image quality in the low-compression mode is better than the image quality in the high-compression mode, and accordingly, the high-compression mode should be selected without change. At this time, the color difference signal encoding mode reselecting unit 35 proceeds to the next step SP306.

On the other hand, in the case of having obtained a negative result in step SP304, this represents that the image in the image quality in the low-compression mode is better than the image quality in the high-compression mode, and also the code amount of the color difference low-compression bit stream BSc1 generated with the low-compression mode fits in the reselected target code amount, and accordingly, the low-compression mode should be selected. At this time, the color difference signal encoding mode reselecting unit 35 proceeds to the next step SP305.

In step SP305, upon selecting the low-compression mode as the reselected color difference mode, the color difference signal encoding mode reselecting unit 35 proceeds to the next step SP307.

In step SP306, upon selecting the high-compression mode as the reselected color difference mode, the color difference signal encoding mode reselecting unit 35 proceeds to the next step SP307.

In step SP307, upon generating a reselected color difference signal bit stream BScR by adding a reselected color difference mode identifier to the color difference signal bit stream BSc corresponding to the reselected color difference mode, the color difference signal encoding mode reselecting unit 35 proceeds to the end step to end the color difference signal encoding mode reselecting processing procedure RT7.

Note that the above series of encoding processing may be executed by hardware or software. In the case of realizing the encoding processing by software, the encoding unit 3 is formed virtually in the CPU and RAM. Subsequently, the encoding program stored in the ROM is rendered in the RAM, whereby the encoding processing is executed.

1-7. Operation and Advantage

With the above configuration, the encoding unit 3 of the image processing apparatus 1 encodes the color difference signals PVU for each processing block in each of the multiple color difference signal encoding modes (high-compression mode and low-compression mode) to generate multiple color difference signal bit streams BSc (color difference high-compression bit stream BSc1 and color difference low-compression bit stream BSc2). The encoding unit 3 selects one color difference signal encoding mode from the high-compression mode and the low-compression mode as the selected color difference mode.

The encoding unit 3 calculates a luminance target code amount by subtracting the code amount of the selected color difference signal bit stream BScS that is the color difference signal bit stream BSc encoded with the selected color difference mode from bus transfer increments that is a fixed code amount. Subsequently, the encoding unit 3 encodes the luminance signal PY for each processing block so as not to exceed this luminance target code amount to generate a selected luminance signal bit stream BSyS serving as a luminance signal bit stream.

The encoding unit 3 selects the color difference signal encoding mode corresponding to one color difference signal bit stream BSc wherein the total code amount including the code amount of the selected luminance signal bit stream BSyS is less than the bus transfer increments, and also deterioration as to the color difference signal PY is small, as the reselected color difference mode.

The encoding unit 3 multiplexes the selected luminance signal bit stream BSyS, and the reselected color difference signal bit stream BScR encoded with the reselected color difference mode to generate a bit stream BS made up of the code block of the bus transfer increments.

In other words, the encoding unit 3 generates multiple color difference signal bit streams BSc beforehand, and temporarily sets the color signal bit stream BSc assumed to be desirable as the selected color difference signal bit stream BSc. The encoding unit 3 calculates a luminance target code amount based on the subtraction value obtained by subtracting the code amount of the selected color difference signal bit stream BSc from the bus transfer increments to generate a selected luminance signal bit stream BSyS so as to fit in this luminance target code amount. The encoding unit 3 selects the color difference signal bit stream BSc having optimal image quality within the range of the reselected target code amount obtained by subtracting the code amount of the selected luminance signal bit stream BSyS from the bus transfer increments, as the reselected color difference signal bit stream BScR.

Thus, the encoding unit 3 can generate a code block using the color difference signal bit stream BSc having the least deterioration within a range wherein the total code amount including the code amount of the selected luminance signal bit stream BSyS does not exceed the bus transfer increments. As a result thereof, the encoding unit 3 can keep deterioration in the reselected color difference signal bit stream BScR used for the bit stream BS minimal, whereby the image quality as the whole bit stream BS can be improved.

The encoding unit 3 generates a color difference evaluated value EVc representing the deterioration degree of the color difference signal bit stream BSc as to the color difference signals PVU. The encoding unit 3 recognizes the deterioration degree of the color difference signal bit stream BSc as to the color difference signals PVU in each of the color difference signal encoding modes (high-compression mode and low-compression mode) based on the color difference image quality evaluated value EVc.

Thus, the encoding unit 3 compares the color difference image quality evaluated values EVc, whereby the color difference signal bit stream BSc having the least deterioration can be selected.

The encoding unit 3 analyzes the color difference signals PVU and the luminance signal PY, thereby determining whether or not the color difference signals PVU include a great number of particular colors (i.e., whether or not the processing block is a particular color block). In the case of determining that the processing block is a particular color block, the encoding unit 3 selects the low-compression mode corresponding to the color difference low-compression bit stream BSc2 having less deterioration as to the color difference signals PVU from the multiple color difference signal encoding modes as the selected color difference mode.

That is to say, the encoding unit 3 adjusts assignment of code amounts so as to assign a great code amount to the color difference signal bit stream BSc corresponding to the particular color block. Thus, deterioration in image quality can be suppressed as the whole bit stream BS, and accordingly, deterioration in the image quality of the bits stream BS can be made to be less conspicuous.

The encoding unit 3 selects, as the reselected color difference mode, the selected color difference mode selected by the color difference signal encoding mode selecting unit 113 which is a color difference mode selecting unit, as to the color difference signals PVU determined to be the particular color block.

Thus, the encoding unit 3 can suppress deterioration in the image quality of the reselected color difference signal bit stream BScR using simple processing for simply reselecting the selected color difference mode having less deterioration as to the color difference signals PVU.

The encoding unit 3 has the low-compression mode as the color difference encoding mode for preventing the particular color from deteriorating. In the case of determining that the processing block is a particular color block, the encoding unit 3 selects the low-compression mode as the selected color difference mode.

Thus, the encoding unit 3 can suppress deterioration in image quality specialized with the particular color restricted as a color specification region, and accordingly, can suppress deterioration in the image quality as to the particular color effectively.

The encoding unit 3 encodes the luminance signal PY using the post quantization processing wherein the luminance signal PY is broken down into bit planes, and bit planes having low significance are discarded so as to obtain the luminance target code amount.

The encoding unit 3 encodes the planed DWT absolute values that are the luminance signals PY broken down into bit planes, in order from the bit plane having the highest significance, and upon the encode planed DWT absolute value reaching the luminance target code amount, discards the remaining bit planes.

Thus, the encoding unit 3 can discard only bit planes having low significance, whereby deterioration in image quality due to quantization can be kept minimal. Also, in the case that all the planed DWT absolute values have been encoded, the encoding unit 3 does not execute quantization, and accordingly, prevents the image quality from deteriorating. On the other hand, the encoding unit 3 can execute encoding until the encoded planed DWT absolute value reaches the luminance target code amount, whereby deterioration in image quality can be suppressed using the luminance target code amount at a maximum. Also, the encoding unit 3 can set the code amount of the luminance quantized bit stream BSy3 to generally the luminance target code amount.

The encoding unit 3 encodes the luminance signal PY using the multiple luminance signal encoding modes including the post quantizing mode wherein the post quantization processing is executed (high-compression mode, low-compression mode, and post quantizing mode). The encoding unit 3 selects the luminance signal encoding mode corresponding to the luminance signal bit stream BSy having the least deterioration as to the luminance signal PY from the high-compression mode, low-compression mode, and post quantizing mode, as the selected luminance mode.

Thus, the encoding unit 3 can encode the luminance signal PY using an encoding method different from the high-compression mode and low-compression made up of generally the same encoding method. As a result thereof, even in the event that image quality deteriorates extremely with one of the encoding methods, the encoding unit 3 may execute encoding with the other encoding method, whereby deterioration in image quality can be suppressed as to the luminance signal PY made up of various images effectively.

The encoding unit 3 generates a luminance image quality evaluated value EVy representing the deterioration degree of the luminance signal bit stream BSy corresponding to the luminance signal PY. The encoding unit 3 recognizes the deterioration degree of the luminance signal bit stream BSy corresponding to the luminance signal PY, with the luminance signal encoding mode, based on the luminance image quality evaluated value EVy. Thus, the encoding unit 3 can select the luminance signal bit stream BSy having the least deterioration by comparing the luminance image quality evaluated values EVy.

With the DWT absolute value, the encoding unit 3 generates a discarded DWT value serving as a discarded bit plane by discarding the bit plane corresponding to the remaining bit plane discarded by the luminance signal encoding unit 34, and calculates the deterioration degree of this discarded DWT value corresponding to the luminance signal PY as the luminance image quality evaluated value EVy3.

Thus, the encoding unit 3 can accurately represent deterioration in image quality due to quantization wherein a bit plane has been discarded, as a discarded DWT value. Accordingly, the encoding unit 3 can accurately calculate the luminance image quality evaluated value EVy3 using simple processing as compared to the case of calculating the deterioration degree as to the luminance signal PY by decoding the luminance quantized bit stream BSy3.

In the case that there is "1" on the upper bit of the bit plane positioned in the uppermost position, of the discarded bit planes, the encoding unit 3 adds "1" to the discarded DWT value to generate a luminance image quality evaluated value EVy3 based on the discarded DWT value to which the bit has been added.

Thus, the encoding unit 3 can execute the same processing as with the luminance signal PY generated with decoding by the decoding unit 5, whereby the deterioration degree of the image quality at the time of decoding can be accurately reflected in the luminance image quality evaluated value EVy3.

The encoding unit 3 breaks down the DWT absolute value that is the luminance signal PY subjected to orthogonal transformation into bit planes. Thus, the encoding unit 3 can concentrate bits in a low-frequency region, whereby deterioration in image quality caused at the time of discarding bit planes can be reduced.

The encoding unit 3 represents the luminance signal PY with a positive/negative sign and a value less 1 bit than the luminance signal by executing DC level shift, and breaks down the DWT absolute value that is the orthogonal transformed value generated by subjecting the luminance signal PY subjected to DC level shift to orthogonal transformation into bit planes as the luminance signals PY.

Thus, the encoding unit 3 can process the DWT absolute value as the value less 1 bit than the luminance signal, and accordingly, the bit depth of a bit plane can be reduced by one hierarchy, and the number of bit planes to be discarded can be reduced.

The encoding unit 3 can further reduce deterioration in image quality caused at the time of discarding a bit plane effectively by concentrating bits to a low-frequency region using the DWT as orthogonal transformation.

The encoding unit 3 has the low-compression mode and the high-compression mode that are compression encoding modes as the multiple luminance signal encoding modes. With the low-compression mode and the high-compression mode, the encoding unit 3 divides a processing block into sub-blocks that are smaller than this processing block.

In the case of predicting that deterioration in the image quality of a sub-block is small according to the nonlinear quantizing mode that is a first mode whereby the code amount can be reduced, the encoding unit 3 encodes this sub-block using the nonlinear quantizing mode.

In the case of predicting that deterioration in the image quality of a sub-block is great according to the nonlinear quantizing mode, and in the event that the remaining code amount obtained by subtracting the code amount of the already encoded sub-block from the luminance target code amount is insufficient, and this remaining code amount has no leeway, the encoding unit 3 encodes this sub-block using the nonlinear quantizing mode.

In the case of predicting that deterioration in the image quality of a sub-block is great according to the nonlinear quantizing mode, and in the event that the remaining code amount is sufficient, and this remaining code amount has leeway, the encoding unit 3 encodes this sub-block using the linear quantizing mode whereby the code amount increases. Thus, the encoding unit 3 encodes the luminance signal PY for each processing block so as to be less than the luminance target code amount.

That is to say, in the case that deterioration in image quality is small in the nonlinear quantizing mode whereby the code amount can be reduced regardless of the remaining code amount, the encoding unit 3 encodes the sub-block using the nonlinear mode. The encoding unit 3 can generate a luminance signal bit stream BSy with less code amount without causing deteriorate in image quality.

Subsequently, the encoding unit 3 can assign the reduction in the code amount of the luminance signal bit stream BSy to the color difference signal bit stream BSc by reselecting the color difference signal bit stream BSc using the color difference signal encoding mode reselecting unit 35.

Thus, the encoding unit 3 can assign a great code amount to the reselected color difference signal bit stream BScR without degrading the image quality of the luminance signal bit stream BSy, whereby the image quality as the whole bit stream BS can be improved.

The encoding unit 3 determines whether or not deterioration in the image quality of the sub-block is small according to the nonlinear quantizing mode depending on whether or not the maximum value of the difference value between pixels is small. The encoding unit 3 encodes the difference value between pixels of the sub-block using the nonlinear quantizing mode, and encodes the pixels of the sub-block using the linear quantizing mode. Thus, the encoding unit 3 can select a suitable quantizing mode by accurately determining deterioration in image quality due to the nonlinear mode.

The encoding unit 3 encodes a pixel value using the linear quantizing mode by being subjected to linear quantization while encoding the difference value between pixels using the nonlinear quantizing mode by being subjected to nonlinear quantization. Thus, the encoding unit 3 can encode an image which easily deteriorates in image quality in the nonlinear quantizing mode, so as to degrade the image quality as little as possible, while reducing the code amount effectively in the nonlinear quantizing mode.

The encoding unit 3 predicts the code amount of the luminance signal bit stream BSy when encoding the processing block using the high-compression mode and the low-compression mode by analyzing the luminance signal PY using the signal analyzing unit 32.

The encoding unit 3 has the high-compression mode and the low-compression mode serving as the color difference compression encoding mode as the multiple color difference signal encoding modes. With the high-compression mode and the low-compression mode, the encoding unit 3 divides the color difference signals PVU for each processing block into sub-blocks smaller than this processing block.

In the case of predicting that deterioration in the image quality of a sub-block is small according to the nonlinear quantizing mode serving as a third mode whereby the code amount can be reduced, the encoding unit 3 encodes this sub-block using the nonlinear quantizing mode.

In the case of predicting that deterioration in the image quality of a sub-block is great according to the nonlinear quantizing mode, and in the event that the remaining code amount obtained by subtracting the already encoded sub-block from the color difference target code amount is insufficient, and this remaining code amount has no leeway, the encoding unit 3 encodes this sub-block using the nonlinear quantizing mode.

In the case of predicting that deterioration in the image quality of a sub-block is great according to the nonlinear quantizing mode, and in the event that the remaining code amount is sufficient, and this remaining code amount has leeway, the encoding unit 3 encodes this sub-block using a quantizing mode whereby the code amount increases.

In the case of predicting that the code amount is great when encoding the luminance signal PY, the encoding unit 3 encodes all the sub-blocks in the processing block using the nonlinear quantizing mode. Thus, the encoding unit 3 can maximally reduce the code amount of the color difference signal bit stream BSc, and can assign a great code amount to the luminance signal bit stream BSy having great influence as to the image quality.

The encoding unit 3 predicts the code amount of the luminance signal bit stream BSy as an encoding difficulty level ID by analyzing the luminance signal PY. The encoding unit 3 sets the color difference target code amount serving as the target code amount of the color difference signal bit stream BSc based on the encoding difficulty level ID, and encodes the color difference signals PVU so as to suppress the code amount of the color difference signal bit stream BSc to less than the color difference target code amount.

Thus, the encoding unit 3 can adjust balance between the code amount of the luminance signal bit stream BSy and the code amount of the color difference signal bit stream BSc.

The encoding unit 3 sets the color difference target code amount so as to assign a code amount to the luminance signal bit stream BSy preferentially. Thus, the encoding unit 3 can assign a great code amount to the luminance signal bit stream BSy that is readily conspicuous, whereby deterioration in the image quality as the whole bit stream BS can be made to be less conspicuous.

Also, the image processing apparatus 1 stores the bit stream BS generated by the encoding unit 3 in the memory 4 for each code block, decodes this by the decoding unit 5, and supplies this to the image processing unit 2.

Now, for example, with a common encoding method such as JPEG (Joint Photographic Experts Group), AVC (Advanced Video Coding), or the like, though the compression efficiency is great, the processing load is very great, which degrades the memory access efficiency. Also, these encoding methods assume encoding in increments of pictures, and accordingly, encoding in increments of blocks or in increments of bus transfer is difficult to begin with.

The image processing apparatus 1 can encode image data BL rapidly by the encoding unit 3 made up of a simple configuration. Accordingly, the image processing apparatus 1 can reduce the capacity of the memory 4, and also can encode this image data BL with minimal degradation of the image data.

According to the above configuration, the encoding unit 3 generates multiple color difference signal bit streams BSc using the multiple color difference signal encoding modes. The encoding unit 3 sets the residual obtained by subtracting the code amount of this color difference signal bit stream BSc from the bus transfer increments to the luminance target code amount of the luminance signal bit stream BSy to generate this luminance signal bit stream BSy.

Upon generating the luminance signal bit stream BSy, the encoding unit 3 reselects the color difference encoding mode from the multiple color difference encoding modes in accordance with the remaining code amount obtained by subtracting the code amount of the actually generated luminance signal bit stream BSy from the bus transfer increments.

Thus, the encoding unit 3 can set the code amount obtained by adding the selected luminance signal bit stream BSyS and the reselected color difference signal bit stream BScR to generally the bus transfer increments at the time of generating the luminance signal bit stream BSy. Accordingly, the encoding unit 3 can have a simple configuration without executing high-precision rate control wherein the code amount of the luminance signal bit stream BSy is adjusted so as to approximate to the luminance target code amount.

2. Other Embodiments

Note that, with the above embodiment, description has been made regarding the case of having the high-compression mode and the low-compression mode as the multiple color difference signal encoding modes. The present invention is not restricted to this, and neither is the number thereof restricted; rather, color difference signal encoding modes made up of other various types may be included.

Also, with the above embodiment, description has been made regarding the case where the luminance signal encoding unit 34 has the three luminance signal encoding modes. The present invention is not restricted to this; rather, the luminance signal encoding unit 34 may have at least one luminance signal encoding mode, and the number thereof is not restricted. Also, the luminance signal encoding mode is not restricted to the high-compression mode, low-compression mode, and post quantizing mode; rather, luminance signal encoding modes made up of various types may be included.

Further, with the above embodiment, description has been made regarding the case where the selected color difference signal bit stream BScS is selected according to the encoding difficulty level ID and color specification information IE. The present invention is not restricted to this; rather, there is no particular restriction regarding the selection method of the selected color difference signal bit stream BScS. For example, the selected color difference signal bit stream BScS may be selected according to one of the encoding difficulty level ID and the color specification information IE, or according to other factors.

Further, with the above embodiment, description has been made regarding the case where, with the high-compression mode and the low-compression mode, the luminance signal is encoded so as to be less than the luminance target code amount by switching the linear quantizing mode and the nonlinear quantizing mode according to the code amount of the encoded luminance signal PY. The present invention is not restricted to this; rather, there is no particular restriction regarding the code amount adjustment method. For example, the code amount may be adjusted by switching the nonlinear table. Also, this is true regarding the color difference signals PVU.

Further, with the above embodiment, description has been made regarding the case where the color difference image quality evaluated value EVc and the luminance image quality evaluated value EVy by the mean square method. The present invention is not restricted to this; rather, the color difference image quality evaluated value EVc and the luminance image quality evaluated value EVy may be calculated with other various types of method. Also, with the present invention, the deterioration degree of image quality should be evaluated, and the color difference image quality evaluated value EVc and the luminance image quality evaluated value EVy do not have to be generated.

Further, with the above embodiment, description has been made regarding the case where the image data is separated into the luminance signal PY and the color difference signals PVU by the signal conversion unit 31. The present invention is not restricted to this; rather, for example, image data separated into the luminance signal PY and the color difference signals PVU beforehand may be input.

Further, with the above embodiment, description has been made regarding the case where the low-compression mode is selected as to the particular color block where deterioration in the image quality is conspicuous. The present invention is not restricted to this; rather, for example, of the high-compression mode and the low-compression mode, one of the color difference signal encoding modes having better image quality may be selected. Also, with the low-compression mode, the particular color does not have to be adjusted so as prevent the particular color from being degraded.

Further, with the above embodiment, description has been made regarding the case where the luminance image quality evaluated value EVy3 is generated based on the discarded DWT value. The present invention is not restricted to this; rather, the luminance image quality evaluated value EVy3 may be generated based on the decoded luminance quantized bit stream BSy3.

Further, with the above embodiment, description has been made regarding the case where the luminance signal PY subjected to the DWT processing is broken down into bit planes. The present invention is not restricted to this; rather, the luminance signal PY may be broken down into bit planes without change. Also, various types can be used as orthogonal transformation, and for example, DCT (Discrete Cosine Transform) processing may be subjected.

Further, with the above embodiment, description has been made regarding the case where the luminance signal PY is subjected to the DC level shift processing. The present invention is not restricted to this; the DC level shift processing does not have to be used.

Further, with the above embodiment, description has been made regarding the case where the code block made up of the bus transfer increments of 128 bytes is generated. The present invention is not restricted to this; the size thereof is not restricted. Also, the code block does not have to be identical to the bus transfer increments.

Further, with the above embodiment, description has been made regarding the case where the code amount of the luminance signal bit stream BSy and the code amount of the color difference signals PVU are predicted as the encoding difficulty level ID. The present invention is not restricted to this, only the code amount of the luminance signal bit stream BSy may be predicted, or the code amount of the luminance signal bit stream BSy does not have to be predicted. Also, the encoding difficulty level ID may be calculated using a method other than the size of the difference maximum value.

Further, with the above embodiment, description has been made regarding the case where the code amount is assigned to the luminance signal bit stream BSy preferentially. The present invention is not restricted to this, and for example, the code amount may be assigned to the color difference signal bit stream BSc preferentially.

Further, with the above embodiment, description has been made regarding the case where the first pixel of which the difference value is calculated is set to the center pixel (FIG. 11). The present invention is not restricted to this, and for example, the pixel on one end portion may be started.

Further, with the above embodiment, the color specification region is represented with a cubic. The present invention is not restricted to this; rather, the shape of the color specification region is not restricted, and may be defined with solid sphere, ellipsoid, various polygon objects, or the like. Also, definition may be made with signals other than the Y signal, V signal, and U signal. Definition is preferably made in accordance with a luminance signal and a color difference signal.

Further, with the above embodiment, description has been made regarding the case where, with the quantizing mode selecting processing at the luminance signal encoding unit, the encoding difficulty level ID is not taken into consideration. The present invention is not restricted to this, the encoding difficulty level ID may be taken into consideration.

Further, with the above embodiment, description has been made regarding the case where the bit planes are subjected to variable length encoding at the time of the post quantization processing. The present invention is not restricted to this, and FLC (Fixed Length Coding) method may be used. Also, the VLC table used for variable length encoding may be used commonly, or the VLC table adapted to various types of processing may be used.

Further, with the above embodiment, description has been made regarding the case where the RB encoding unit 254 scans all the bit planes while skipping encoded bit planes at the time of the post quantization processing. The present invention is not restricted to this; rather, for example, an arrangement may be made wherein only the bit planes not encoded are scanned. Also, determination may be made whether or not a bit plane has been encoded using, for example, a DONE plane representing whether to be processed even if determination is not made from encoded information.

Further, with the above embodiment, description has been made regarding the case where the code amount is adjusted beforehand by changing the sub-block size. The present invention is not restricted to this; rather, for example, the nonlinear table may be changed.

Further, with the above embodiment, description has been made regarding the case where the reselected color difference signal bit stream BScR is selected in accordance with the color difference encoding mode reselecting processing procedure RT7. The present invention is not restricted to this; rather, for example, an arrangement may be made wherein after determination is made whether or not the code amount of the color difference signal bit stream BSc fits in the reselected target code amount, one of the color difference signal bit streams BSc having suitable image quality evaluated value EVc is selected. That is to say, a color difference signal bit stream having better image quality of which the code amount fits in the range of the reselected target code amount may be selected.

Further, with the above embodiment, description has been made regarding the case where the encoding program and the like are stored in the ROM or hard disk or the like beforehand, but the present invention is not restricted to this; rather, the encoding program and the like may be installed in flash memory or the like from an external storage medium such as a memory stick (registered trademark of Sony corp.). Also, a database generating program and the like may be obtained externally via USB (Universal Serial Bus), Ethernet, or wireless LAN (Local Area Network) such as IEEE (Institute of Electrical and Electronics Engineers) 802.11a/b/g or the like, and further, may be distributed by terrestrial digital television broadcasting or BS (Broadcast Satellite) digital television broadcasting.

Further, with the above embodiment, description has been made regarding the case where the encoding unit 3 serving as an encoding device is configured of the color difference signal encoding unit 3 serving as a color difference signal encoding unit, color difference signal encoding mode selecting unit 113 serving as a color difference mode selecting unit, luminance signal encoding unit 34 serving as a luminance signal encoding unit, color difference signal encoding mode reselecting unit 35 serving as a color difference mode reselecting unit, and multiplexing unit 36 serving as a multiplexing unit. The present invention is not restricted to this; rather, the encoding device of the present invention may be configured of a color difference signal encoding unit, a color difference mode selecting unit, a luminance signal encoding unit, a color difference mode reselecting unit, and a multiplexing unit, which are made up of other various types of configurations.

Further, with the above embodiment, description has been made regarding the case where the image processing apparatus 1 serving as an image processing apparatus is configured of the encoding unit 3 serving as an encoding unit, memory 4 serving as memory, decoding unit 5 serving as a decoding unit, and image processing unit 2 serving as an image processing unit. The present invention is not restricted to this; rather, the image processing device of the present invention may be configured of an encoding unit, memory, a decoding unit, and an image processing unit, which are made up of other various types of configurations.

The present application contains subject matter related to that disclosed in Japanese Priority Patent Application JP 2009-001892 filed in the Japan Patent Office on Jan. 7, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An encoding device comprising:
a color difference signal encoding unit configured to encode a color difference signal for each processing block in a plurality of color difference signal encoding modes to generate a plurality of color difference signal bit streams;
a color difference mode selecting unit configured to select a color difference signal encoding mode from said plurality of color difference signal encoding modes as the selected color difference mode;
a luminance signal encoding unit configured to calculate a luminance target code amount based on a subtraction value obtained by subtracting the code amount of a color difference signal bit stream encoded with said selected color difference mode selected by said color difference mode selecting unit from a fixed code amount, and encode a luminance signal for said each processing block so as to be equal to or smaller than this luminance target code amount to generate a luminance signal bit stream;
a color difference reselecting unit configured to select as a reselected color difference mode the color difference signal encoding mode corresponding to said color difference signal bit stream of which the total code amount including the code amount of said luminance signal bit stream is equal to or smaller than said fixed code amount, and also the deterioration as to said color difference signal is small, as the reselected color difference mode; and
a multiplexing unit configured to multiplex said luminance signal bit stream, and the color difference signal bit stream encoded with said reselected color difference mode to generate a bit stream made up of the code block of said fixed code amount.

2. The encoding device according to claim 1, wherein said color difference signal encoding unit generates a color difference image quality evaluated value representing the degree of deterioration in said color difference signal bit stream as to said color difference signal;
and wherein said color difference mode reselecting unit recognize the degree of deterioration in said color difference signal bit stream as to said color difference signal in each of said color difference signal encoding modes based on said color difference image quality evaluated value generated by said color difference image quality evaluated value generating unit.

3. The encoding device according to claim 1, wherein said signal analyzing unit determines whether or not said processing block includes a great number of particular colors whereby deterioration is conspicuous, by analyzing said color difference signal and luminance signal;
and wherein said color difference mode selecting unit selects as the selected color difference mode the color difference signal encoding mode corresponding to said color difference signal bit stream of which the deterioration as to said color difference signal is small from said plurality of color difference signal encoding modes, in the case that determination is made by said signal analyzing unit that said processing block includes a great number of said particular colors.

4. The encoding device according to claim 3, wherein said color difference mode reselecting unit selects as a reselected color difference mode the selected color difference mode selected by said color difference mode selecting unit as to said color difference signal determined to include a great number of said particular colors by said signal analyzing unit.

5. The encoding device according to claim 4, wherein said color difference signal encoding unit has a color difference signal encoding mode preventing deterioration in said particular colors;
and wherein said color difference mode selecting unit selects as said selected color difference mode a color difference signal encoding mode preventing deterioration in said particular colors, in the case that determination is made by said signal analyzing unit that said color difference signal includes a great number of particular colors.

6. The encoding device according to claim 1, wherein said luminance signal encoding unit encodes said luminance signal by post quantization processing wherein said luminance signal is divided into bit planes, and a bit plane having low significance is discarded so as to obtain said luminance target code amount.

7. The encoding device according to claim 6, wherein said luminance signal encoding unit encodes the luminance signals divided into said bit planes in order from a bit plane having high significance, and discards the remaining bit planes when the coded amount of the encoded luminance signal reaches said luminance target code amount.

8. The encoding device according to claim 6, wherein said luminance signal encoding unit encodes said luminance signal in a plurality of luminance signal encoding modes including a post quantization mode in which said post quantization processing is executed;

and further comprising:
a luminance mode selecting unit configured to select as the selected luminance mode the luminance signal encoding mode corresponding to a luminance signal bit stream having the least deterioration as to said luminance signal from said plurality of luminance signal encoding modes.

9. The encoding device according to claim 8, wherein said luminance signal encoding unit generates a luminance image quality evaluated value representing the degree of deterioration in said luminance signal bit stream as to said luminance signal;

and wherein said luminance mode selecting unit recognizes the degree of deterioration in said luminance signal bit stream as to said luminance signal in said luminance signal encoding mode based on said luminance image quality evaluated value generated by said luminance image quality evaluated value generating unit.

10. The encoding device according to claim 9, wherein, with said luminance signal divided into bit planes, said luminance image quality evaluated value generating unit generates discarded bit planes by discarding the bit planes corresponding to said remaining bit planes discarded by said luminance signal encoding unit, and calculates the degree of deterioration in this discarded bit planes as to said luminance signal as said luminance image quality evaluated value.

11. The encoding device according to claim 10, wherein, with said luminance signal divided into bit planes, said luminance image quality evaluated value generating unit discards the bit planes corresponding to said remaining bit planes discarded by said luminance signal encoding unit, and then takes as said discarded bit plane a bit plane to which "1" is added in the case that the higher-order bits include "1", of the bit plane disposed at the most significant position of the discarded bit planes.

12. The encoding device according to claim 6, wherein said luminance signal encoding unit divides said luminance signal subjected to orthogonal transform into said bit planes.

13. The encoding device according to claim 7, wherein said luminance signal encoding unit represents said luminance signal with a positive/negative sign and a value of less one bit than said luminance signal by executing DC (Direct Current) level shift, and divides the orthogonal transform value generated by subjecting said luminance signal subjected to said DC level shift to orthogonal transform into said bit planes as said luminance signal.

14. The encoding device according to claim 8, wherein said luminance signal encoding unit has a luminance compression encoding mode as said plurality of luminance signal encoding modes;

and wherein, with said luminance compression encoding mode, said luminance signal for said each processing block is divided into smaller sub-blocks than this processing block, and in the case of predicting that deterioration in the image quality of sub-blocks is small according to a first mode whereby the code amount can be reduced, the sub-blocks are encoded with said first mode;

and wherein in the case that prediction is made that deterioration in the image quality of said sub-blocks is great according to said first mode, and the remaining code amount obtained by subtracting the code amount of already encoded sub-blocks from said luminance target code amount has no leeway, said sub-blocks are encoded with said first mode;

and wherein in the case that prediction is made that deterioration in the image quality of said sub-blocks is great according to said first mode, and said remaining code amount has leeway, said sub-blocks are encoded with a second mode whereby the code amount becomes great, thereby encoding the luminance signal for said each processing block so as to be equal to or smaller than the luminance target code amount.

15. The encoding device according to claim 14, wherein said luminance signal encoding unit determines whether or not deterioration in the image quality of said sub-blocks is small according to said first mode depending on whether or not the maximum value of the difference value of pixels is small,
encodes said difference value between pixels with said sub-blocks in said first mode, and
encodes said pixels with said sub-blocks in said second mode.

16. The encoding device according to claim 15, wherein said luminance signal encoding unit executes encoding by subjecting said difference value between pixels to nonlinear quantization in said first mode, and executes encoding by subjecting said pixel value to linear quantization in said second mode.

17. The encoding device according to claim 1, further comprising:
a signal analyzing unit configured to predict the code amount when executing encoding regarding said processing block in said compression mode by analyzing said luminance signal;
wherein said color difference signal encoding unit has a color difference compression encoding mode as said plurality of color difference signal encoding modes;
and wherein, with this color difference compression encoding mode, said color difference signal for said each processing block is divided into smaller sub-blocks than this processing block, and in the case that prediction is made that deterioration in the image quality of said sub-blocks is small according to a third mode whereby the code amount can be reduced, the sub-blocks are encoded with said third mode,
in the case that prediction is made that deterioration in the image quality of said sub-blocks is great according to said third mode, and the remaining code amount obtained by subtracting the code amount of the sub-blocks already encoded from said color difference target code amount has no leeway, said sub-blocks are encoded with said first mode,
in the case that prediction is made that deterioration in the image quality of said sub-blocks is great according to said first mode, and said remaining code amount has leeway, said sub-blocks are encoded with a fourth mode whereby the code amount is great, and
in the case that prediction is made that the code amount when encoding said luminance signal is great, all the sub-blocks in said processing block are encoded with said third mode.

18. An encoding method comprising the steps of:
  encoding of a color difference signal for each processing block in a plurality color difference signal encoding mode to generate a plurality of color difference signal bit streams;
  first selecting of a color difference signal encoding mode from said plurality of color difference signal encoding modes as the selected color difference mode;
  calculating of a luminance target code amount by subtracting the code amount of a color difference signal bit stream encoded by said selected color difference mode selected in said first selecting from a fixed code amount, and encode the luminance signal for said each processing block so as to be equal to or smaller than this luminance target code amount to generate a luminance signal bit stream;
  second selecting of the color difference signal encoding mode corresponding to said color difference signal bit stream of which the total code amount including the code amount of said luminance signal bit stream is equal to or smaller than said fixed code amount, and also the deterioration as to said color difference signal is small, as the reselected color difference mode; and
  multiplexing of said luminance signal bit stream, and the color difference signal bit stream encoded with said reselected color difference mode to generate a bit stream made up of the code block of said fixed code amount.

19. A non-transitory recording medium storing a program causing a computer to execute the steps of:
  encoding of a color difference signal for each processing block in a plurality color difference signal encoding mode to generate a plurality of color difference signal bit streams;
  first selecting of a color difference signal encoding mode from said plurality of color difference signal encoding modes as the selected color difference mode;
  calculating of a luminance target code amount by subtracting the code amount of a color difference signal bit stream encoded by said selected color difference mode selected in said first selecting from a fixed code amount, and encode the luminance signal for said each processing block so as to be equal to or smaller than this luminance target code amount to generate a luminance signal bit stream;
  second selecting of the color difference signal encoding mode corresponding to said color difference signal bit stream of which the total code amount including the code amount of said luminance signal bit stream is equal to or smaller than said fixed code amount, and also the deterioration as to said color difference signal is small, as the reselected color difference mode; and
  multiplexing of said luminance signal bit stream, and the color difference signal bit stream encoded with said reselected color difference mode to generate a bit stream made up of the code block of said fixed code amount.

20. An image processing apparatus comprising:
  a signal separating unit configured to separate image data into a color difference signal and a luminance signal;
  an encoding device including
    a color difference signal encoding unit configured to encode a color difference signal for each processing block in a plurality color difference signal encoding mode to generate a plurality of color difference signal bit streams,
    a color difference mode selecting unit configured to select a color difference signal encoding mode from said plurality of color difference signal encoding modes as the selected color difference mode,
    a luminance signal encoding unit configured to calculate a luminance target code amount by subtracting the code amount of a color difference signal bit stream encoded by said selected color difference mode selected by said color difference mode selecting unit from a fixed code amount, and encode the luminance signal for said each processing block so as to be equal to or smaller than this luminance target code amount to generate a luminance signal bit stream,
    a color difference mode reselecting unit configured to select the color difference signal encoding mode corresponding to said color difference signal bit stream of which the total code amount including the code amount of said luminance signal bit stream is equal to or smaller than said fixed code amount, and also the deterioration as to said color difference signal is small, as the reselected color difference mode, and
    a multiplexing unit configured to multiplex said luminance signal bit stream, and the color difference signal bit stream encoded with said reselected color difference mode to generate a bit stream made up of the code block of said fixed code amount;
  memory configured to store said bit stream for said each code block;
  a decoding unit configured to read out and decode said bit stream from said memory for said each code block to generate said image data; and
  an image processing unit configured to process said image data decoded by said decoding unit.

* * * * *